(12) United States Patent
You et al.

(10) Patent No.: US 11,528,173 B2
(45) Date of Patent: Dec. 13, 2022

(54) METHOD FOR DETERMINING LINK AVAILABILITY FOR IAB NODE, AND NODE USING SAME

(71) Applicant: LG ELECTRONICS INC., Seoul (KR)

(72) Inventors: Hyangsun You, Seoul (KR); Sukhyon Yoon, Seoul (KR); Haewook Park, Seoul (KR); Hyunsoo Ko, Seoul (KR); Gyeongcheol Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/571,159

(22) Filed: Jan. 7, 2022

(65) Prior Publication Data

US 2022/0131733 A1 Apr. 28, 2022

Related U.S. Application Data

(63) Continuation of application No. PCT/KR2020/008959, filed on Jul. 8, 2020.

(60) Provisional application No. 62/888,390, filed on Aug. 16, 2019.

(30) Foreign Application Priority Data

| Jul. 8, 2019 | (KR) | ................ 10-2019-0082323 |
| Oct. 17, 2019 | (KR) | ................ 10-2019-0128988 |
| Nov. 15, 2019 | (KR) | ................ 10-2019-0147006 |
| Apr. 8, 2020 | (KR) | ................ 10-2020-0043010 |
| May 14, 2020 | (KR) | ................ 10-2020-0057928 |

(51) Int. Cl.
*H04W 40/34* (2009.01)
*H04L 27/26* (2006.01)

(52) U.S. Cl.
CPC ......... *H04L 27/2613* (2013.01); *H04W 40/34* (2013.01)

(58) Field of Classification Search
CPC .......................... H04L 27/2613; H04W 40/34
USPC ........................................................ 370/338
See application file for complete search history.

(56) References Cited

U.S. PATENT DOCUMENTS

| 2018/0049190 A1 | 2/2018 | Abedini et al. |
| 2019/0110266 A1 | 4/2019 | Abedini et al. |
| 2020/0112953 A1* | 4/2020 | Bendlin ............. H04B 7/15542 |

(Continued)

OTHER PUBLICATIONS

Huawei et al., "DL transmission timing alignment for IAB", RI-1906002, 3GPP TSG RAN WGI Meeting #97, Reno, USA, May 4, 2019, Sections 2-2, 3 and FIGs 2-4.

(Continued)

*Primary Examiner* — Gbemileke J Onamuti
(74) *Attorney, Agent, or Firm* — Dentons US LLP

(57) ABSTRACT

The present specification provides a method for receiving gap symbol information, the method being performed by a node in a wireless communication system. The method is characterized by including: receiving the gap symbol information, wherein the gap symbol information indicates the number of gap symbols pertaining to switching between a mobile terminal (MT) operation and a distributed unit (DU) operation; and performing an integrated access and backhaul (IAB) operation on the basis of the gap symbol information, wherein the node does not perform the IAB operation on the symbol indicated by the gap symbol information.

10 Claims, 53 Drawing Sheets

(56) References Cited

U.S. PATENT DOCUMENTS

2021/0160861 A1\* 5/2021 You ................ H04W 72/042
2021/0298000 A1\* 9/2021 Park ................ H04L 5/0098

OTHER PUBLICATIONS

Nokia et al., "Open items with IAB Case #1 timing", RI-1907117, 3GPP TSG RAN WGI Meeting #97, Reno, USA, May 3, 2019, Sections 1-2, 3 and FIG 1.
Huawei et al., "Resource multiplexing between backhaul and access in IAB", RI-1906001, 3GPP TSG RAN WGI Meeting #97, Reno, USA, May 4, 2019, Sections 2-2, 2 and FIGs 1-3.
Samsung, "Support of Case 1 OTA Training Alignment", RI-1906933, 3GPP TSG RAN WGI Meeting #97, Reno, USA, May 3, 2019, Section 2.

\* cited by examiner

FIG. 41
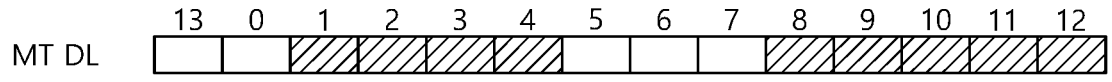
(a) MT downlink and DU downlink
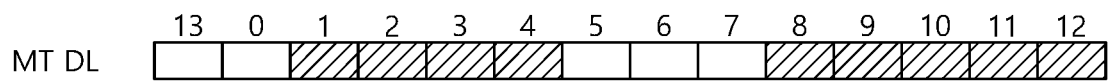
(b) MT downlink and DU uplink
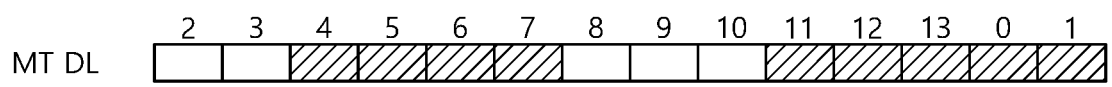
(c) MT uplink and DU downlink
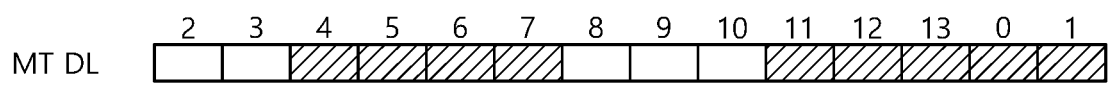
(d) MT uplink and DU uplink
☐ : Available resource
▨ : Not available resource

FIG. 52 transmit the gap symbol information
(the gap symbol information informs the number of
gap symbols related to switching between
a mobile terminal (MT) operation
and a distributed unit (DU) operation) ~S5210

METHOD FOR DETERMINING LINK AVAILABILITY FOR IAB NODE, AND NODE USING SAME

CROSS-REFERENCE TO PRIOR APPLICATIONS

This application is a Continuation of International Application No. PCT/KR2020/008959 filed on Jul. 8, 2020 and published on Jan. 14, 2021 as WO2021/006634A1, which claims priority to U.S. Provisional Application No. 62/888, 390, filed on Aug. 16, 2019; Korean Patent Application No. 10-2019-0082323 filed on Jul. 8, 2019; Korean Patent Application No. 10-2019-0128988 filed on Oct. 17, 2019; Korean Patent Application No. 10-2019-0147006 filed on Nov. 15, 2019; Korean Patent Application No. 10-2020-0043010 filed on Apr. 8, 2020 and Korean Patent Application No. 10-2020-0057928 filed on May 14, 2020, the contents of which are hereby incorporated by reference herein in their entirety.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

On the other hand, integrated access and backhaul link may be provided. Hereinafter, in this specification, features for Integrated Access Backhaul (IAB) will be provided.

SUMMARY OF THE DISCLOSURE

Technical Solutions

In an aspect, the method and the node using the same are provided. The method and the node may comprise performing the reception of gap symbol information, where the gap symbol information informs the number of gap symbols related to switching between a mobile terminal (MT) operation and a distributed unit (DU) operation, and where the node does not perform the IAB operation on the symbol indicated by the gap symbol information.

Effects of the Disclosure

According to this specification, a feature for a gap symbol is provided, and it is prevented from performing an MT operation or a DU operation on an unavailable resource. Accordingly, the stability of IAB communication is increased, and smooth communication is provided.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

BRIEF DESCRIPTION OF THE DRAWINGS

FIG. 41 schematically shows an example of MT resource availability determination.

FIG. 52 is a flowchart of a method of performing transmission of gap symbol information from the viewpoint of a (parent) node, according to an embodiment of the present specification.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in this specification, "A, B or C" refers to "only A", "only B", "only C", or "any combination of A, B and C".

A forward slash (/) or comma used herein may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" can be interpreted the same as "at least one of A and B".

In addition, in the present specification, "at least one of A, B and C" means "only A", "only B", "only C", or "any combination of A, B and C". In addition, "at least one of A, B or C" or "at least one of A, B and/or C" can mean "at least one of A, B and C".

In addition, parentheses used in the present specification may mean "for example". Specifically, when described as "control information (PDCCH)", "PDCCH" may be proposed as an example of "control information". In other words, "control information" of the present specification is not limited to "PDCCH", and "PDDCH" may be suggested as an example of "control information". In addition, even when described as "control information (i.e., PDCCH)", "PDCCH" may be proposed as an example of "control information".

In the present specification, technical features that are individually described in one drawing may be implemented individually or at the same time.

Figure 1:
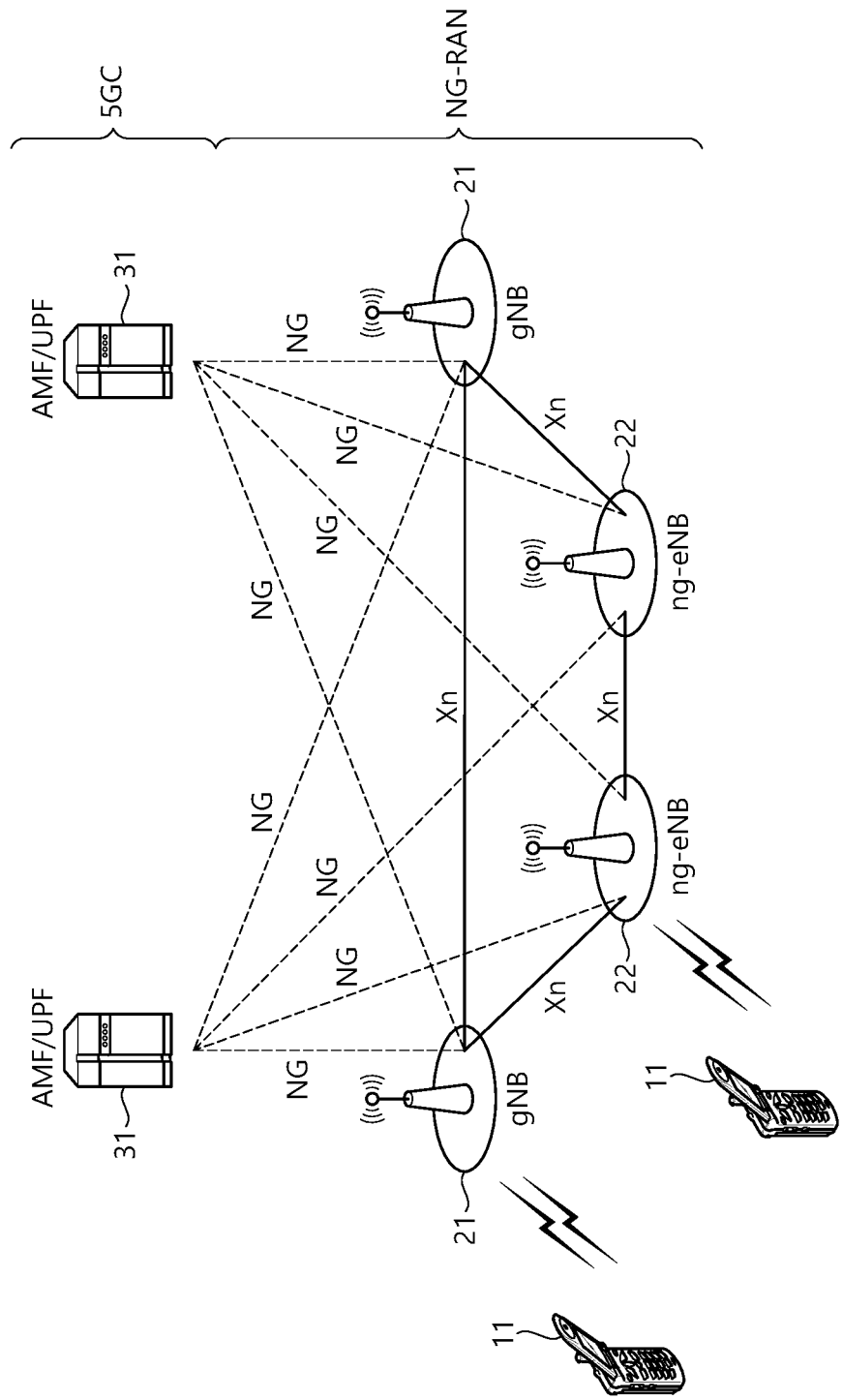
FIG. 1 illustrates another example of a wireless communication system to which technical features of the present disclosure are applicable.

FIG. 1 illustrates another example of a wireless communication system to which technical features of the present disclosure are applicable. Specifically, FIG. 1 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 1, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index p.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index p. However, subcarrier spacings shown in Table 1 are merely exemplary, and specific subcarrier spacings may be changed. Therefore, each subcarrier spacing (e.g., $\mu=0, 1 \ldots 4$) may be represented as a first subcarrier spacing, a second subcarrier spacing . . . Nth subcarrier spacing.

Referring to Table 1, transmission of user data (e.g., physical uplink shared channel (PUSCH), physical downlink shared channel (PDSCH)) may not be supported depending on the subcarrier spacing. That is, transmission of user data may not be supported only in at least one specific subcarrier spacing (e.g., 240 kHz).

In addition, referring to Table 1, a synchronization channel (e.g., a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g., 60 kHz).

In NR, a number of slots and a number of symbols included in one radio frame/subframe may be different according to various numerologies, i.e., various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to $\mu=0$ is applied, one radio frame includes 10 subframes, one subframe corresponds to one slot, and one slot consists of 14 symbols. In the present disclosure, a symbol refers to a signal transmitted during a specific time interval. For example, a symbol may refer to a signal generated by OFDM processing. That is, a symbol in the present disclosure may refer to an OFDM/OFDMA symbol, or SC-FDMA symbol, etc. A CP may be located between each symbol.

Figure 2:
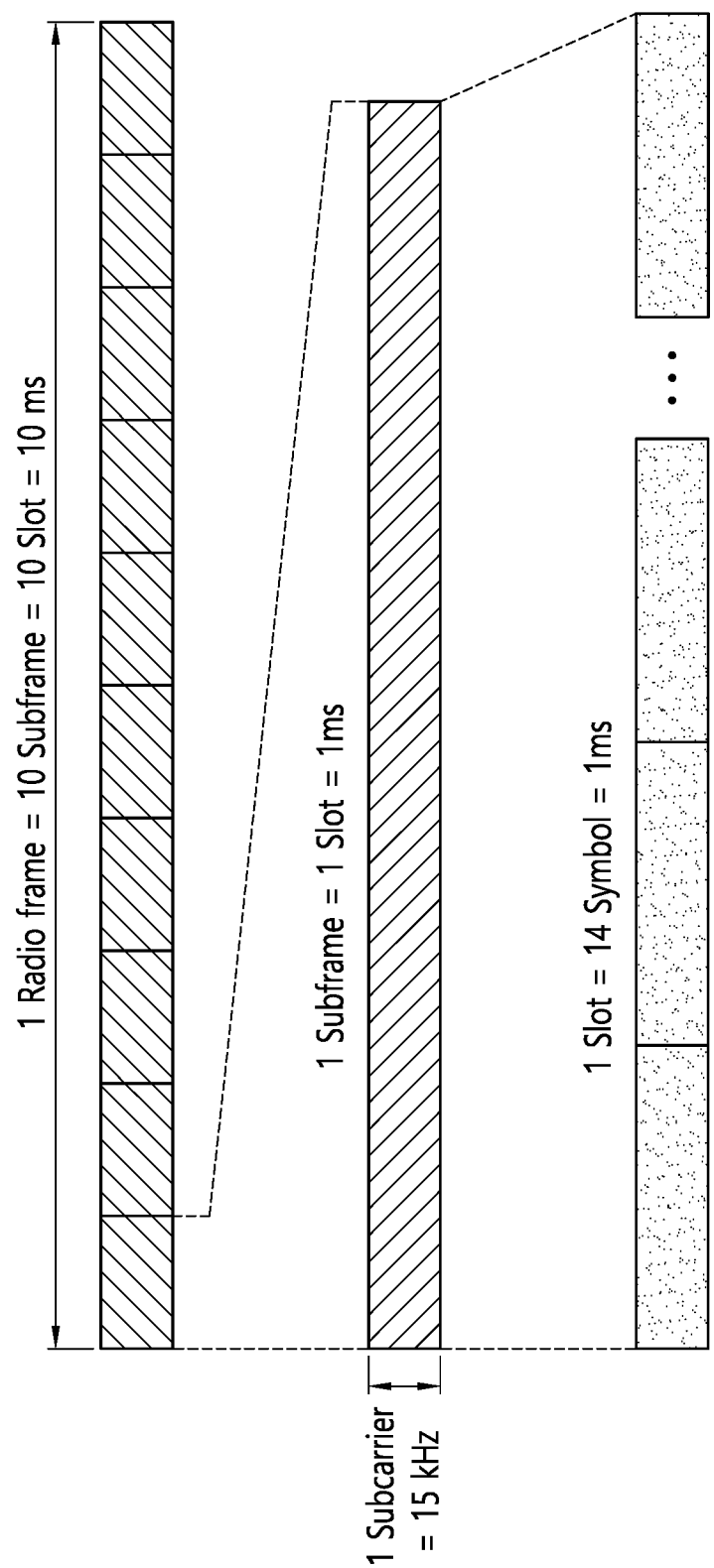
FIG. 2 shows an example of a frame structure to which technical features of the present disclosure can be applied.

FIG. 2 shows an example of a frame structure to which technical features of the present disclosure can be applied. In FIG. 2, a subcarrier spacing is 15 kHz, which corresponds to $\mu=0$. FIG. 2 illustrates an example of a frame structure to which the technical features of the present disclosure are applicable. In FIG. 2, a subcarrier spacing is 15 kHz which corresponds to $\mu=0$.

Figure 3:
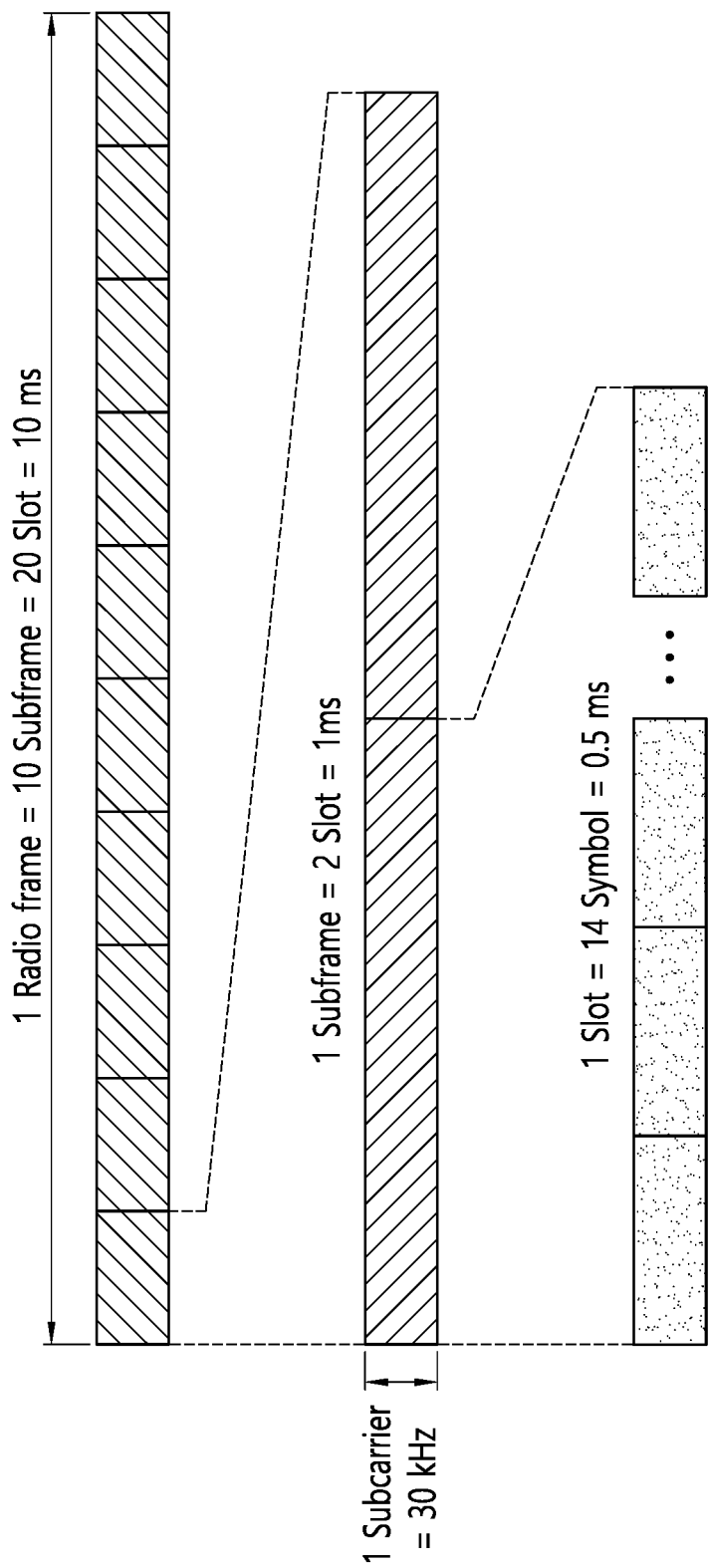
FIG. 3 illustrates another example of a frame structure to which the technical features of the present disclosure are applicable.

FIG. 3 illustrates another example of a frame structure to which the technical features of the present disclosure are applicable. In FIG. 3, a subcarrier spacing is 30 kHz which corresponds to $\mu=1$.

Meanwhile, a frequency division duplex (FDD) and/or a time division duplex (TDD) may be applied to a wireless communication system to which embodiments of the present disclosure is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 3 shows an example of a slot format which is identified by a corresponding format index. The contents of the Table 3 may be commonly applied to a specific cell, or may be commonly applied to adjacent cells, or may be applied individually or differently to each UE.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | | | | | | | | | | | | | | |

For convenience of explanation, Table 3 shows only a part of the slot format actually defined in NR. The specific allocation scheme may be changed or added. The UE may receive a slot format configuration via a higher layer signaling (i.e., radio resource control (RRC) signaling). Or, the UE may receive a slot format configuration via downlink control information (DCI) which is received on PDCCH. Or, the UE may receive a slot format configuration via combination of higher layer signaling and DCI.

Figure 4:
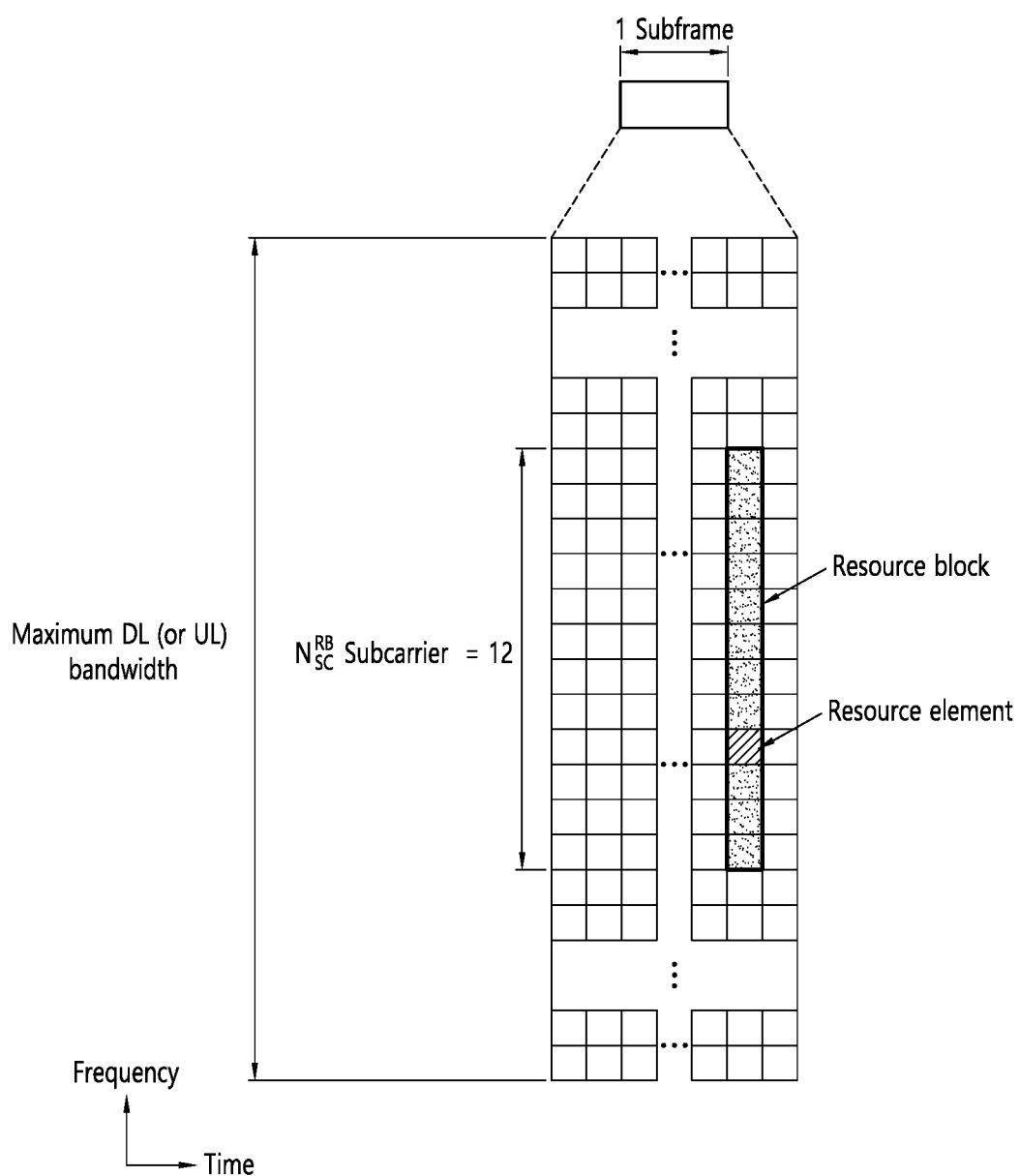
FIG. 4 shows an example of a resource grid to which technical features of the present disclosure can be applied.

FIG. 4 shows an example of a resource grid to which technical features of the present disclosure can be applied.

An example shown in FIG. 4 is a time-frequency resource grid used in NR. An example shown in FIG. 4 may be applied to UL and/or DL. Referring to FIG. 4, multiple slots are included within one subframe on the time domain. Specifically, when expressed according to the value of "µ", "14·2µ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("µ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

<Self-Contained Subframe Structure>

For the purpose of minimizing latency in 5G NR, a structure in which a control channel and a data channel are TDMed, as illustrated in the following figure, may be considered as a frame structure.

Figure 5:
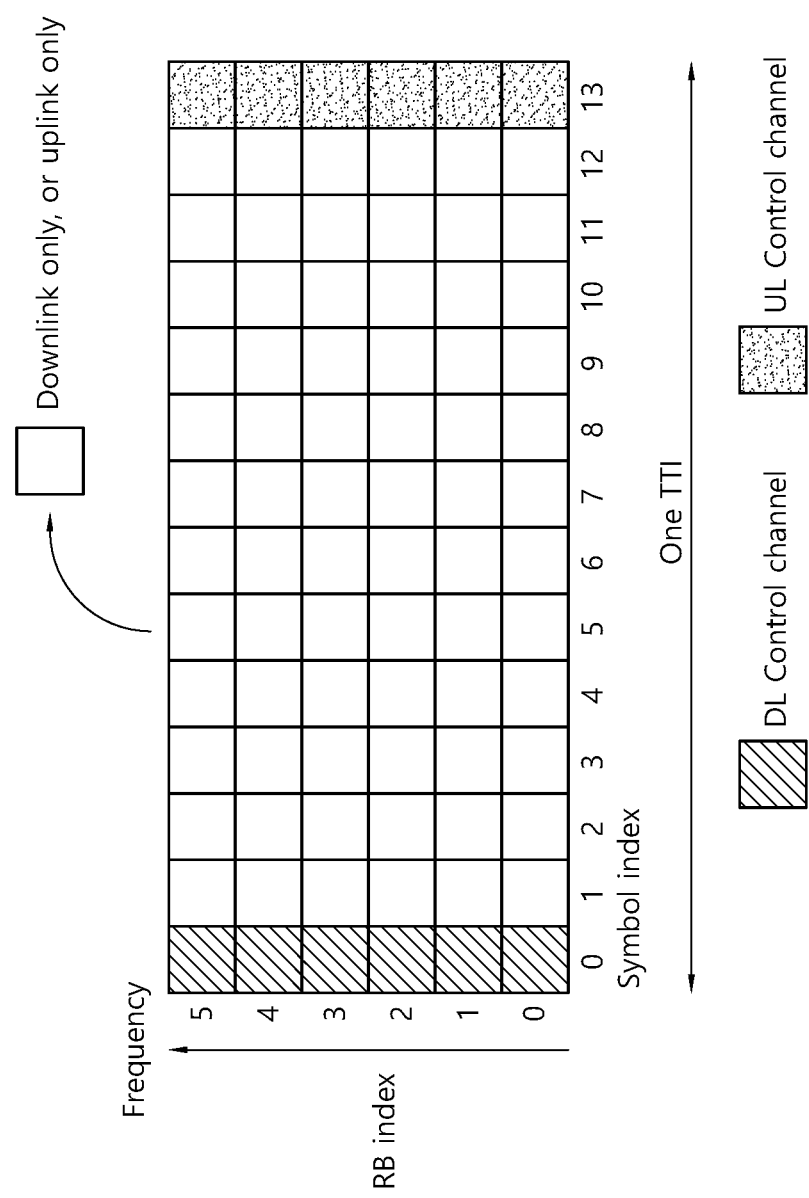
FIG. 5 schematically illustrates an example of a frame structure based on a structure in which a data channel and a control channel are time-division-multiplexed (TDMed).

FIG. 5 schematically illustrates an example of a frame structure based on a structure in which a data channel and a control channel are time-division-multiplexed (TDMed).

Referring to FIG. 5, as an example of a frame structure, a single subframe (here, a subframe can be used interchangeably with a transmission time interval (TTI) can be represented on the basis of an index of a resource block (RB) and an index of a symbol. Here, a single TTI may include a region related to a downlink control channel, a region related to an uplink control channel, and a downlink or uplink region.

For example, a TTI structure is described on the basis of FIG. 5. A hatched region represents a downlink control region and a shaded region represents an uplink control region. A blank region may be used for downlink data transmission or uplink data transmission. This structure is characterized in that downlink (DL) transmission and uplink (UL) transmission are sequentially performed in a single subframe so that DL data can be transmitted and UL ACK/NACK (Acknowledged/Not Acknowledged) can be received in the subframe. Consequently, a time taken to retransmit data when a data transmission error is generated is reduced, and thus final data delivery latency can be minimized.

In this data and control TDMed subframe structure, a time gap for switching from a transmission mode to a reception mode or switching from the reception mode to the transmission mode between a base station and a UE is required. To this end, some OFDM symbols at a time when DL switches to UL in a subframe structure is set to a guard period (GP).

<Analog Beamforming>

In mmW, wavelengths decrease and thus a plurality of antennas can be installed in the same area. That is, the wavelength in 30 GHz is 1 cm and a total of 100 antenna elements can be installed in a 2-dimensional arrangement on a panel in 5×5 cm at intervals of 0.5λ (wavelength). Accordingly, coverage is increased or throughput is improved by increasing a beamforming (BF) gain using a plurality of antenna elements in mmW.

In this case, if a TXRU (transceiver unit) is provided for each antenna element such that transmission power and phase can be controlled, beamforming independent for each frequency resource is possible. However, installation of TXRUs for all of 100 antenna elements is inefficient in terms of price. Accordingly, a method of mapping a plurality of antenna elements to one TXRU and controlling a beam direction using an analog phase shifter is considered. Such an analog beamforming method cannot provide frequency selective beaming because only one beam direction can be generated in the entire band.

As an intermediate form of digital BF and analog BF, a hybrid BF having B TXRUs fewer than Q antenna elements can be considered. In this case, the number of directions of beams that can be simultaneously transmitted is limited to B or less although it depends on a method of connecting B TXRUs and Q antenna elements.

<Analog Beamforming—2>

When multiple antennas are used in the NR system, hybrid beamforming that is a combination of digital beamforming and analog beamforming is proposed. Here, analog beamforming (or RF beamforming) means an operation of performing precoding (or combining) in an RF stage.

In the aforementioned hybrid beamforming, a baseband stage and an RF stage perform precoding (or combining), and thus it is possible to achieve performance close to digital beamforming while reducing the number of RF chains and the number of D/A (or A/D) converters.

For convenience, the aforementioned hybrid beamforming structure can be represented by N transceiver units (TXRUs) and M physical antennas. Then, digital beamforming for L data layers to be transmitted by a transmitting stage can be represented by an N×L matrix, and N converted digital signals are converted into analog signals through TXRU and then analog beamforming represented by an M×N matrix is applied thereto.

For convenience of understanding, the hybrid beamforming structure is schematically illustrated below in terms of TXRUs and physical antennas.

Figure 6:
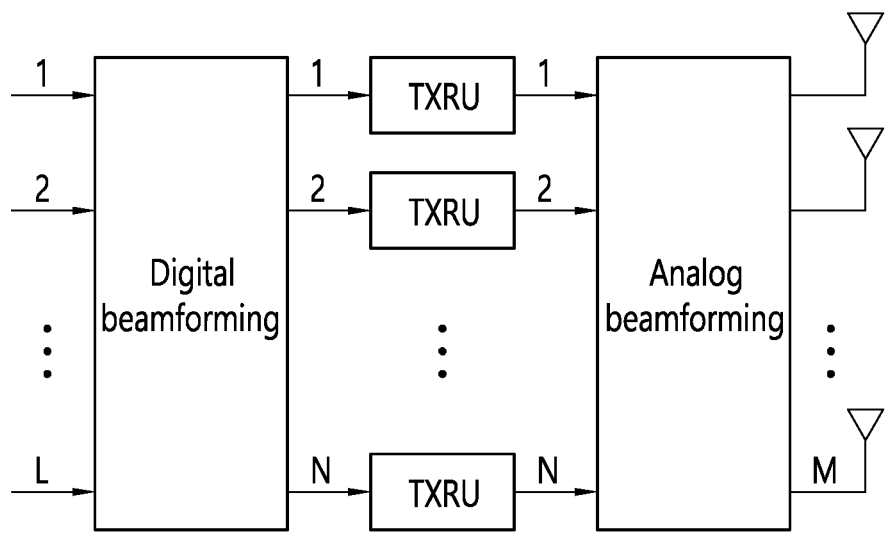
FIG. 6 schematically illustrates the hybrid beamforming structure in terms of TXRUs and physical antennas.

FIG. 6 schematically illustrates the hybrid beamforming structure in terms of TXRUs and physical antennas.

According to the example of FIG. 6, the number of digital beams is L and the number of analog beams is N. Furthermore, the NR system considers support of more efficient beamforming for UEs located in a specific area by designing analog beamforming such that a base station can change analog beamforming in units of symbol.

Moreover, the NR system also considers introduction of a plurality of antenna panels to which independent hybrid beamforming is applicable when N specific TXRUs and N RF antennas are defined as a single antenna panel in the example of FIG. 6.

When a base station uses a plurality of analog beams as described above, an analog beam suitable for signal reception may be different for UEs, and thus a beam sweeping operation through which a plurality of analog beams to be applied by a base station are changed for respective symbols in a specific subframe (SF) for at least a synchronization signal, system information, and paging such that all UEs can have reception opportunities is considered.

Hereinafter, the beam sweeping operation for the synchronization signal and system information in a downlink transmission process will be described in more detail with reference to the drawing.

Figure 7:
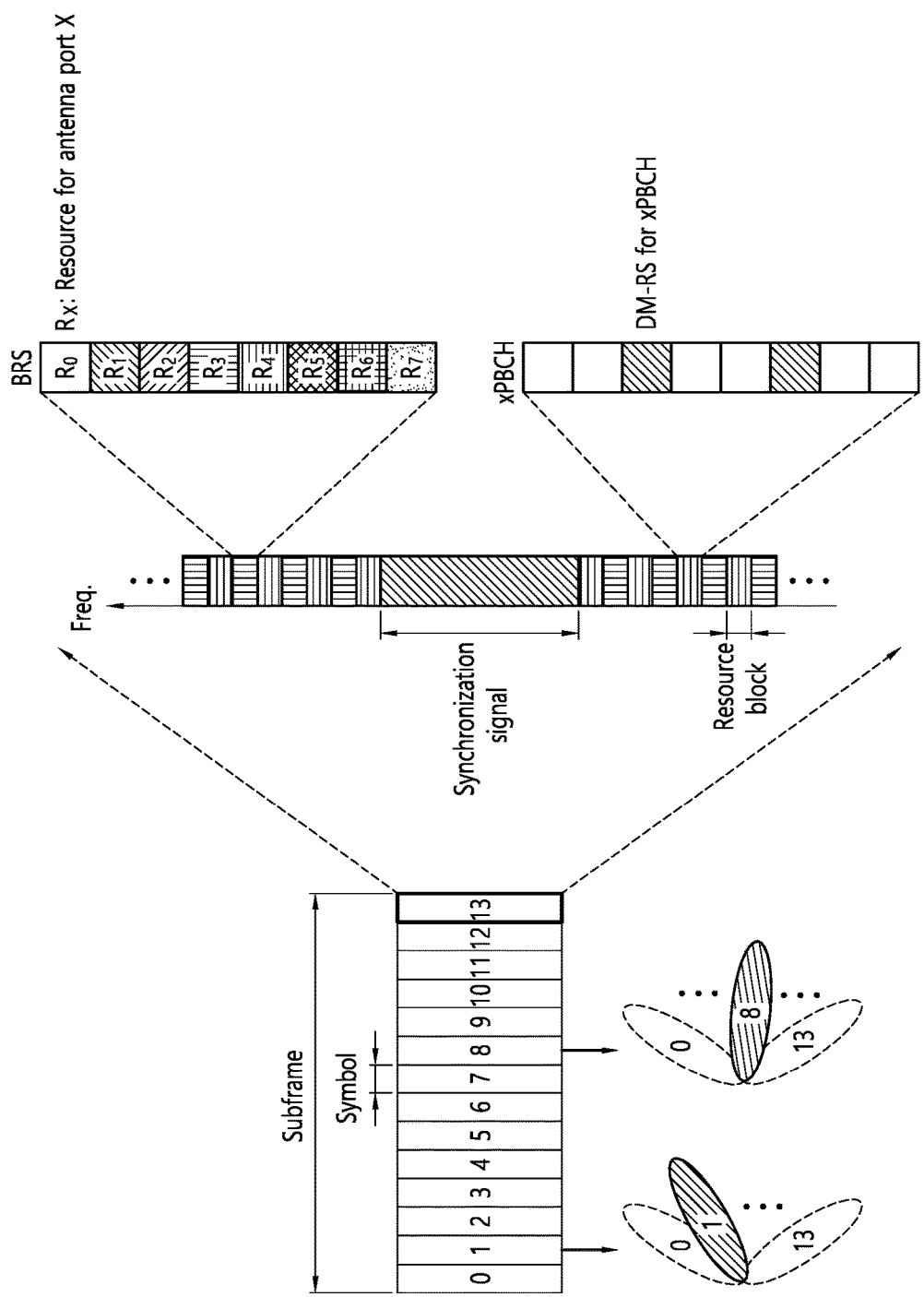
FIG. 7 schematically illustrates an example of the beam sweeping operation for the synchronization signal and system information in a downlink transmission process.

FIG. 7 schematically illustrates an example of the beam sweeping operation for the synchronization signal and system information in a downlink transmission process.

Referring to FIG. 7, physical resources (or a physical channel) through which system information of the NR system is transmitted in a broadcasting manner may be referred to as a physical broadcast channel (xPBCH).

Analog beams belonging to different antenna panels can be simultaneously transmitted in one symbol, and a beam reference signal (BRS) that is transmitted with a single analog beam (corresponding to a specific antenna panel) applied thereto in order to measure a channel per analog beam may be introduced.

The BRS can be defined for a plurality of antenna ports and each antenna port of the BRS can correspond to a single analog beam. Here, unlike the BRS, the synchronization signal or xPBCH can be transmitted with all analog beams in an analog beam group applied thereto such that an arbitrary UE can correctly receive the same.

Figure 8:
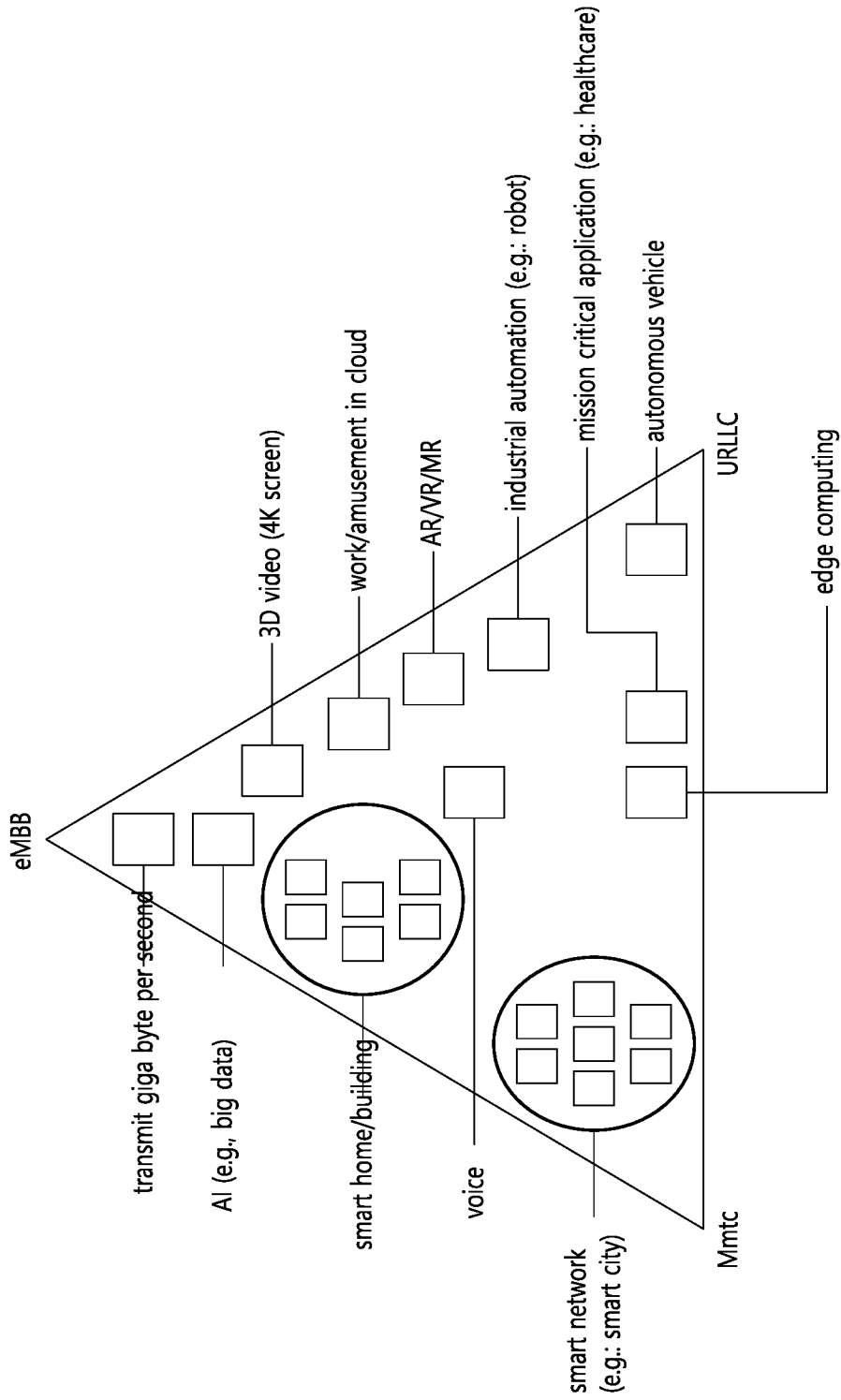
FIG. 8 shows examples of 5G usage scenarios to which the technical features of the present specification can be applied.

FIG. 8 shows examples of 5G usage scenarios to which the technical features of the present specification can be applied. The 5G usage scenarios shown in FIG. 8 are only exemplary, and the technical features of the present specification can be applied to other 5G usage scenarios which are not shown in FIG. 8.

Referring to FIG. 8, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 8 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Figure 9:
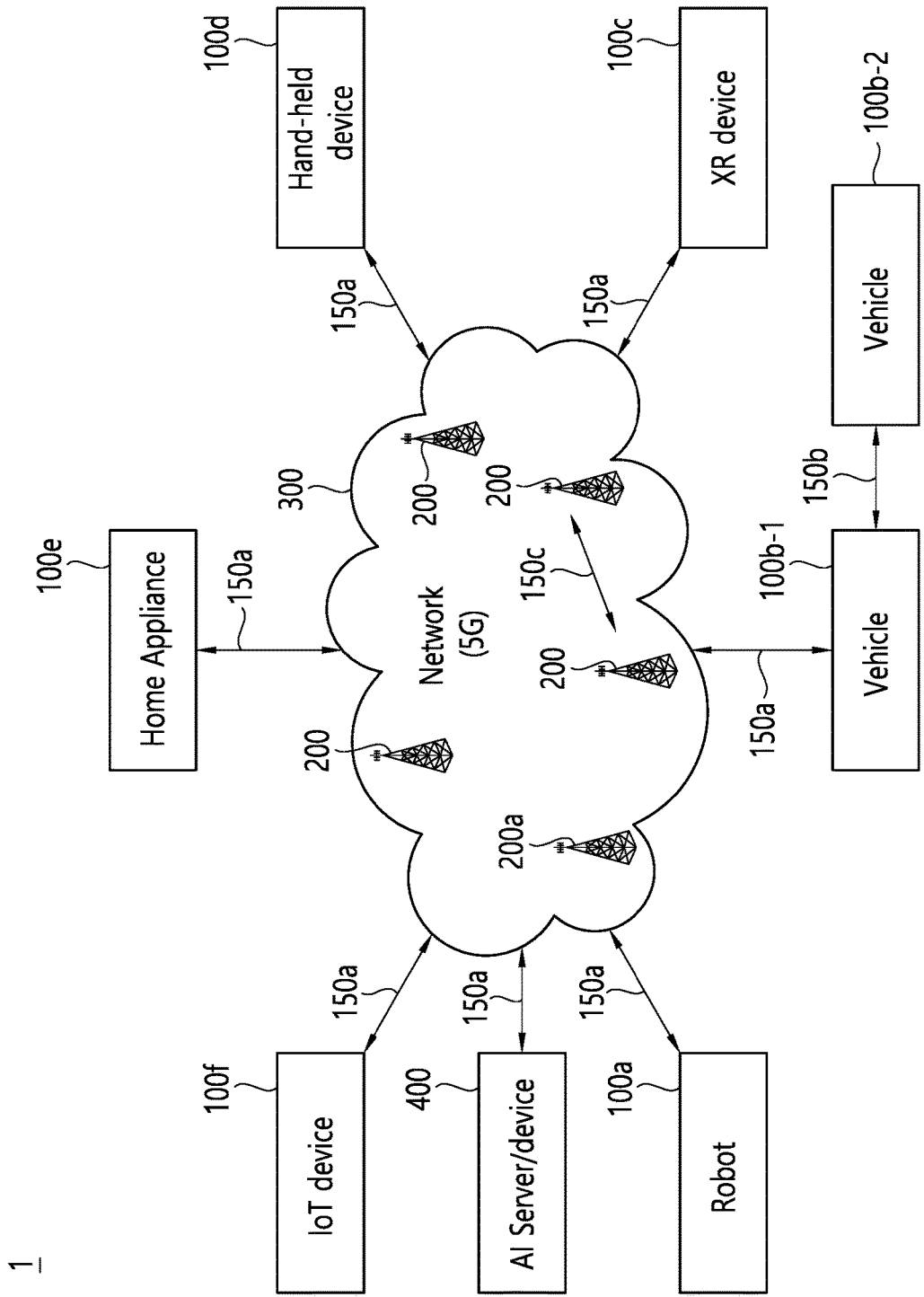
FIG. 9 shows an exemplary communication system (1), according to an embodiment of the present specification.

FIG. 9 shows an exemplary communication system (1), according to an embodiment of the present specification.

Referring to FIG. 9, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An Artificial Intelligence (AI) technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 10:
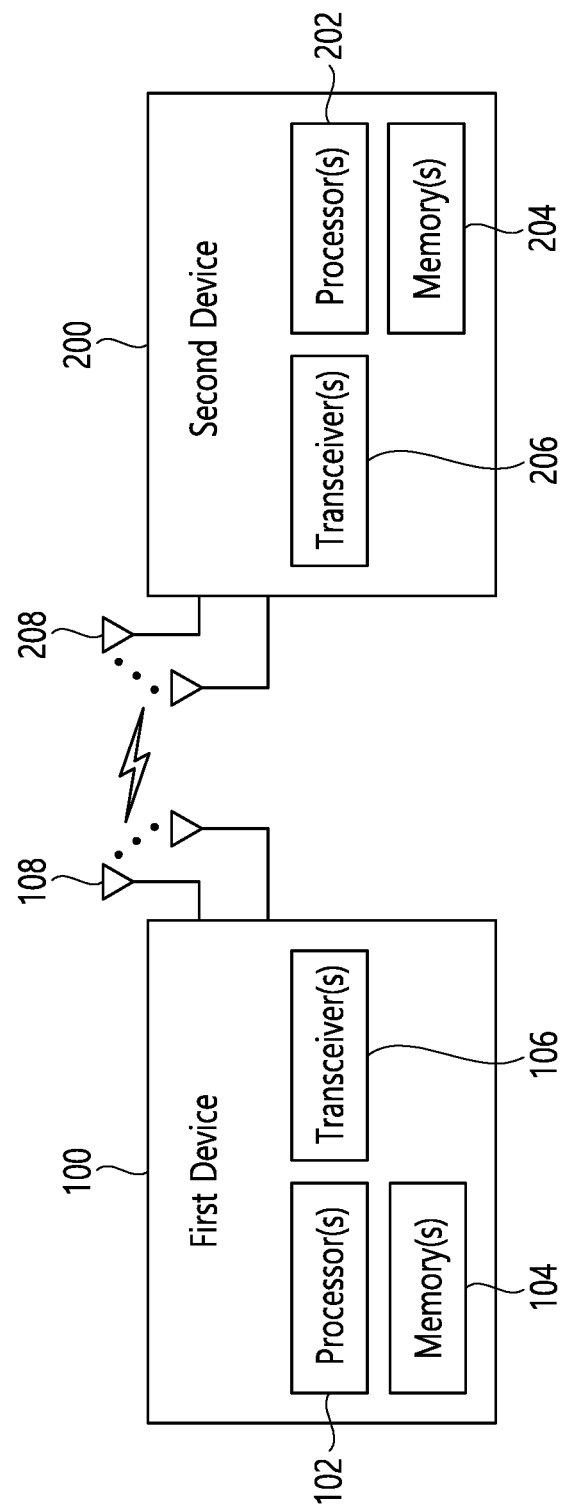
FIG. 10 shows an exemplary wireless device to which the present specification can be applied.

Hereinafter, an example of wireless devices to which the present specification is applied will be described in detail. FIG. 10 shows an exemplary wireless device to which the present specification can be applied.

Referring to FIG. 10, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 9.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing apart or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 11:
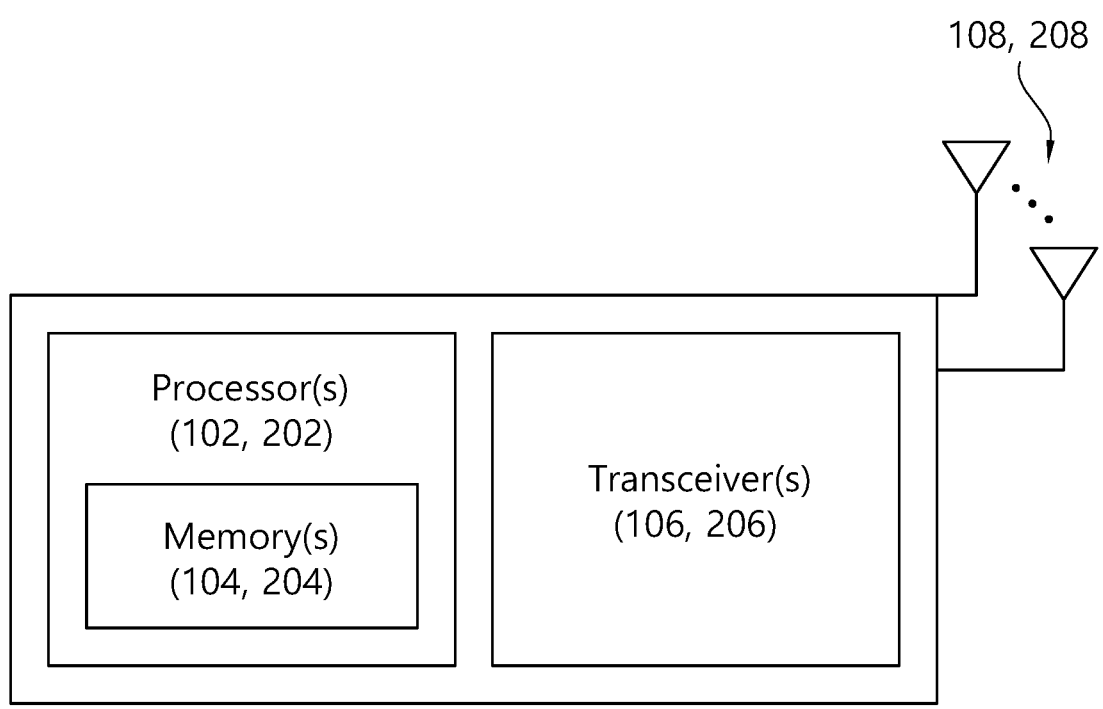
FIG. 11 shows another example of a wireless device applicable to the present specification.

FIG. 11 shows another example of a wireless device applicable to the present specification.

According to FIG. 11, the wireless device may include at least one processor (102, 202), at least one memory (104, 204), at least one transceiver (106, 206), and/or one or more antennas (108, 208).

As a difference between the example of the wireless device described above in FIG. 10 and the example of the wireless device in FIG. 11, in FIG. 10, the processors 102 and 202 and the memories 104 and 204 are separated, but in the example of FIG. 11, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Hereinafter, an example of a signal processing circuit to which the present specification is applied will be described in detail.

Figure 12:
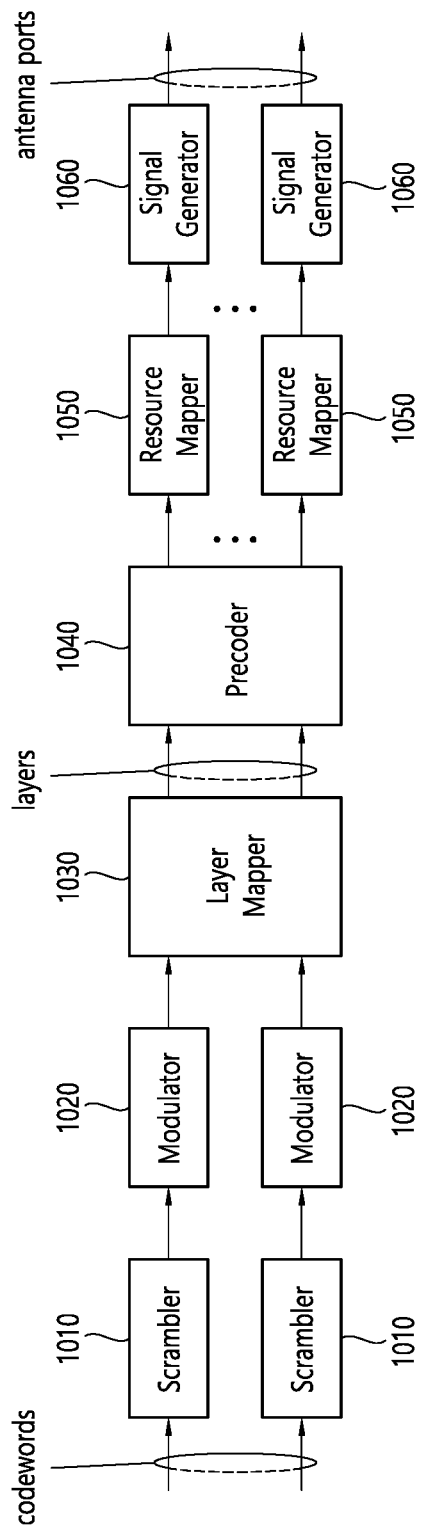
FIG. 12 shows a signal process circuit for a transmission signal according to an embodiment of the present specification.

FIG. 12 shows a signal process circuit for a transmission signal according to an embodiment of the present specification.

Referring to FIG. 12, a signal processing circuit (1000) may include scramblers (1010), modulators (1020), a layer mapper (1030), a precoder (1040), resource mappers (1050), and signal generators (1060). An operation/function of FIG. 12 may be performed, without being limited to, the processors (102, 202) and/or the transceivers (106, 206) of FIG. 10. Hardware elements of FIG. 12 may be implemented by the processors (102, 202) and/or the transceivers (106, 206) of FIG. 10. For example, blocks 1010~1060 may be implemented by the processors (102, 202) of FIG. 10. Alternatively, the blocks 1010~1050 may be implemented by the processors (102, 202) of FIG. 10 and the block 1060 may be implemented by the transceivers (106, 206) of FIG. 10.

Codewords may be converted into radio signals via the signal processing circuit (1000) of FIG. 12. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010~1060) of FIG. 12. For example, the wireless devices (e.g., 100, 200 of FIG. 10) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 13:
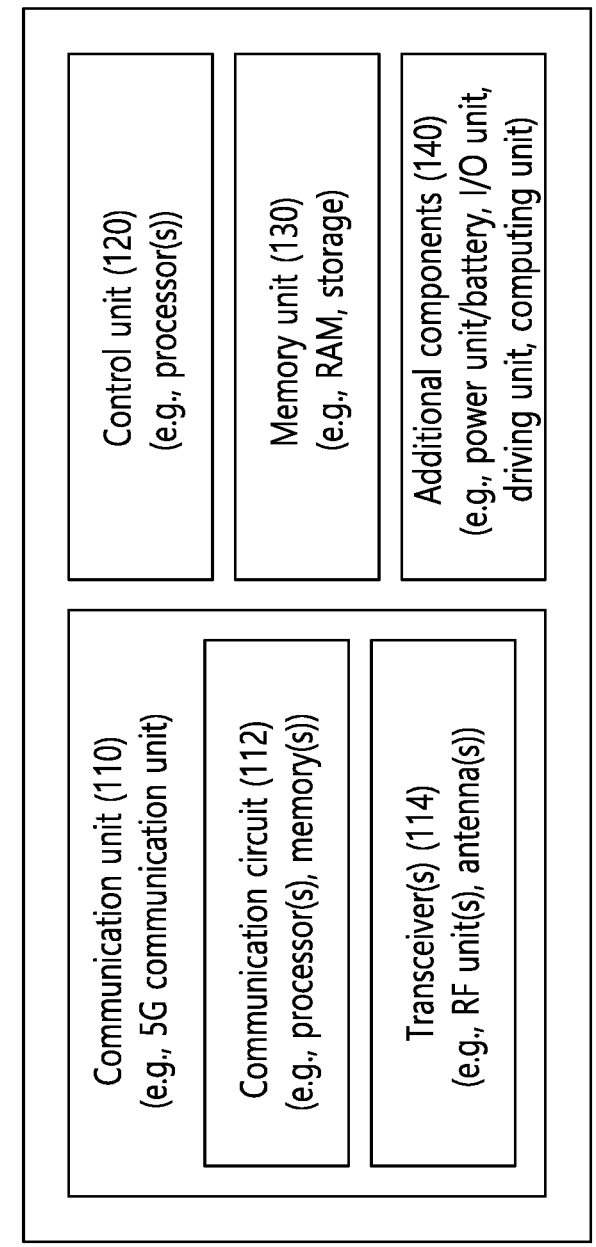
FIG. 13 shows another example of a wireless device according to an embodiment of the present specification.

FIG. 13 shows another example of a wireless device according to an embodiment of the present specification. The wireless device may be implemented in various forms according to a use-case/service (refer to FIG. 9).

Referring to FIG. 13, wireless devices (100, 200) may correspond to the wireless devices (100, 200) of FIG. 10 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 10. For example, the transceiver(s) (114) may include the one or more transceivers (106, 206) and/or the one or more antennas (108, 208) of FIG. 10. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 9), the vehicles (100b-1, 100b-2 of FIG. 9), the XR device (100c of FIG. 9), the hand-held device (100d of FIG. 9), the home appliance (100e of FIG. 9), the IoT device (100f of FIG. 9), a digital broadcast terminal, a hologram device, a public safety device, an MTC device, a medicine device, a fintech device (or a finance device), a security device, a climate/environment device, the AI server/device (400 of FIG. 9), the BSs (200 of FIG. 9), a network node, and so on. The wireless device may be used in a mobile or fixed place according to a usage-example/service.

In FIG. 13, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 13 will be described in detail with reference to the drawings.

Figure 14:
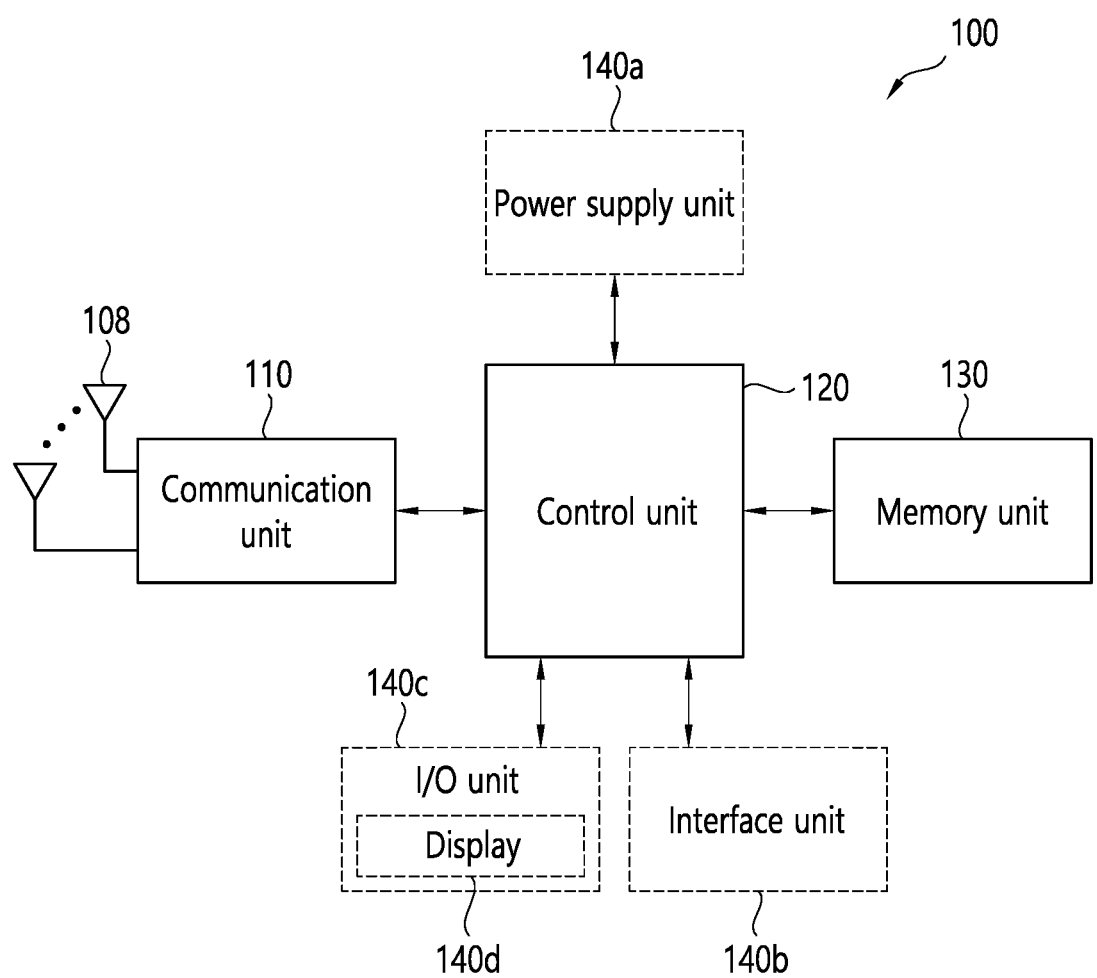
FIG. 14 shows a hand-held device to which the present specification is applied.

FIG. 14 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 14, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 13, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 15:
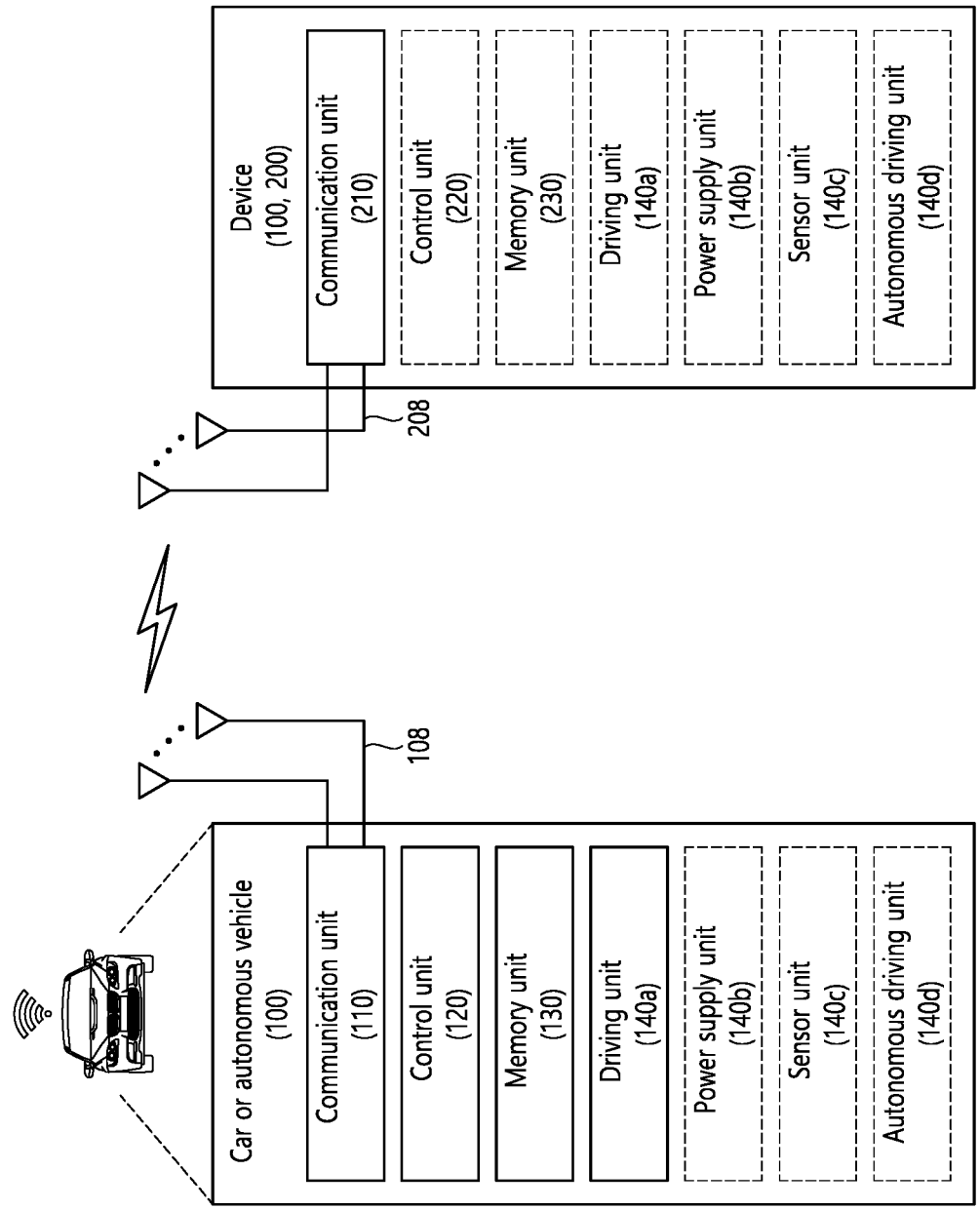
FIG. 15 shows a vehicle or an autonomous vehicle to which the present specification is applied.

FIG. 15 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 15, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 13, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 16:
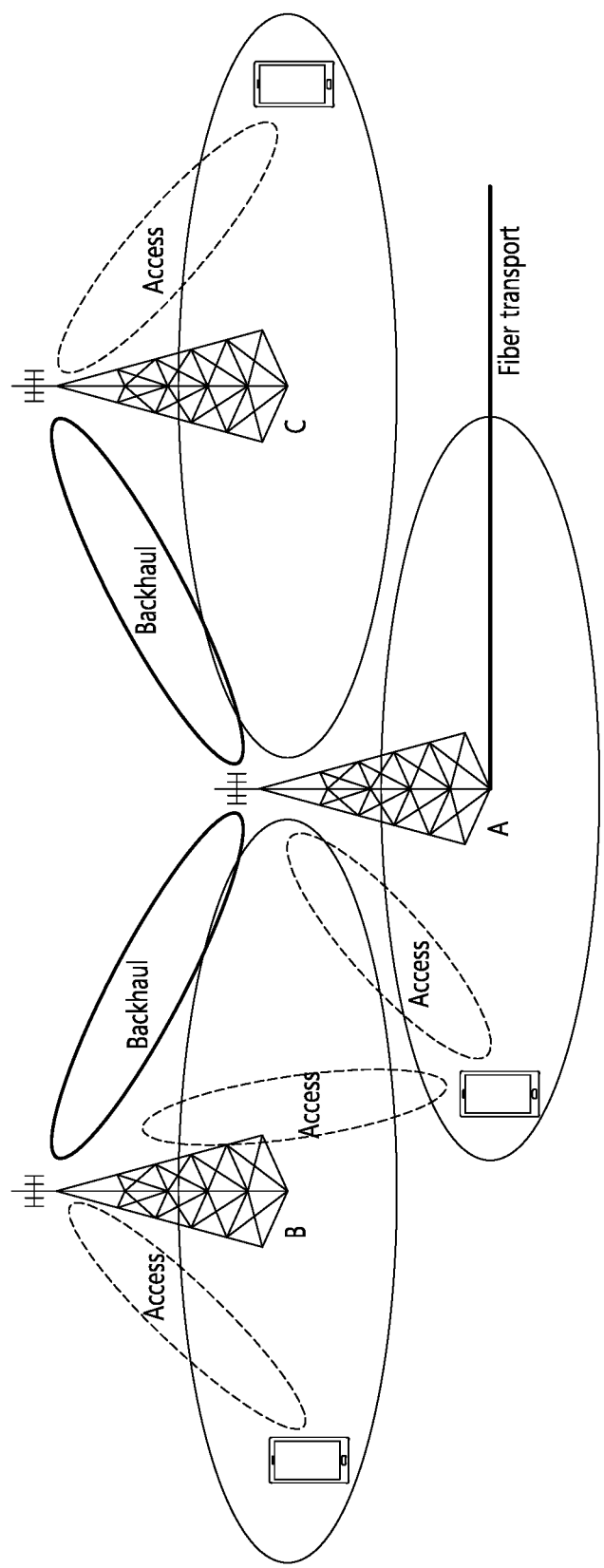
FIG. 16 schematically illustrates an example of integrated access and backhaul links.

FIG. 16 schematically illustrates an example of integrated access and backhaul links.

An example of a network having such integrated access and backhaul links is shown in FIG. 16. Here, a relay node (rTRP) can multiplex access and backhaul links in time, frequency or space (e.g., beam based operation).

Operations of different links may be at the same frequency or different frequencies (which may also be referred to as "in-band" and "out-band" relays). Although efficient support of the out-band relay is important in some NR deployment scenarios, it is very important to understand in-band operation requirements that mean a close interaction with an access link operating at the same frequency in order to accept duplex constraint and prevent/mitigate interference.

In addition, operation of an NR system in mmWave spectrum can present some unique challenges including experiencing serious short-term blocking that may not be easily mitigated by a current RRC based handover mechanism due to a larger time scale necessary to complete a procedure than short-term blocking.

To overcome short-term blocking in the mmWave system, a fast RAN based mechanism (which does not necessarily require intervention of a core network) for switching between rTRPs.

Necessity for mitigating short-term blocking for NR operation in the mmWave spectrum along with requirement for easier deployment of a self-backhauled NR cell may cause necessity of development of an integrated framework that enables rapid switching of access and backhaul links.

In addition, over-the-air (OTA) coordination between rTRPs can be regarded as mitigation of interference and support of end-to-end route selection and optimization.

The following requirements and aspects may need to be solved by integrated access and backhaul (IAB) for NR.

Efficient and flexible operation for in-band and out-band relays in indoor and outdoor scenarios Multiple hops and redundant connection End-to-end route selection and optimization Support of backhaul link with high spectrum efficiency Legacy NR UE support Legacy new RAT was designed to support half-duplex devices. Further, half-duplex of an IAB scenario deserves to be supported and to become an object. In addition, a full-duplex IAB device can be researched.

In the IAB scenario, a donor gNB (DgNB) needs to schedule all links between related relay nodes (RNs) and UEs unless each RN has scheduling capability. In other words, the DgNB can collect traffic information in all related RNs, determine schedules with respect to all links and then notify each RN of schedule information.

Figure 17:
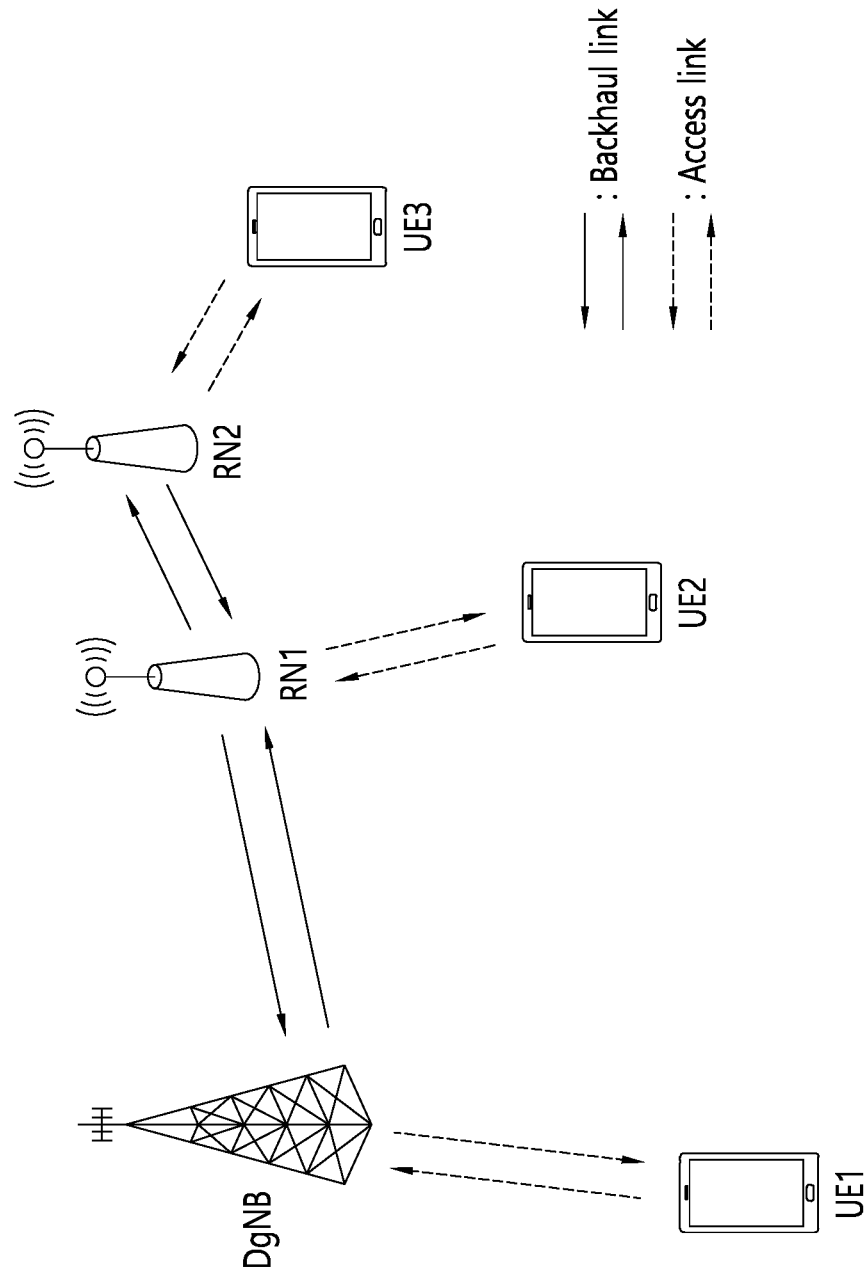
FIG. 17 schematically illustrates an example of a link between a DgNB, an RN, and a UE.

FIG. 17 schematically illustrates an example of a link between a DgNB, an RN, and a UE.

According to FIG. 17, for example, a link between DgNB and UE1 is an access link (access link), a link between RN1 and UE2 is also an access link, and a link between RN2 and UE3 may also mean an access link.

Similarly, according to FIG. 17, for example, a link between DgNB and RN1 and a link between RN1 and RN2 may mean a backhaul link.

For example, backhaul and access links can be configured, and in this case, the DgNB can receive scheduling requests of UE 2 and UE 3 as well as a scheduling request of UE 1. Then, the DgNB can determine scheduling of two backhaul links and three access links and signal the scheduling result. Accordingly, this centralized scheduling includes delayed scheduling and waiting time problems.

On the other hand, distributed scheduling can be performed if each RN has scheduling capability. Then, immediate scheduling can be performed for an uplink scheduling request of a UE and backhaul/access links can be used more flexibly in response to surrounding traffic conditions.

Figure 18:
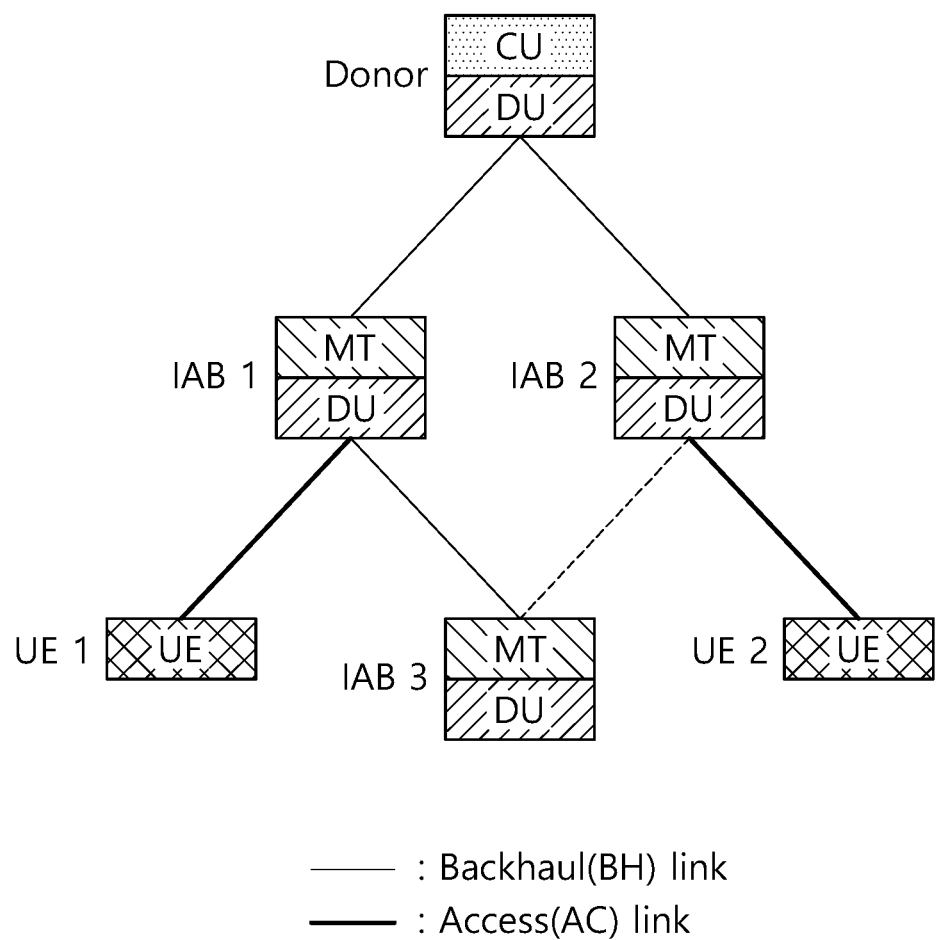
FIG. 18 schematically shows an example of a backhaul link and an access link.

FIG. 18 schematically shows an example of a backhaul link and an access link.

As shown in FIG. 18, a link between a donor node and an IAB node or a link between IAB nodes is called a backhaul link. On the other hand, the link between the donor node and the UE or the link between the IAB node and the UE is called an access link. That is, a link between an MT and a parent DU or a link between a DU and a child MT may be referred to as a backhaul link, and a link between the DU and the UE may be referred to as an access link.

Figure 19:
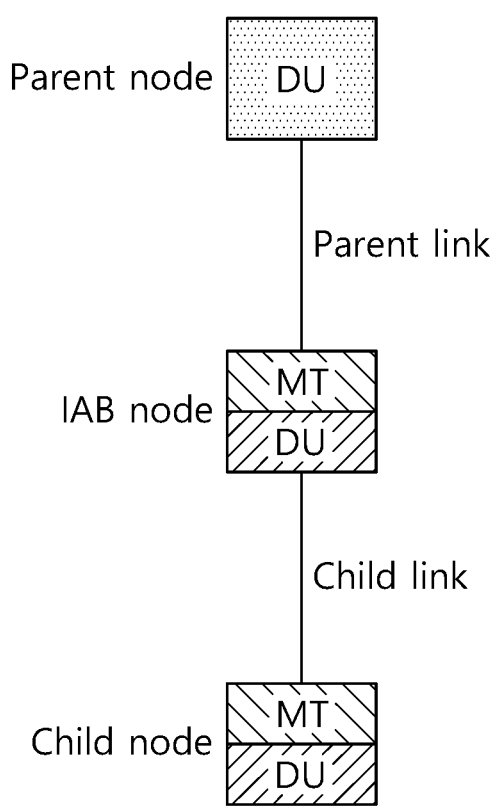
FIG. 19 schematically shows an example of a parent link and a child link.

FIG. 19 schematically shows an example of a parent link and a child link.

As shown in FIG. 19, the link between the IAB node and the parent node is called a parent link, and the link between the IAB node and the child node/UE is called a child link. That is, the link between the MT and the parent DU is called a parent link, and the link between the DU and the child MT/UE is called a child link.

However, depending on the interpretation or perspective, the link between the IAB node and the parent node is called a backhaul link, and the link between the IAB node and the child node/UE is also called an access link.

Hereinafter, the Proposal of the Present Specification Will be Described.

The IAB node may receive a slot format configuration for communication with a parent node and a slot format configuration for communication with a child node/access UE.

As described above, the IAB node is configured with MT and DU, resource configuration for the MT to communicate with the parent node(s) is called MT configuration, and resource configuration for the DU to communicate with the child node(s) and the access UE(s) is referred to as a DU configuration.

More specifically, MT configuration may indicate link direction information for a parent link between the parent node and itself for the IAB node to communicate with the parent node. In addition, the DU configuration may indicate link direction and link availability information for a child link between the child node/access UE and itself for the IAB node to communicate with the child node and the access UE.

Considering the characteristic of sharing resources in the TDM method between the MT and the DU in the IAB node, the present specification proposes a characteristic that such link availability configuration should have in detail. Also, a method for determining link availability between an MT and a DU based on a link availability configuration is proposed.

Additional advantages, objects, and features of the present specification will be set forth in part in the description that follows, and will become apparent to those skilled in the art upon reviewing the following, or may be learned, in part, from the practice of the present specification. The objects and other advantages of the present specification may be realized and attained by means of the appended drawings as well as the claims and structures particularly pointed out in the claims.

The terms used in this specification may be as follows.

IAB node (IAB-node): a RAN node that supports radio access to the terminal(s) and supports wireless backhaul of access traffic.

IAB donor (IAB-donor): a RAN node that provides the UE's interface to the core network and wireless backhaul function to the IAB node(s).

Hereinafter, each abbreviation may correspond to an abbreviation of the following terms.

IAB: Integrated Access and Backhaul

CSI-RS: Channel State Information Reference Signal

DgNB: Donor gNB

AC: Access

BH: Backhaul

DU: Distributed Unit

MT: Mobile terminal

CU: Centralized Unit

IAB-MT: IAB mobile terminal

NGC: Next-Generation Core network

SA: Stand-alone

NSA: non-stand-alone

EPC: Evolved Packet Core

The configuration, operation, and other features of the present specification may be understood by the embodiments of the present specification described with reference to the accompanying drawings.

The content of the present specification is described assuming an in-band environment, but may be applied in an out-band environment. In addition, the content of the present specification is described in consideration of the environment in which the donor gNB (DgNB), the relay node (RN), and the UE perform a half-duplex operation, but it may also be applied in an environment in which a donor gNB (DgNB), a relay node (RN), and/or a UE performs a full-duplex operation.

In this specification, for convenience of description, when RN1 and RN2 exist, when RN1 is connected to RN2 by a backhaul link and relays data transmitted/received to RN2, RN1 is called the parent node of RN2 and RN2 is referred to as a child node RN of RN1.

The discovery signal referred to in this specification is a signal transmitted by the IAB node, it means a signal transmitted to enable other IAB nodes or UEs to discover the IAB itself.

Such a discovery signal may have the form of an SSB, a form of a CSI-RS of the NR specification or a form of a signal introduced into another existing NR. Or it may be a newly designed signal.

The content of the present specification mainly describes the content of the IAB node discovering other IAB nodes, but may also be applied when the UE discovers the IAB nodes.

On the other hand, from the IAB node MT point of view, the time domain resource (s) of the following type (s) may be indicated for the parent link.
  Downlink time resources;
  Uplink time resources;
  Flexible time resources.

From an IAB node DU perspective, a child link may have time domain resource(s) of the following type(s).
  Downlink time resource;
  Uplink time resource;
  Flexible time resources;
  Unavailable time resource(s) (resource(s) not used for communication on DU child link(s)).

Downlink, uplink, flexible time resource type(s) of the DU child link may belong to one of the following two categories.
  Hard: this time resource is always available for DU child links;
  Soft: The availability of a corresponding time resource for a DU child link may be explicitly and/or implicitly controlled by the parent node.

From the IAB node DU point of view, the child link has four types of time resources: downlink (DL), uplink (UL), flexible (F) and not available (NA). Here, the not available resource may mean that the resource is not used for communication on the DU child link(s).

Each of the downlink, uplink and flexible time resources of the DU child link may be a hard or soft resource. As described above, the hard resource may mean that communication is always possible in the DU child link. However, in the case of soft resources, communication availability in the DU child link may be explicitly and/or implicitly controlled by the parent node.

In such a situation, the configuration on the link direction (DL/UL/F/NA) and link availability (hard/soft) of the time resource for the DU child link may be named DU configuration.

This configuration can be used for effective multiplexing and interference processing among IAB node(s). For example, this configuration can be used to indicate which link is valid for the time resource between the parent link and the child link.

In addition, configuring only a subset of the child node(s), since it can utilize time resources for DU operation, it can be used to adjust interference among the child node(s).

Considering this aspect, the DU configuration may be more effective when the DU configuration is semi-static and can be configured specifically for the IAB node.

On the other hand, similar to the SFI configuration for the access link, the IAB node MT may have three types of time resources for the parent link: downlink (DL), uplink (UL) and flexible (F).

Figure 20:
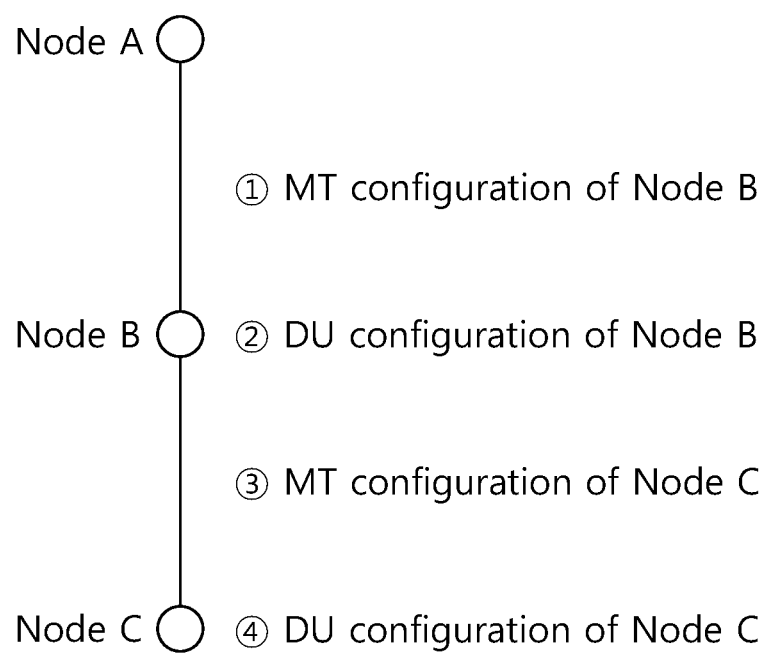
FIG. 20 schematically shows a configuration between nodes.

FIG. 20 schematically shows a configuration between nodes.

As in ① of FIG. 20, the IAB node receives MT configuration that informs the link direction information for the parent link between the parent node and itself for communication with the parent node. In addition, as in ② of FIG. 20, it receives a DU configuration that informs the link direction and link use availability information that can be used for communication to its own child link.

Figure 21:
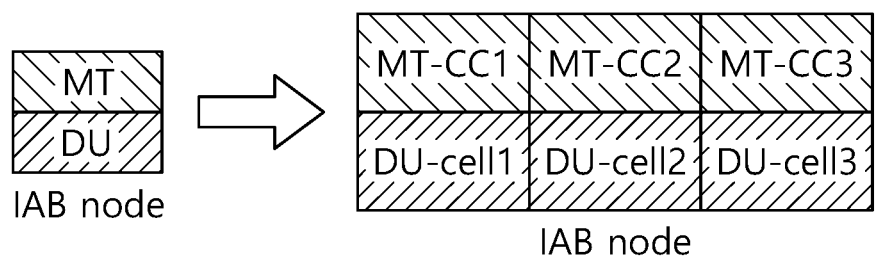
FIG. 21 schematically shows an example in which the MT and DU of the IAB node are configured with a plurality of CCs.

FIG. 21 schematically shows an example in which the MT and DU of the IAB node are configured with a plurality of CCs.

According to FIG. 21, the MT and DU of the IAB node may be configured with a plurality of CC (component carrier). In this case, different CCs may operate in the same or different frequency domains or use the same or different panels. For example, as shown in FIG. 21, each of the MT and the DU in the IAB node may have three CCs. In the drawing, three CCs existing in the MT are called MT-CC1, MT-CC2, and MT-CC3, respectively. In the case of DU, CC is replaced with a cell and is called DU-Cell1, DU-Cell2, and DU-Cell3.

In this case, between the specific CC of the MT and the specific cell of the DU, one of TDM, SDM/FDM, and FD multiplexing scheme may be applied. For example, when a specific MT-CC and a DU-cell are located in different inter-band frequency domains, FD may be applied between the corresponding MT-CC and the DU-cell. On the other hand, the TDM scheme may be applied between the MT-CC and the DU-CC located in the same frequency domain. FIG. 21, MT-CC1, MT-CC2, DU-cell1, DU-cell2 have f1 as a center frequency, and MT-CC3 and DU-cell3 have f2 as a center frequency, f1 and f2 may be located within an inter-band of each other. In this case, in the position of MT-CC1 (or the position of MT-CC2), it operates by TDM with DU-cell 1 and DU-cell 2, but may operate in FD with DU-cell 3. On the other hand, from the standpoint of MT-CC3, it operates in FD with DU-cell 1 and DU-cell 2, but can operate in TDM with DU-cell 3.

On the other hand, another multiplexing scheme between MT and DU may be applied even within the same CC. For example, a plurality of parts may exist in the MT-CC and/or the DU-cell. Such a part may refer to, for example, an antenna having the same center frequency but a different physical location or a link transmitted through different panels.

Or, for example, the center frequency may mean a link transmitted through the same but different BWP. In this case, for example, when two parts exist in DU-cell 1, a multiplexing type operating with a specific MT-CC or a specific part within a specific MT-CC may be different for each part. The content of the following specification describes a case in which the multiplexing type applied to each pair of the MT's CC and the DU's cell may be different, but the content of the specification can be extended and applied even when MT and DU are divided into a plurality of parts and the multiplexing type applied to each pair of CC and part of MT and cell and part of DU may be different.

On the other hand, it may be considered that one IAB node is connected to two or a plurality of parent nodes. In this case, the IAB MT may be connected to two parent DUs using a dual-connectivity scheme.

The IAB node may have redundant route(s) to the IAB donor CU. For IAB node(s) operating in SA mode, NR DC can be used to enable path redundancy in BH by allowing IAB-MT to have BH RLC channel(s) simultaneously with two parent nodes.

A parent node may have to connect to the same IAB donor CU-CP that controls the establishment and release of redundant route(s) through two parent nodes.

A parent node can acquire the roles of a master node and a secondary node of the IAB-MT together with the IAB donor CU. The NR DC framework (e.g. MCG/SCG-related procedures) may be used to configure a dual radio link with the parent node(s).

Meanwhile, in the specification to be described later, the term 'gap' previously used may be used interchangeably with the term 'guard'. Accordingly, in the embodiments to be described later (and/or in the aforementioned embodiments), the terms 'gap' and 'guard' will be used interchangeably.

The examples described above can be summarized and explained once again as follows. Hereinafter, for convenience of understanding of the above-described examples, examples of the above-described examples will be once again described with reference to the drawings.

Hereinafter, for a better understanding of the examples of the present specification, the disclosure of the present specification will be described with reference to the drawings. The following drawings were created to explain a specific example of the present specification. The names of specific devices described in the drawings or the names of specific signals/messages/fields are presented by way of example, so that the technical features of the present specification are not limited to the specific names used in the following drawings.

Figure 22:
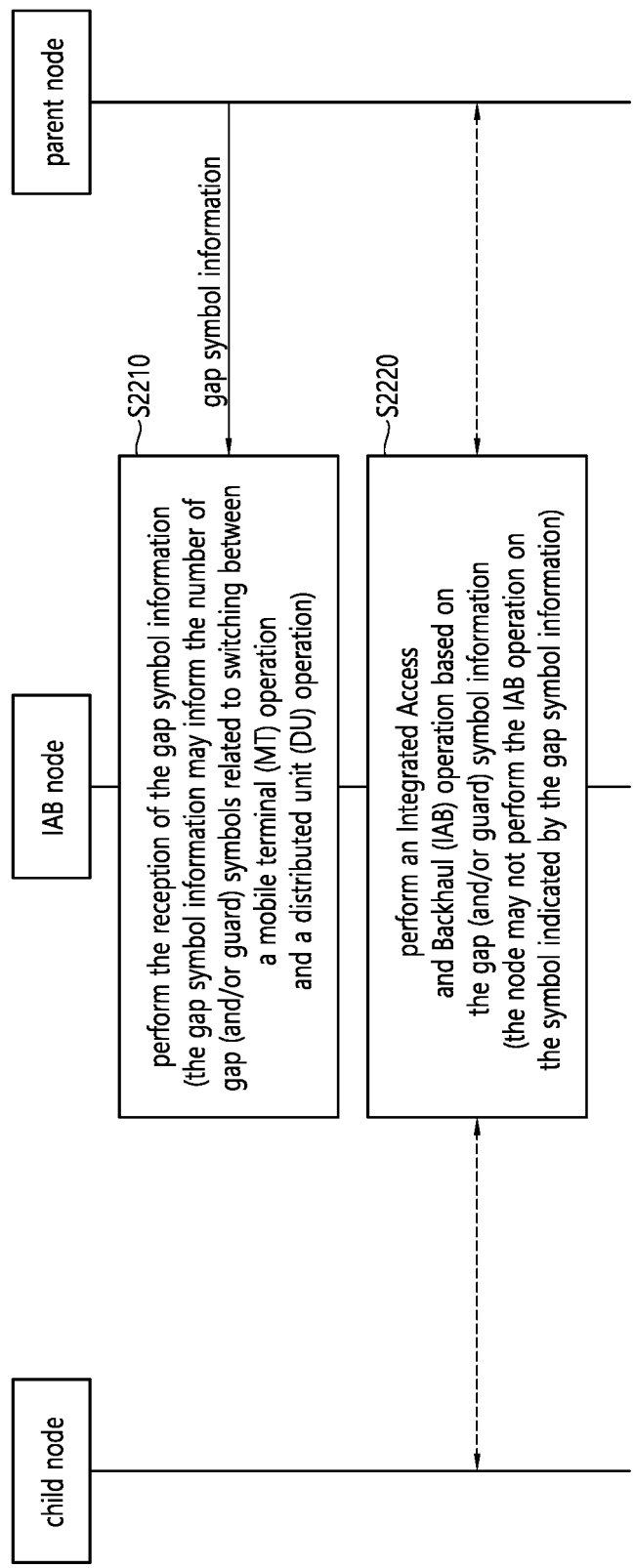
FIG. 22 is a flowchart of a method for performing reception of gap symbol information, according to an embodiment of the present specification.

FIG. 22 is a flowchart of a method for performing reception of gap symbol information, according to an embodiment of the present specification.

According to FIG. 22, the (IAB) node may perform the reception of the gap (and/or guard) symbol information (S2210). Here, the gap (and/or guard) symbol information may inform the number of gap (and/or guard) symbols related to switching between a mobile terminal (MT) operation and a distributed unit (DU) operation.

For example, the node may be a node supporting the MT operation and the DU operation. Since a more specific embodiment is the same as that described above (and will be described later), repeated description of overlapping content will be omitted for convenience of description.

For example, the MT operation may be an operation related to communication between the node and a parent node, and the DU operation may be an operation related to communication between the node and a child node or communication between the node and a terminal. Since a more specific embodiment is the same as that described above (and will be described later), repeated description of overlapping content will be omitted for convenience of description.

For example, although more specific content will be described later, the gap (and/or guard) symbol information may be the same as the example in the table below.

Here, as described above, the DU downlink may mean DU TX, and the DU uplink may mean DU RX. In addition, the MT downlink may mean MT RX, and MT uplink may mean MT TX. In the example in Table 6 above, the number of gap (and/or guard) symbols may be defined for the case of switching from the DU operation to the MT operation and the case of switching from the MT operation to the DU operation. The example in Table 6 may be described in another form as follows.

For example, the information about the gap (and/or guard) symbol may include first information and second information. Since a more specific embodiment is the same as that described above (and will be described later), repeated description of overlapping content will be omitted for convenience of description.

Here, the first information (for example, in Table 6, information about the number of gap (and/or guard) symbols 1, information about the number of gap (and/or guard) symbols 2, information about the number of gap (and/or guard) symbols 3, information about the number of gap (and/or guard) symbols 4; in Table 7, number of gap (and/or guard) symbols 1 (NmbGS1), number of gap (and/or guard) symbols 2 (NmbGS2), number of gap (and/or guard) symbols 3 (NmbGS3), number of gap (and/or guard) symbols 4 (NmbGS4)) may be information about the number of gap (and/or guard) symbols for the transition from the MT operation to the DU operation. Since a more specific embodiment is the same as that described above (and will be described later), repeated description of overlapping content will be omitted for convenience of description.

Also, here, the second information (for example, in Table 7, information about the number of gap (and/or guard) symbols 5, information about the number of gap (and/or guard) symbols 6, information about the number of gap (and/or guard) symbols 7, information about the number of gap (and/or guard) symbols 8; in Table 7, number of gap (and/or guard) symbols 5 (NmbGS5), number of gap (and/or guard) symbols 6 (NmbGS6), number of gap (and/or guard) symbols 7 (NmbGS7), number of gap (and/or guard) symbols 8 (NmbGS8)) may be information about the number of gap (and/or guard) symbols for the transition from the DU operation to the MT operation. Since a more specific embodiment is the same as that described above (and will be described later), repeated description of overlapping content will be omitted for convenience of description.

Here, the MT operation may include at least one of MT TX (transmission) and MT RX (reception), and the DU operation may include at least one of DU TX and DU RX. Since a more specific embodiment is the same as that described above (and will be described later), repeated description of overlapping content will be omitted for convenience of description.

A specific example of this can be explained through a table as follows. Expressing this in another form, it can be defined as shown in Table 7 below.

TABLE 6

|  | MT downlink | MT uplink |
| --- | --- | --- |
| DU downlink | information about the number of gap symbols 1 | information about the number of gap symbols 2 |
| DU uplink | information about the number of gap symbols 3 | information about the number of gap symbols 4 |

TABLE 7

| MT to DU | DL Tx | UL Rx |
|---|---|---|
| DL Rx | information about the number of gap symbols 1 | information about the number of gap symbols 2 |
| UL Tx | information about the number of gap symbols 3 | information about the number of gap symbols 4 |

| DU to MT | DL Rx | UL Tx |
|---|---|---|
| DL Tx | information about the number of gap symbols 5 | information about the number of gap symbols 6 |
| UL Rx | information about the number of gap symbols 7 | information about the number of gap symbols 8 |

In addition, if the above-described gap (and/or guard) symbol information is expressed in another form, it may be defined again as the following table.

TABLE 8

| Switching scenario | | Field for number of guard symbols in MAC CE |
|---|---|---|
| IAB-MT operation to IAB-DU operation | DL Rx to DL Tx | the number of gap symbols 1(NmbGS1) |
| | DL Rx to UL Rx | the number of gap symbols 2(NmbGS2) |
| | UL Tx to DL Tx | the number of gap symbols 3(NmbGS3) |
| | UL Tx to UL Rx | the number of gap symbols 4(NmbGS4) |
| IAB-DU operation to IAB-MT operation | DL Tx to DL Rx | the number of gap symbols 5(NmbGS5) |
| | DL Tx to UL Tx | the number of gap symbols 6(NmbGS6) |
| | UL Rx to DL Rx | the number of gap symbols 7(NmbGS7) |
| | UL Rx to UL Tx | the number of gap symbols 8(NmbGS8) |

An example of the gap (and/or guard) symbol information described above may be described again as follows. For example, the first information may inform at least one of information on the number of gap (and/or guard) symbols for the transition from the MT RX to the DU TX, information on the number of gap (and/or guard) symbols for the transition from the MT RX to the DU RX, information on the number of gap (and/or guard) symbols for the transition from the MT TX to the DU TX, or information on the number of gap (and/or guard) symbols for the transition from the MT TX to the DU RX. Since a more specific embodiment is the same as that described above (and will be described later), repeated description of overlapping content will be omitted for convenience of description.

For example, the second information informs at least one of information on the number of gap (and/or guard) symbols for the transition from the DU TX to the MT RX, information on the number of gap (and/or guard) symbols for the transition from the DU TX to the MT TX, information on the number of gap (and/or guard) symbols for the transition from the DU RX to the MT RX, or information on the number of gap (and/or guard) symbols for the transition from the DU RX to the MT TX. Since a more specific embodiment is the same as that described above (and will be described later), repeated description of overlapping content will be omitted for convenience of description.

For example, the node may receive the gap (and/or guard) symbol information (e.g., provided gap (and/or guard) symbol information) from a parent node. Since a more specific embodiment is the same as that described above (and will be described later), repeated description of overlapping content will be omitted for convenience of description.

On the other hand, as described above, the gap (and/or guard) symbol information may be based on the MAC CE.

The node may perform an Integrated Access and Backhaul (IAB) operation based on the gap (and/or guard) symbol information (S2220). Here, for example, the node may not perform the IAB operation (e.g., corresponding to the MT operation and/or the DU operation) on the symbol indicated by the gap (and/or guard) symbol information.

Here, for example, when the node receives the gap (and/or guard) symbol information, it may indicate the number of gap (and/or guard) symbols to a lower layer (e.g., PHY layer) (of the node). Since a more specific embodiment is the same as that described above (and will be described later), repeated description of overlapping content will be omitted for convenience of description.

On the other hand, the gap (and/or guard) symbol may be an unused symbol based on the transition between the MT operation and the DU operation. Here, the term "transition" may be used interchangeably with the term "switching".

For example, as described above, when the number of gap (and/or guard) symbols (GS) has a positive number, it may mean that the MT operates as follows.

When the DU is switched in the MT operation to start the DU operation from symbol #n, the MT does not use as many symbols as |GS| before symbol #n as the MT timing reference.

When the DU switches to the MT operation after performing the DU operation up to symbol #n, the MT does not use as many symbols as |GS| after symbol #n as the MT timing reference.

Based on this, when explaining the gap (and/or guard) symbol, the gap (and/or guard) symbol may mean a symbol that is not used in the IAB node MT in the slot(s) in which the IAB node transitions between the IAB node MT and the IAB node DU. Since a more specific embodiment is the same as that described above (and will be described later), repeated description of overlapping content will be omitted for convenience of description.

For example, the node may transmit desired gap (and/or guard) symbol information to the parent node. Here, for example, the desired gap (and/or guard) symbol information may inform the number of gap (and/or guard) symbols for each combination of the MT operation and the DU operation desired by the node. Since a more specific embodiment is the same as that described above (and will be described later), repeated description of overlapping content will be omitted for convenience of description.

In this example, an example in which a parent node transmits gap (and/or guard) symbol information to a child node (for example, a method in which a child node transmits gap (and/or guard) symbol information to a parent node, and in response, the parent node transmits gap (and/or guard) symbol information (to be applied) to the child node in response) has been mainly described. An example in which a parent node indicates gap (and/or guard) symbol information to a child node may correspond to an example of a kind of feedback method. On the other hand, a companionship relationship does not necessarily exist between an example in which the MT transmits information about the number of guard symbols (and/or gap values) to the parent node and an example in which the parent node transmits information about the number of guard symbols (and/or gap values) (to be applied to the MT) to the MT. That is, an embodiment in which the MT transmits information on the number of guard symbols (and/or gap values) to the parent node and an example in which the parent node transmits information about the number (and/or gap value) of guard symbols (to be applied to the MT) to the MT may operate as a separate embodiment.

Of course, as a natural example, an example in which the parent node transmits information about the number (and/or gap value) of the guard symbols (to be applied to the MT) to the MT after the MT transmits information about the number of guard symbols (and/or gap values) to the parent node also corresponds to the example provided by this specification.

On the other hand, this embodiment can be implemented together with the examples described above (and to be described later) in combination with timing criteria to establish link availability, determining the link availability of the MT (DU) with the link availability information of the DU (MT), switching time between DU operation and MT operation, operation in the time resource between the UL resource and the DL resource of the MT, resource availability determination method, and/or setting for the number of specific guard symbol (s), etc. (of course, this embodiment can also be practiced independently of other embodiments).

Hereinafter, an example of the present embodiment will be described in more detail.

Link Availability Determination

Information on link availability can inform the MT, inform the DU, or inform each of the MT and the DU of the IAB node.

When the link availability information is configured to the DU, the link availability information may include all or part of the following types.

Hard (H): The corresponding time resource is always available for the DU child link.
Soft (S): The availability of the corresponding time resource for the DU child link is explicitly and/or implicitly controlled by the parent node.
Not available (NA): Resources not to be used for communication on the DU child links.

When the link availability information is configured to the MT, each link availability type may mean the following.

Hard (H): The corresponding time resource is always available for the MT parent link.
Soft (S): The availability of the corresponding time resource for the MT parent link is explicitly and/or implicitly controlled by the parent node.
Not available (NA): Resources not to be used for communication on the MT parent link.

When the link availability information is configured to the IAB DU, the link availability type of the IAB DU may be informed in units of OFDM symbols/slots. Based on this, the IAB node may determine a time resource that can be used for the operation of the IAB MT. Conversely, when the link availability information is configured to the IAB MT, the link availability type of the IAB MT may be informed in units of OFDM symbols/slots. Based on this, the IAB node may determine a time resource that can be used for the operation of the IAB DU.

1. Timing Criteria to Configure Link Availability

When configuring link availability information to the IAB DU (or to the MT), the reference of timing for configuring link availability may be as follows. When the link availability information is configured to the IAB MT, the DU may be interpreted as being replaced with the MT in the following content.

(a) It is possible to configure time resource information that can be used by the DU based on the DL timing of the DU. For example, when OFDM symbols #4 to #7 are available for DU, based on the DL timing of the DU, the time domain in which OFDM symbols #4 to #7 are located becomes a time resource usable by the DU.

(b) It is possible to configure time resource information that can be used by the DU based on the UL timing of the DU. For example, when OFDM symbols #4 to #7 are available for DU, based on the UL timing of the DU, the time domain in which OFDM symbols #4 to #7 are located becomes a time resource usable by the DU.

(c) It is possible to configure time resource information that can be used by the DU based on a timing that matches the link direction configuration of the DU. For example, when OFDM symbols #4 to #7 are assumed to be available for DU, OFDM symbols #4 and #5 are downlink resources, and OFDM symbols #6 and #7 are uplink resources, time resources corresponding to OFDM symbols #4 and #5 based on DL timing and time resources corresponding to OFDM symbols #6 and #7 based on UL timing are time resources usable by DU.

(d) It is possible to configure time resource information that can be used by the DU based on the DL timing of the MT. For example, when OFDM symbols #4 to #7 are available for DU, based on the DL timing of the MT, the time domain in which OFDM symbols #4 to #7 are located becomes a time resource usable by the DU.

(e) It is possible to configure time resource information that can be used by the DU based on the UL timing of the MT. For example, when OFDM symbols #4 to #7 are available for DU, based on the UL timing of the MT, the time domain in which OFDM symbols #4 to #7 are located becomes a time resource usable by the DU.

(f) It is possible to configure the time resource information that the DU can use based on the timing suitable for the link direction configuration of the MT. For example, when OFDM symbols #4 to #7 are assumed to be available for DU, OFDM symbols #4 and #5 are MT downlink resources, and OFDM symbols #6 and #7 are MT uplink resources, time resources corresponding to OFDM symbols #4 and #5 based on MT DL timing and time resources corresponding to OFDM symbols #6 and #7 based on MT UL timing are time resources usable by DUs.

This link availability configuration may include a semi-static configuration and/or dynamic configuration.

On the other hand, for DU configuration, DU resource configuration (DL/UL/F) and HIS/NA indication on the DU resource configuration may be configured.

With respect to the time reference for the H/S/NA indication, two options can be considered. One option is that the H/S/NA indication is applied with respect to the DU resource configuration, and another option is that the H/S/NA indication is applied with respect to the MT resource configuration.

Option 1a: H/S/NA may be applied with respect to DU resource configuration (D/U/F) slot timing without considering MT resource configuration or timing.

Option 1b: H/S/NA may be applied with respect to MT resource configuration (D/U/F) slot timing.

In option 1a, H/S/NA indication is applied with respect to the DU resource configuration, the resource availability of the MT resource may be determined based on the H/S/NA indication.

Due to the propagation delay between the MT and the parent DU, a timing gap may occur between the DU and the MT slot boundary. In general, the MT DL slot boundary may be located after the DU DL slot boundary, and the MT UL slot boundary may be located before the DU UL slot boundary (However, the present technology does not exclude the case where the MT DL slot boundary is located before the DU DL slot boundary and the MT UL slot boundary is behind the DU UL slot boundary). Therefore, in order to obtain MT resource availability in the H/S/NA indication, the timing gap may have to be reflected.

CU may determine and configure the RRC configuration for each child MT, such as semi-static data scheduling or signal/measurement related configuration(s). Accordingly, the CU needs to know the actual resource availability information of the child MT(s), and the timing gap information for each child node may have to be delivered to the CU.

On the other hand, in option 1b, HIS/NA indication may be applied in relation to MT resource configuration. The resource availability of the DU resource is obtained from the H/S/NA indication, and the timing gap between the DU and the MT slot boundary may be reflected similarly to the first option.

For each DU(s), the CU may determine and configure available resource(s) and semi-static data/signal transmission resources for the child link in consideration of interference among the DU(s). For this operation, the CU needs to know the actual resource availability information for each DU(s). Therefore, the CU may need to know the timing gap information between the DU and the MT as in option 1a.

In both options 1a and 1b, the CU may need to obtain timing gap information between the DU and the MT for each child node. Considering the multiplexing management aspect between DU(s), it may be more efficient to use consistent and absolute DU slot timing between CUs/DUs rather than MT slot timings that may change and are not aligned between DUs. Accordingly, H/S/NA indication may be applied in relation to DU resource configuration slot timing.

2. Method for Determining the Link Availability of the MT(DU) with the Link Availability Information of the DU(MT)

Figure 23:
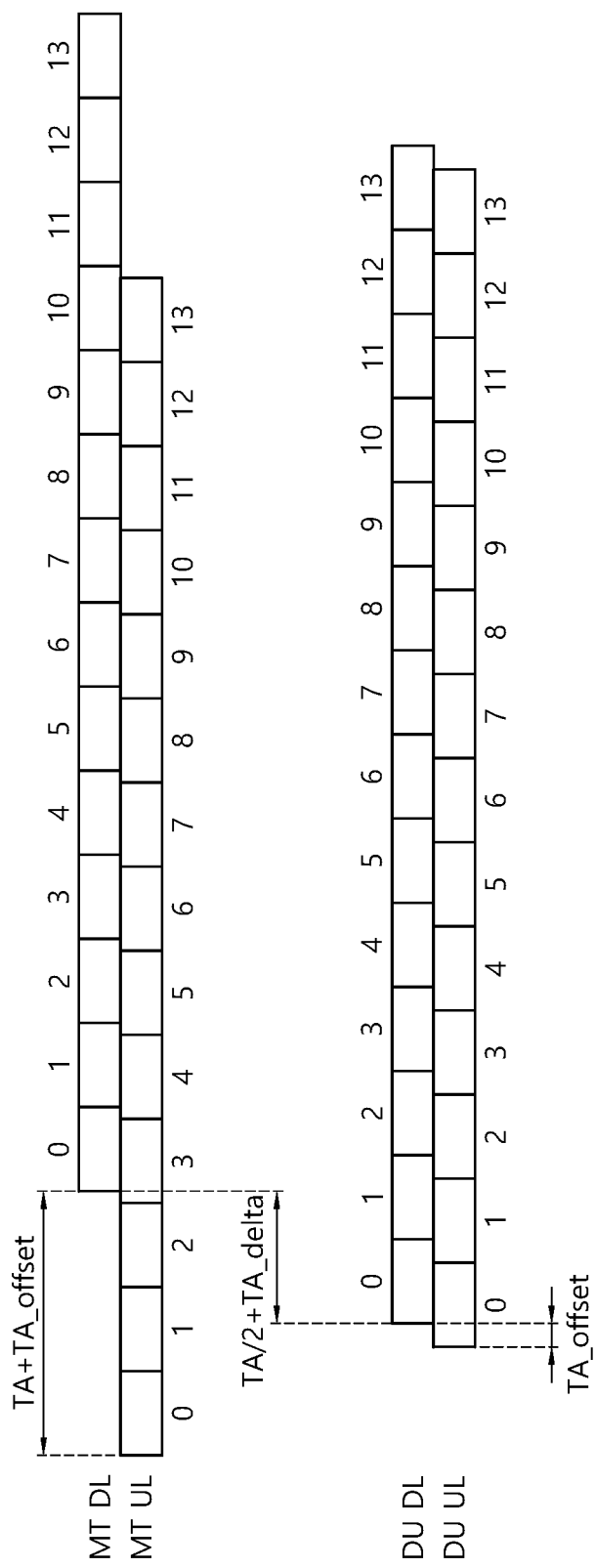
FIG. 23 schematically shows an example of timing adjustment.

FIG. 23 schematically shows an example of timing adjustment.

When the IAB node receives the configuration (configure) for link availability with the DU, time resource information for performing the MT operation may be determined using the corresponding configuration. Conversely, if the IAB node receives the configuration for link availability with the MT, time resource information for performing the DU operation may be determined using the corresponding configuration.

At this time, even in the same IAB node, the DL timing of the DU, the UL timing of the DU, the DL timing of the MT, the UL timing of the MT may all be different. In the case of DL timing of DU, it is synchronized between nodes. The time at which the DL signal of the parent DU is received becomes the DL reception time of the MT. When the MT receives a TA (timing advance) value configured from the parent node, MT uplink transmission is performed by performing a timing advance by a value of 'TA+TA_offset' from the DL reception time.

Thereafter, in order to match the DL transmission timing between the IAB DUs, the timing advanced by 'TA/2+ TA_delta' from the DL reception time of the IAB MT is configured as the DL timing of the DU. In this case, TA_delta is a value configured from the parent node. The UL timing of the DU is configured as fast as TA_offset in consideration of a DL/UL switching time with the DU DL timing, etc. An example of such a timing is shown in FIG. 23. In this specification, TA_offset is also referred to as TAoffset. Also, TA_delta is sometimes denoted as Tdelta.

Figure 24:
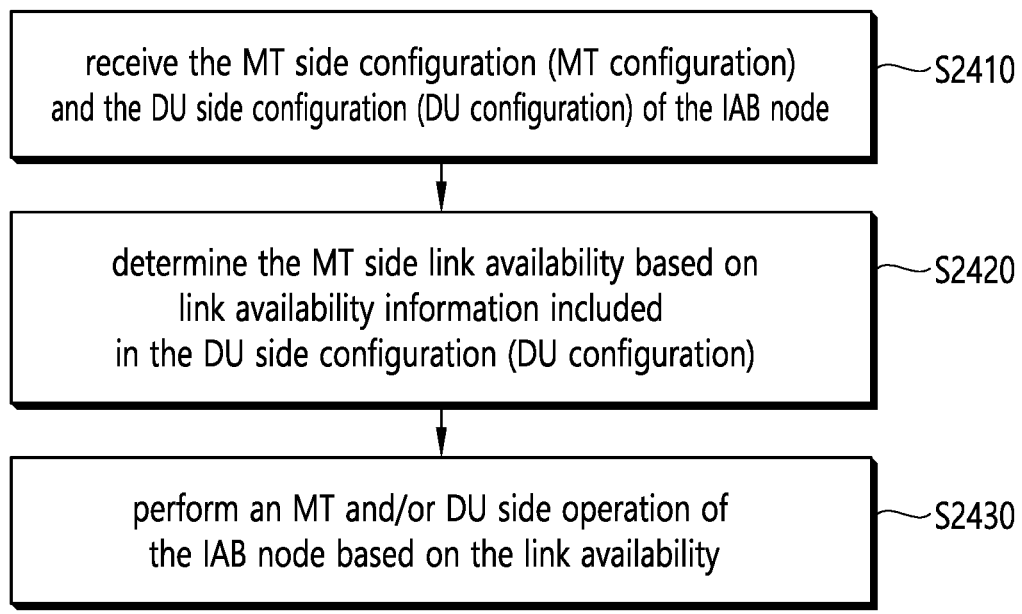
FIG. 24 is an example of a method for determining link availability of an MT based on link availability configured to a DU.

FIG. 24 is an example of a method for determining link availability of an MT based on link availability configured to a DU.

Referring to FIG. 24, the IAB node receives the MT side configuration (MT configuration) and the DU side configuration (DU configuration) of the IAB node (S2410), the MT side link availability may be determined based on link availability information included in the DU side configuration (DU configuration) (S2420). The IAB node may perform an MT and/or DU side operation of the IAB node based on the link availability (S2430).

A method of determining the link availability of the MT with the link availability information configured to the DU may include all or part of the following.

(a) During the time resource configured to be used for the DU operation according to the criteria of 1, the IAB node does not perform the MT operation. That is, it is determined that the resource in which the DU operation is hard and/or the soft resource indicated by the IA is a period in which the MT operation is not available.

(b) During the time resource configured not to be used for DU operation according to the criteria of 1, the IAB node may perform MT operation. That is, it is determined that the resource in which the DU operation is NA and/or the soft resource indicated by the INA is a period in which the MT operation is available.

(c) When determining available resources and not available resources of the MT operation according to the criteria of (a), (b), etc., only a partial time domain of the MT OFDM symbol may be available (or not available). That is, a time domain in which an MT operation is available and a time domain in which an MT operation is not available may be mixed in the OFDM symbol. In this case, the OFDM symbol may operate as follows.

Alt 1. It may be determined that the MT operation is not available in the entire OFDM symbol.

FIGS. 25 to 28 schematically show an example for determining the availability of a resource based on the relationship between the DU operation and the MT operation.

Figure 25:
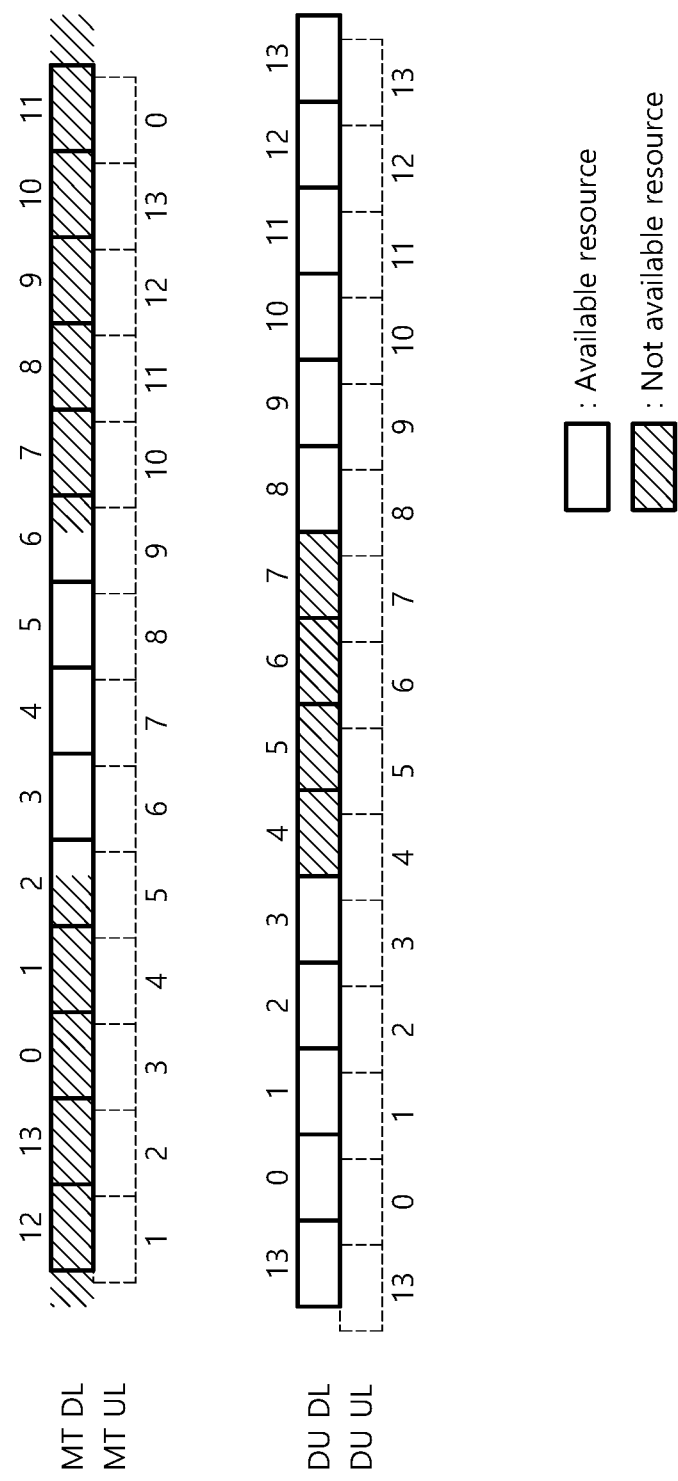
FIGS. 25 to 28 schematically show an example for determining the availability of a resource based on the relationship between the DU operation and the MT operation.
Figure 26:
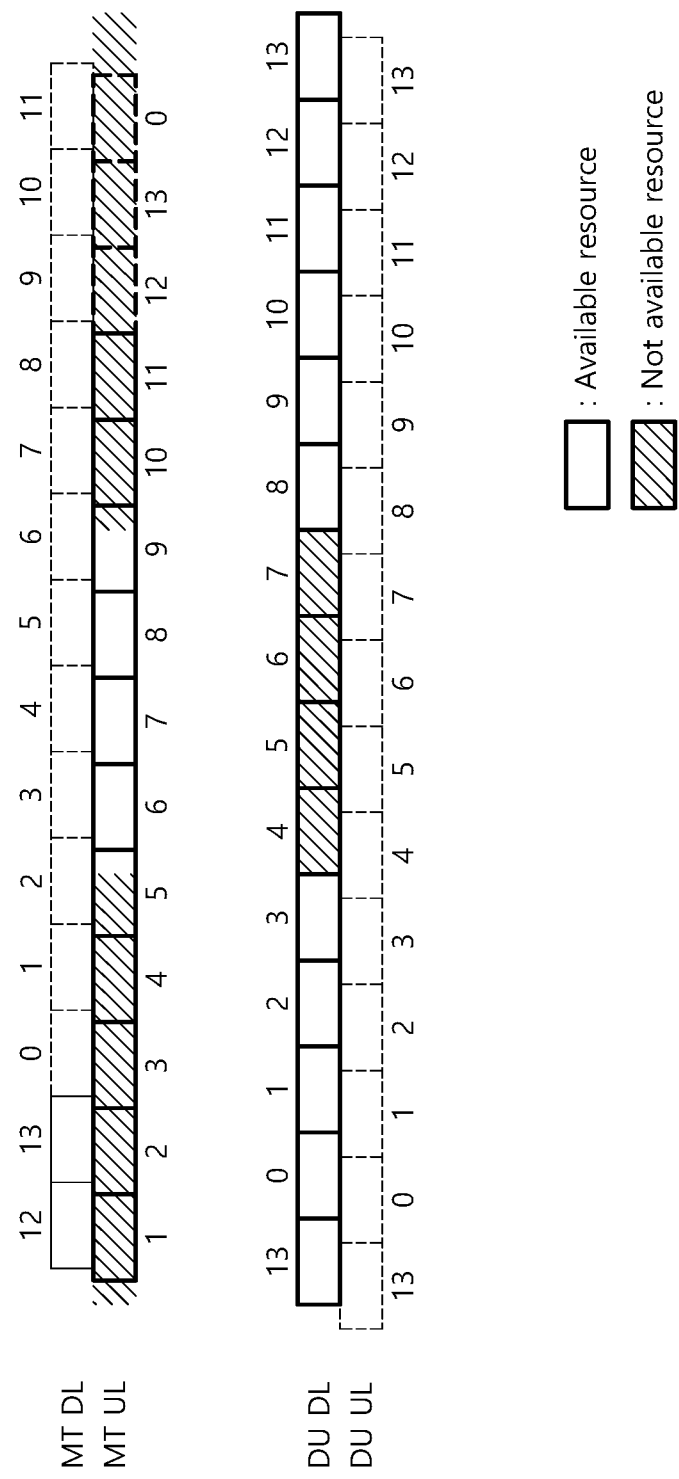

For example, OFDM symbols #4 to #7 based on the timing of the DU DL as shown in FIGS. 25 and 26 are NA resources of the DU, OFDM symbols #0 to #3, #8 to #13 may be configured as hard resources of the DU. At this time, the availability of the MT may be determined as follows.

In the case of DL of MT as shown in FIG. 25, OFDM symbols #0 to #1 and #7 to #13 configured to perform DU operation for the entire time domain of the symbol may be determined as OFDM symbols in which MT operation is not available. OFDM symbols #3 to #5 configured so that the DL operation of the DU is not performed for the entire time domain of the symbol may be determined as OFDM symbols in which the DL operation of the MT is available. Meanwhile, since the timing of the MT and the timing of the DU of the IAB node are not aligned with each other, there is an OFDM symbol in which an area in which the DL operation of the MT is available and an area in which it is not available are mixed. In this example, OFDM symbols #2 and #6 are such. In the case of these OFDM symbols, it can be determined as an OFDM symbol in which the DL operation of the MT is not available.

In the case of UL of MT as shown in FIG. 26, OFDM symbols #0 to #4 and #10 to #13 configured to perform DU operation for the entire time domain of the symbol may be determined as OFDM symbols in which MT operation is not available. OFDM symbols #6 to #8 configured so that the DU operation is not performed for the entire time domain of the symbol may be determined as OFDM symbols in which the UL operation of the MT is available. In the case of OFDM symbols #5 and #9 in which an area in which the UL operation of the MT is available and an area in which it is not available are mixed, it may be determined as an OFDM symbol in which the UL operation of the MT is not available.

Figure 27:
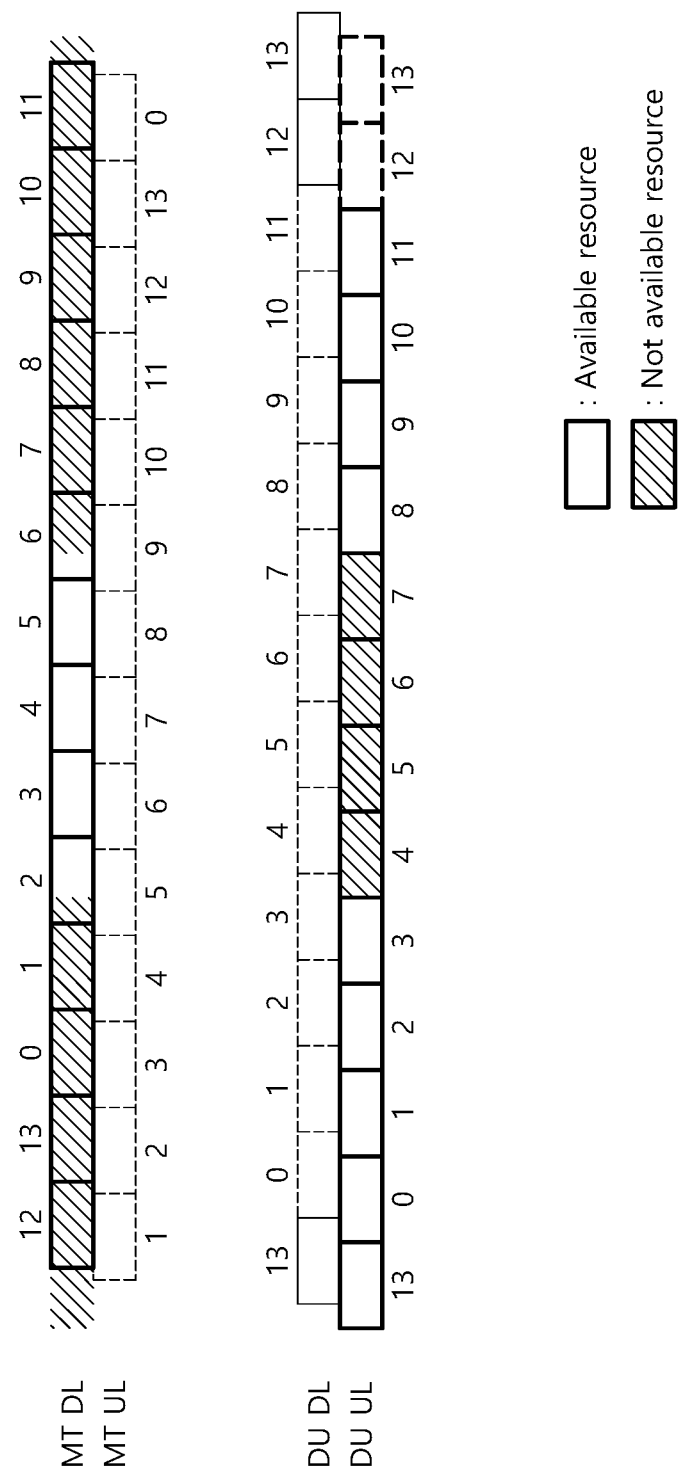
Figure 28:
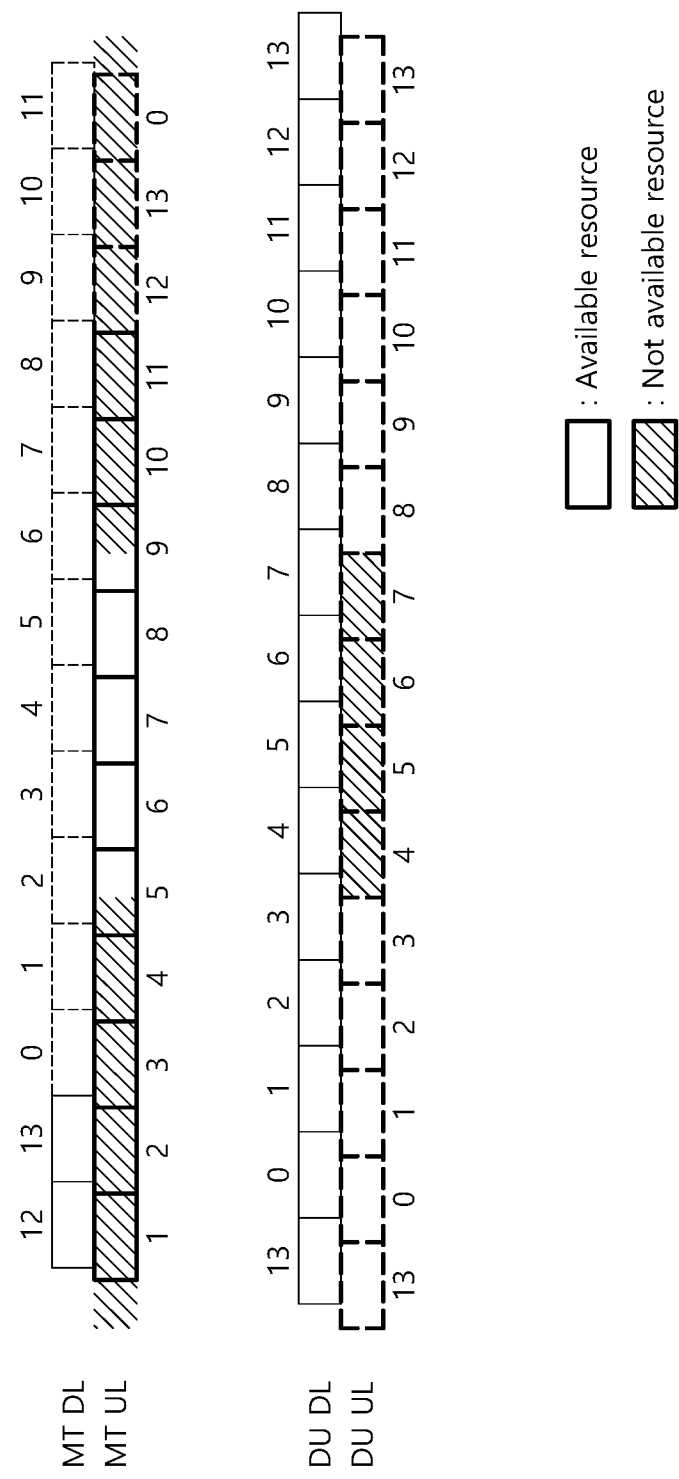

Or, OFDM symbols #4 to #7 based on the timing of the DU UL as shown in FIGS. 27 and 28 are NA resources of the DU, OFDM symbols #0 to #3, #8 to #13 may be configured as hard resources of the DU. At this time, the availability of the MT may be determined as follows.

In the case of DL of MT as shown in FIG. 27, OFDM symbols #0 to #1 and #7 to #13 configured to perform DU operation for the entire time domain of the symbol may be determined as OFDM symbols in which MT operation is not available. OFDM symbols #3 to #5 configured so that the DL operation of the DU is not performed for the entire time domain of the symbol may be determined as OFDM symbols in which the DL operation of the MT is available. Meanwhile, since the timing of the MT and the timing of the DU of the IAB node are not aligned with each other, there is an OFDM symbol in which an area in which the DL operation of the MT is available and an area in which it is not available are mixed. In this example, OFDM symbols #2 and #6 are such. In the case of these OFDM symbols, it can be determined as an OFDM symbol in which the DL operation of the MT is not available.

In the case of UL of MT as shown in FIG. 28, OFDM symbols #0 to #4 and #10 to #13 configured to perform DU operation for the entire time domain of the symbol may be determined as OFDM symbols in which MT operation is not available. OFDM symbols #6 to #8 configured so that the DU operation is not performed for the entire time domain of the symbol may be determined as OFDM symbols in which the UL operation of the MT is available. In the case of OFDM symbols #5 and #9 in which an area in which the UL operation of the MT is available and an area in which it is not available are mixed, it may be determined as an OFDM symbol in which the UL operation of the MT is not available.

At this time, additionally, in the area where the link direction of the DU is DL, the availability of MT resources is determined based on the DL timing of the DU, in the area in which the link direction of the DU is UL, availability of MT resources may be determined based on the UL timing of the DU.

Figure 29:
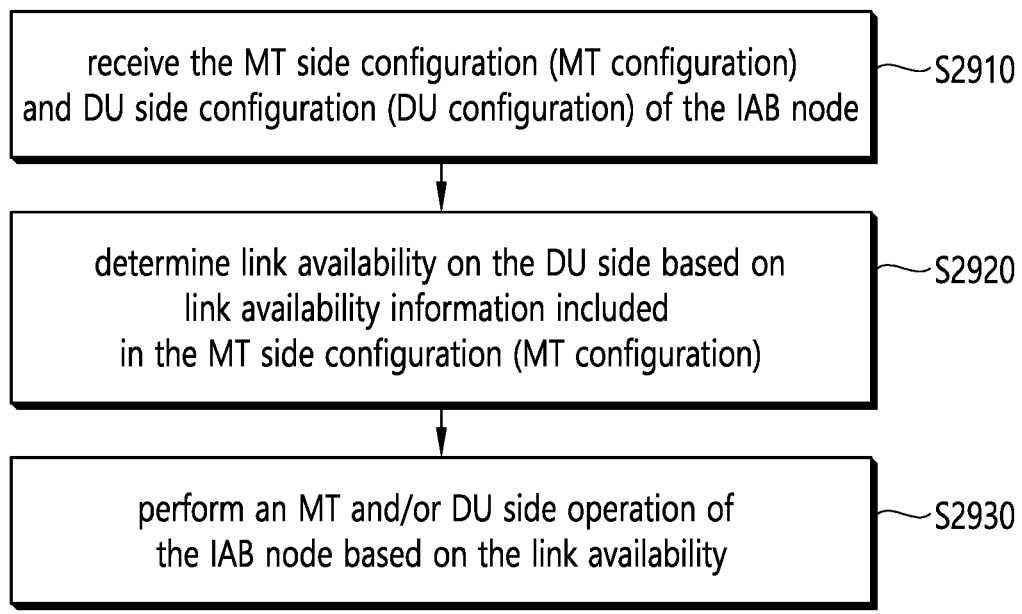
FIG. 29 is an example of a method for determining link availability of a DU based on link availability configured to the MT.

FIG. 29 is an example of a method for determining link availability of a DU based on link availability configured to the MT.

Referring to FIG. 21, the IAB node receives the MT side configuration (MT configuration) and DU side configuration (DU configuration) of the IAB node (S2110), link availability on the DU side may be determined based on link availability information included in the MT side configuration (DU configuration) (S2120). The IAB node may perform an MT and/or DU side operation of the IAB node based on the link availability (S2130).

On the other hand, the method of determining the link availability of the DU with the link availability information configured to the MT may include all or part of the following.

(a) During the time resources configured to be used for MT operation according to the criteria of 1, the IAB node does not perform the DU operation. That is, it is determined that the resource in which the MT operation is hard and/or the soft resource indicated by the IA is a section in which the DU operation is not available.

(b) During the time resource configured not to be used for MT operation according to the criteria of 1, the IAB node may perform a DU operation. That is, it is determined that the resource in which the MT operation is NA and/or the soft resource indicated by the INA is a period in which the DU operation is available.

(c) When determining available resources and not available resources of the DU operation according to the criteria of (a), (b), etc., only a partial time domain of the DU OFDM symbol may be available (or not available). That is, a time domain in which the DU operation is available and a time domain in which the DU operation is not available may be mixed in the OFDM symbol. In this case, it may operate as follows in the corresponding OFDM symbol.

Alt 1. It may be determined that the DU operation is not available in the entire OFDM symbol.

Alt 2. It can be determined that DU operation is available in the entire OFDM symbol. At this time, in the OFDM symbol of the MT that overlaps with the time domain in 1 which the OFDM symbol is located (fully or partially), the MT determines that the OFDM symbol is not available even if it is configured as a hard resource.

FIGS. 30 to 33 schematically show another example for determining the availability of a resource based on the relationship between the DU operation and the MT operation.

Figure 30:
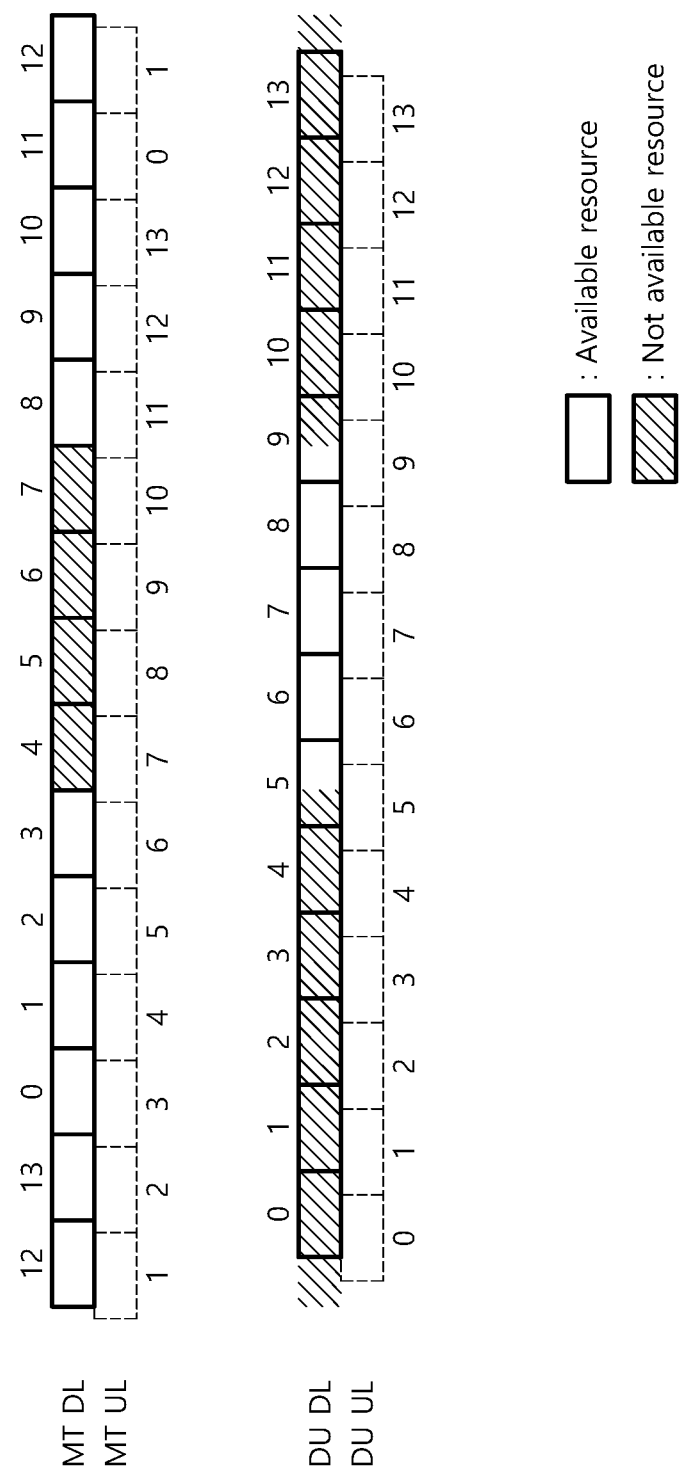
FIGS. 30 to 33 schematically show another example for determining the availability of a resource based on the relationship between the DU operation and the MT operation.
Figure 31:
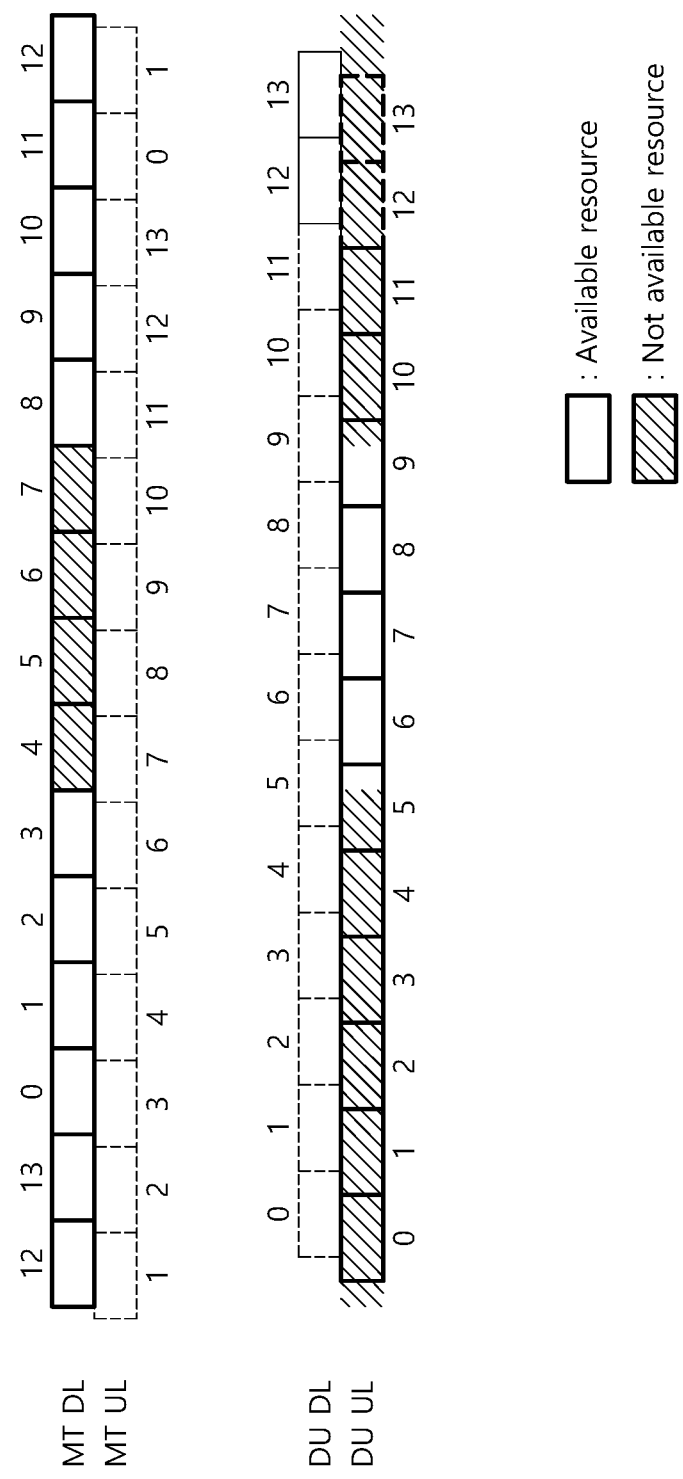

For example, OFDM symbols #4 to #7 based on the timing of the MT DL as shown in FIGS. 30 and 31 are NA resources of the MT, OFDM symbols #0 to #3, #8 to #13 may be configured as hard resources of the MT. In this case, the availability of the DU may be determined as follows.

In the case of DL of DU as shown in FIG. 30, OFDM symbols #0 to #4 and #10 to #13 configured to perform MT operation for the entire time domain of the symbol may be determined as OFDM symbols in which DU operation is not available. OFDM symbols #6 to #8 configured so that the MT DL operation is not performed for the entire time domain of the symbol may be determined as OFDM symbols in which the DU DL operation is available. On the other hand, since the "MT timing and DU timing" of the IAB node are not aligned with each other, there is an OFDM symbol in which a region in which the DL operation of the DU is available and a region in which the DU operation is not available are mixed. In this example, OFDM symbols #5 and #9 are such. In the case of these OFDM symbols, 1) it may be determined as an OFDM symbol in which the DL operation of the DU is not available, or 2) it may be determined as an OFDM symbol in which the DL operation of the DU is available.

In the case of UL of DU as shown in FIG. 31, OFDM symbols #0 to #4 and #10 to #13 configured to perform DU operation for the entire time domain of the symbol may be determined as OFDM symbols in which DU operation is not available. OFDM symbols #6 to #8 configured so that the MT operation is not performed for the entire time domain of the symbol may be determined as OFDM symbols in which the UL operation of the DU is available. In the case of OFDM symbols #5 and #9 in which an area in which the UL operation of the DU is available and an area in which the DU is not available are mixed, 1) it may be determined as an OFDM symbol in which the UL operation of the DU is not available, or 2) it may be determined as an OFDM symbol in which the UL operation of the DU is available.

Figure 32:
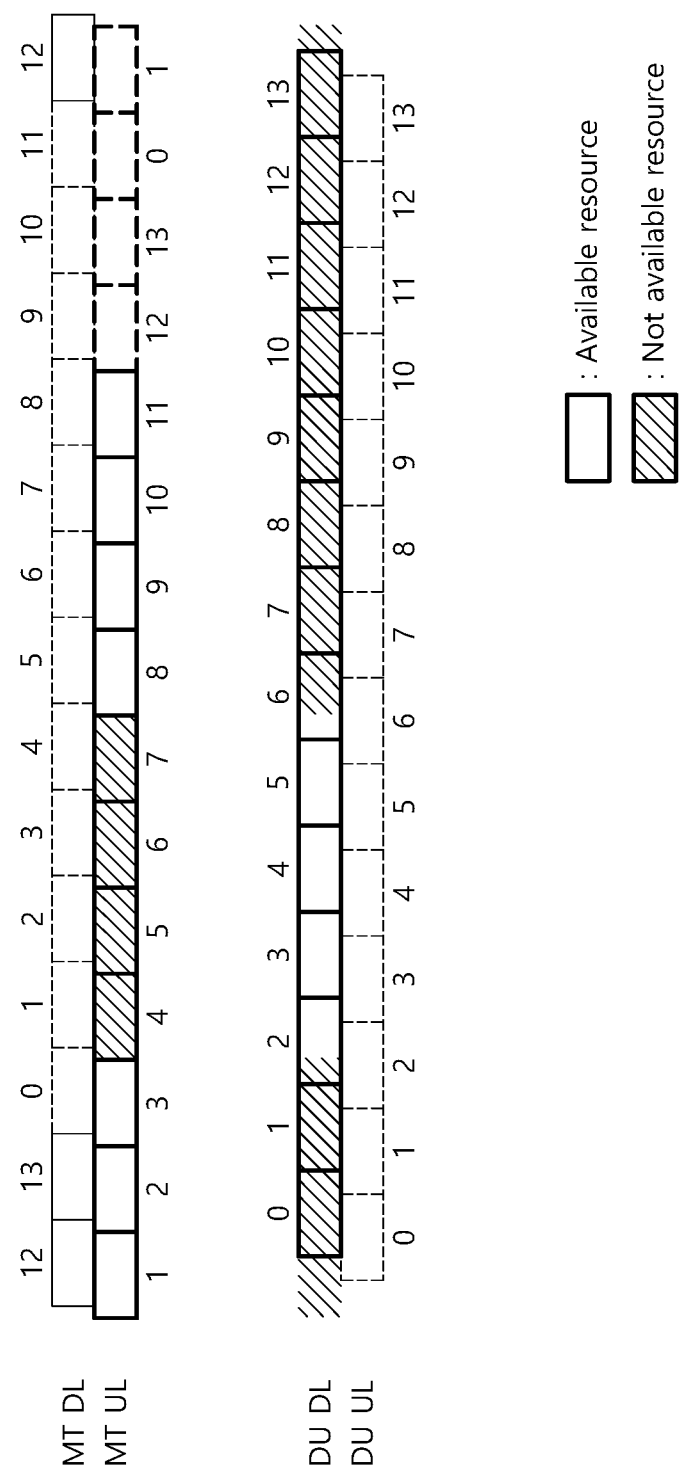
Figure 33:
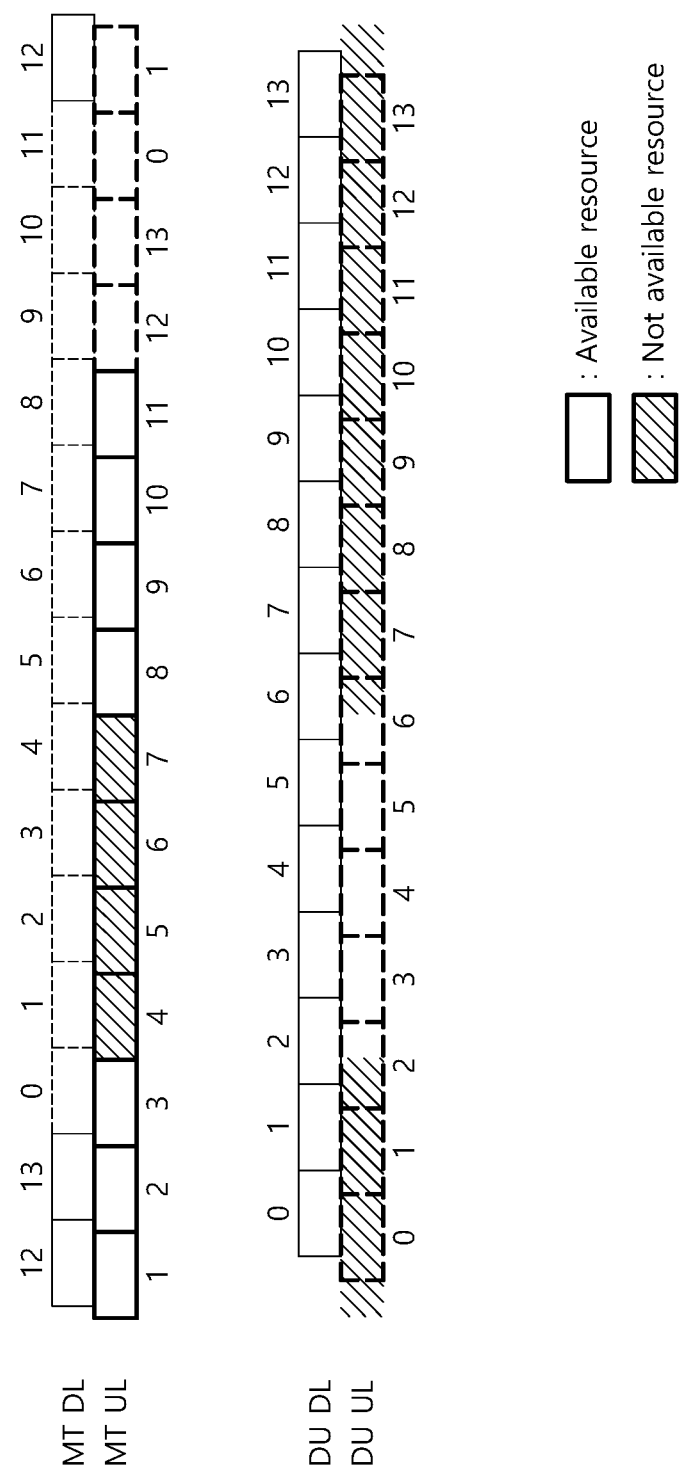

Or, OFDM symbols #4 to #7 based on the timing of the MT UL as shown in FIGS. 32 and 33 are NA resources of the MT, OFDM symbols #0 to #3, #8 to #13 may be configured as hard resources of the MT. In this case, the availability of the DU may be determined as follows.

In the case of DL of DU as shown in FIG. 32, OFDM symbols #0 to #4 and #10 to #13 configured to perform MT operation for the entire time domain of the symbol may be determined as OFDM symbols in which DU operation is not available. OFDM symbols #6 to #8 configured so that the MT DL operation is not performed for the entire time domain of the symbol may be determined as OFDM symbols in which the DU DL operation is available. On the other hand, since the timing of the MT of the IAB node and the timing of the DU are not aligned with each other, there is an OFDM symbol in which an area in which a DL operation of the DU is available and an area in which it is not available are mixed. In this example, OFDM symbols #5 and #9 are such. In the case of these OFDM symbols, 1) it may be determined as an OFDM symbol in which the DL operation of the DU is not available, or 2) it may be determined as an OFDM symbol in which the DL operation of the DU is available.

In the case of UL of DU as shown in FIG. 33, OFDM symbols #0 to #4 and #10 to #13 configured to perform DU operation for the entire time domain of the symbol may be determined as OFDM symbols in which DU operation is not available. OFDM symbols #6 to #8 configured so that the MT operation is not performed for the entire time domain of the symbol may be determined as OFDM symbols in which the UL operation of the DU is available. In the case of OFDM symbols #5 and #9 in which an area in which the UL operation of the DU is available and an area in which this is not available are mixed, 1) it may be determined as an OFDM symbol in which the UL operation of the DU is not available, or 2) it may be determined as an OFDM symbol in which the UL operation of the DU is available.

Figure 34:
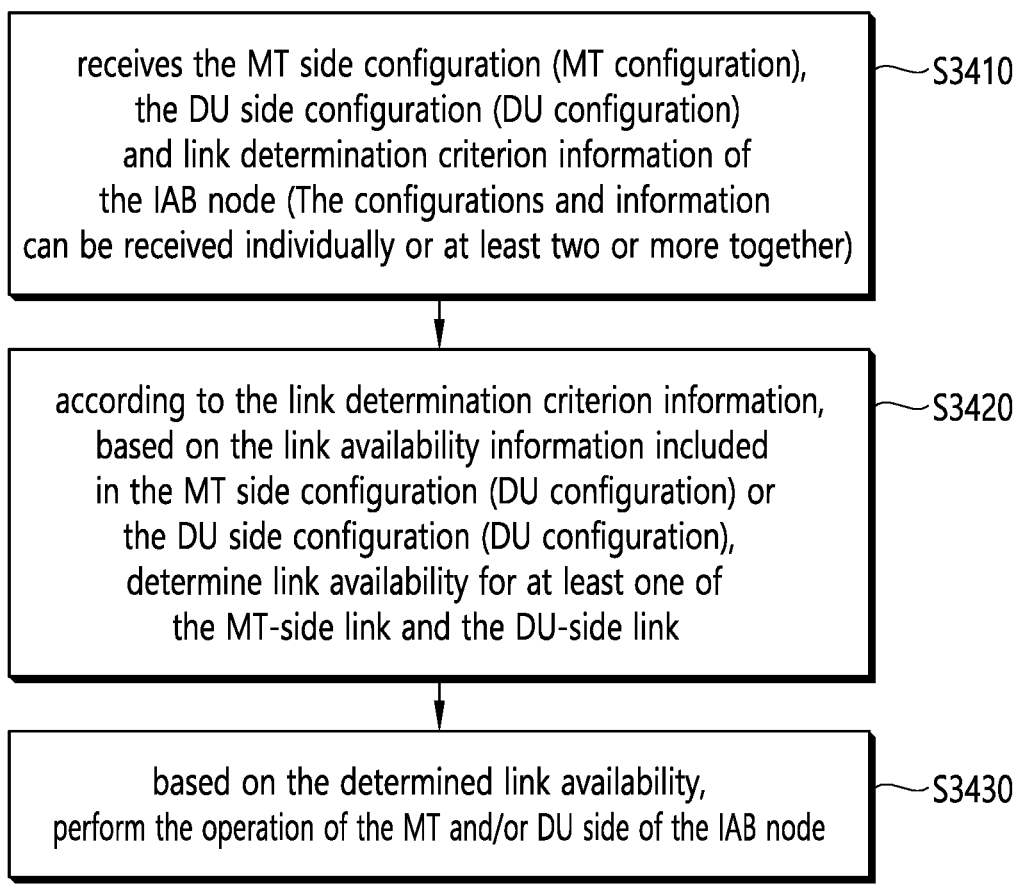
FIG. 34 is an example of a method for determining link availability based on link availability configured in each of the DU side and the MT side of the IAB node.

FIG. 34 is an example of a method for determining link availability based on link availability configured in each of the DU side and the MT side of the IAB node.

Referring to FIG. 26, the IAB node receives the MT side configuration (MT configuration), the DU side configuration (DU configuration) and link determination criterion information of the IAB node (The configurations and information can be received individually or at least two or more together) (S2610), according to the link determination criterion information, based on the link availability information included in the MT side configuration (DU configuration) or the DU side configuration (DU configuration), link availability for at least one of the MT-side link and the DU-side link may be determined (S2620). Based on the determined link availability, the operation of the MT and/or DU side of the IAB node may be performed (S2630).

That is, in another method of the present specification, link availability information may be configured to the DU and the MT, respectively. In this case, it can operate as follows.

(a) When the IAB node determines the link availability of the MT and the DU, it may be configured whether the DU makes a decision based on the configured link availability configuration or the MT makes a decision based on the configured link availability configuration (that is, link determination criterion information may be provided). This configuration may be configured from a CU or a parent DU through SI, RRC, F1AP, or the like.

(b) The IAB node determines the link availability of the MT based on the link availability configuration configured by the MT, the link availability of the DU may be determined based on the link availability configuration configured by the DU. In this case, a collision may occur in the configured link availability. For example, it may be configured such that there is a time resource in which both the MT and the DU can operate. In this case, the priority between the MT operation and the DU operation may be determined according to a specific rule. This priority may be determined, for example, as follows. Characteristically, all or part of the following rules may be included.

MT may always have priority. That is, the IAB node may perform the MT operation in a time interval configured so that time resources in which both the MT and the DU can operate exist.

DU may always have priority. That is, the IAB node may perform the DU operation in a time interval configured so that time resources in which both the MT and the DU can operate exist.

In the resource configured to transmit and/or receive the cell-specific signal/channel for the DU, the operation of the DU may be performed.

Both MT and DU may be determined as soft resources in the time period in which the collision occurs due to semi-static link availability configuration. In such a resource, link availability may be determined based on the method for determining the availability of soft resources configured as implicit/explicit afterwards.

3. Switching Time Between DU Operation and MT Operation

FIGS. 35 to 38 schematically illustrate an example of a gap time required for switching when performing switching between a DU operation and an MT operation.

When performing switching between the DU operation and the MT operation, there may be a gap time required for switching. At this time, if the configuration of the gap time is left as an IAB node implementation issue, transmitted data cannot be received properly due to differences in understanding of the gap time location between nodes, or data expected to be received may not be transmitted. Therefore, it is suggested to configure the gap time as follows.

(a) When switching between the DU operation and the MT operation, the DU operation has priority over the MT operation. Therefore, a gap time is always created in the MT resource.

When switching the operation from DU to MT, after the OFDM symbol at the end of the DU operation, X OFDM symbols or Y msec may be configured/assumed as a gap time.

When switching operation from MT to DU, X OFDM symbols or Y msec before the start OFDM symbol of DU operation may be configured/assumed as a gap time.

Figure 35:
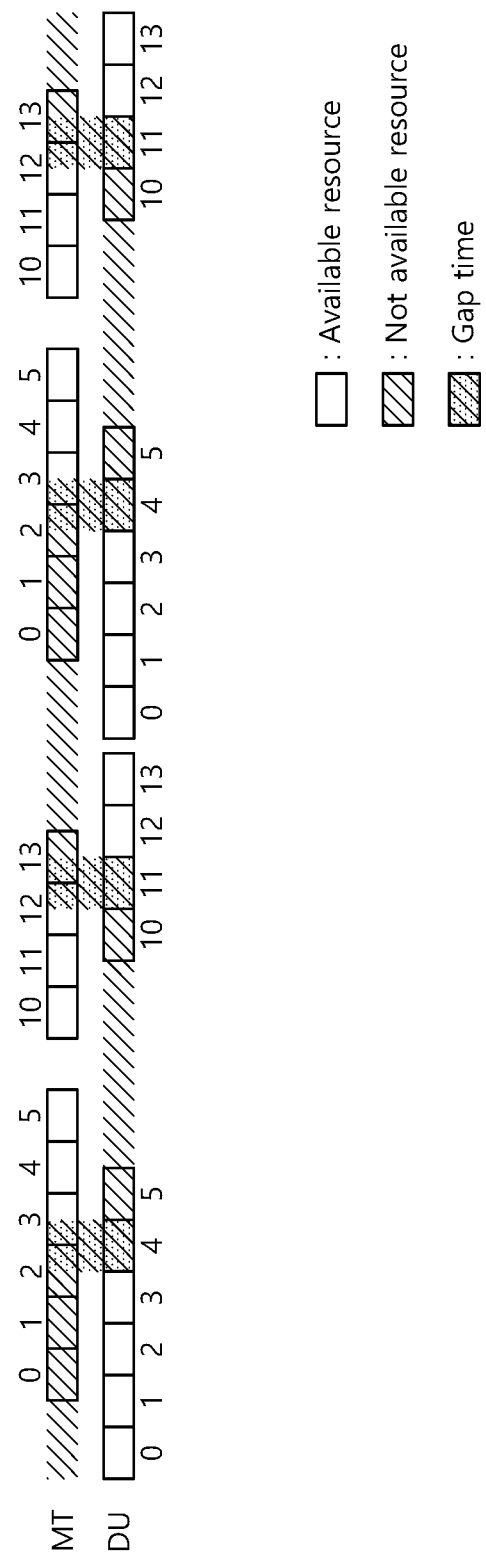
FIGS. 35 to 38 schematically illustrate an example of a gap time required for switching when performing switching between a DU operation and an MT operation.

An example of such an operation is shown in FIG. 35. In the figure, the DU operation should be performed up to OFDM symbol #3 of the DU, and the MT operation should be performed from OFDM symbol #3 of the MT. In this case, since the operation of the DU takes precedence, it can be assumed that OFDM symbol #4 of the DU, which is one symbol, after the DU operation is terminated, is the gap time. Conversely, the MT operation should be performed up to OFDM symbol #12 of the MT, and the DU operation should be performed from OFDM symbol #12 of the DU. In this case, since the DU operation has priority, OFDM symbol #11 of the DU, which is 1 symbol before the start of the DU operation, may be assumed as the gap time.

(b) When performing switching between the DU operation and the MT operation, the operation of the MT takes precedence over the operation of the DU. Therefore, a gap time is always created in the DU resource.

When switching operation from DU to MT, X OFDM symbols or Y msec preceding the start OFDM symbol of MT operation may be configured/assumed as the gap time.

When switching operation from MT to DU, after the OFDM symbol at the end of the MT operation, X OFDM symbols or Y msec may be configured/assumed as the gap time.

Figure 36:
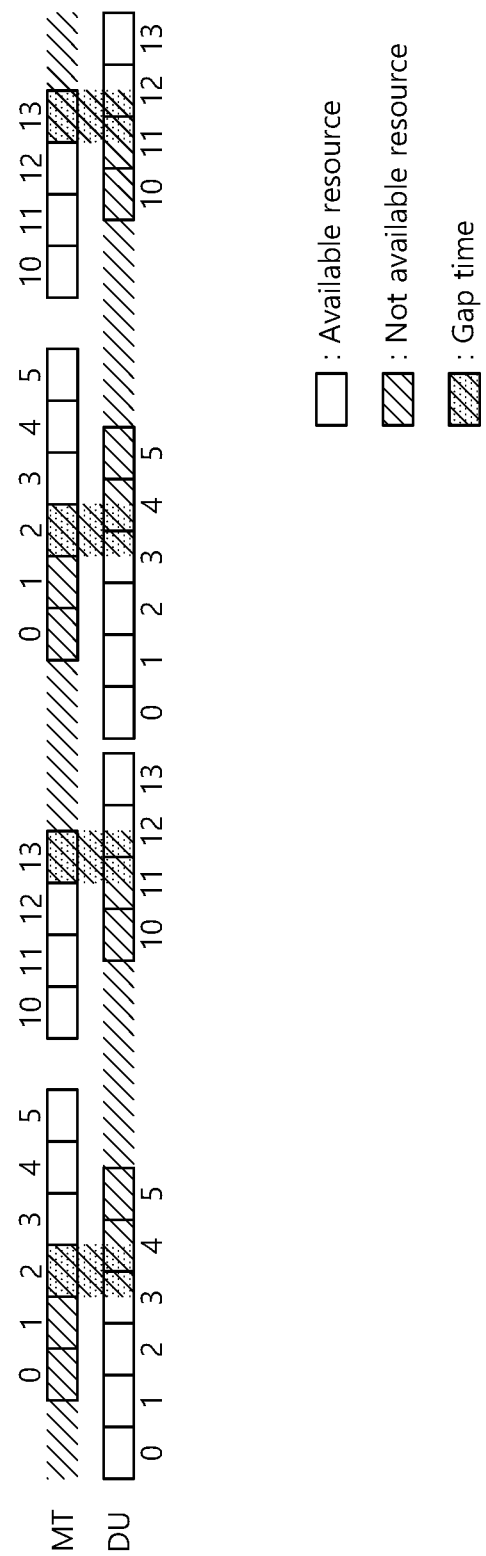

An example of such an operation is shown in FIG. 36. In the figure, the DU operation should be performed up to OFDM symbol #3 of the DU, and the MT operation should be performed from OFDM symbol #3 of the MT. In this case, since the operation of the MT has priority, OFDM symbol #2 of the MT, which is one symbol before the operation of the MT starts, may be assumed as the gap time. Conversely, the MT operation should be performed up to OFDM symbol #12 of the MT, and the DU operation should be performed from OFDM symbol #12 of the DU. In this case, since the MT operation has priority, OFDM symbol #13 of the DU, which is one symbol after the MT operation is terminated, may be assumed as the gap time.

(c) When performing switching between the DU operation and the MT operation, the operation of the currently operating link takes precedence.

When switching the operation from -DU to MT, X OFDM symbols or Y msec after the end of the DU operation start OFDM symbol may be configured/assumed as the gap time.

When switching the operation from MT to DU, X OFDM symbols or Y msec after the end OFDM symbol of the MT operation may be configured/assumed as the gap time.

Figure 37:
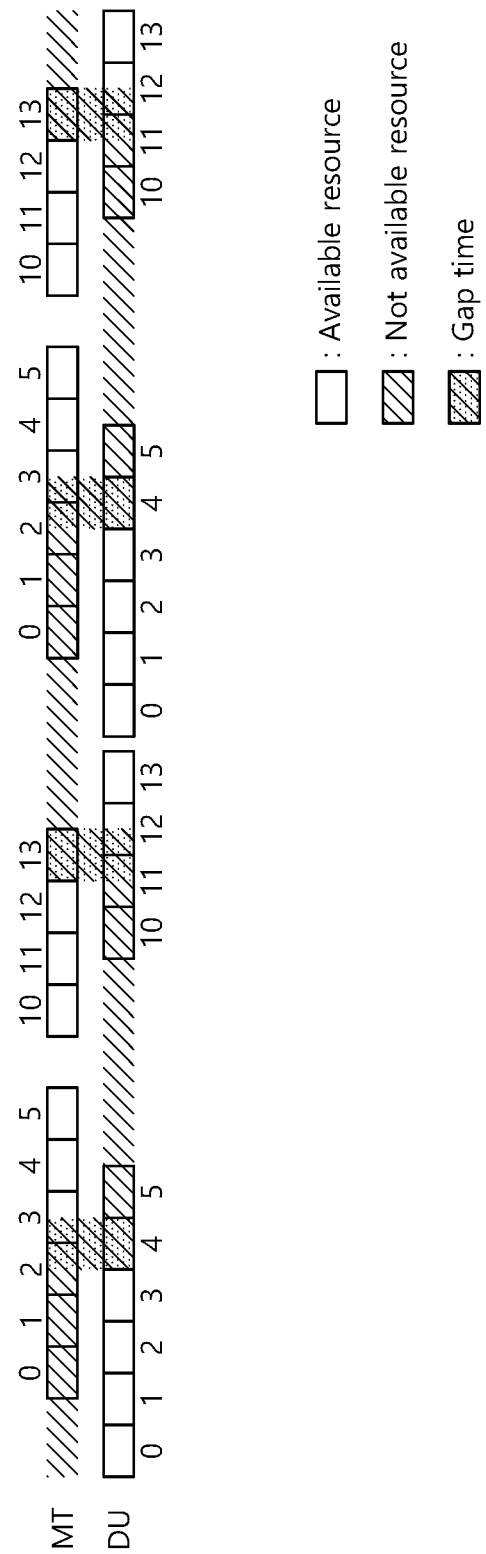

An example of such an operation is shown in FIG. 37. In the figure, the DU operation should be performed up to OFDM symbol #3 of the DU, and the MT operation should be performed from OFDM symbol #3 of the MT. In this case, since the operation of the currently operating DU has priority, OFDM symbol #4 of the DU, which is one symbol after the DU operation is terminated, may be assumed as the gap time. Conversely, the MT operation should be performed up to OFDM symbol #12 of the MT, and the DU operation should be performed from OFDM symbol #12 of the DU. In this case, the currently operating MT operation has priority, and OFDM symbol #13 of the DU, which is 1 symbol after the MT operation is terminated, may be assumed as the gap time.

(d) When performing switching between the DU operation and the MT operation, the operation of the link to be performed after switching takes precedence.

When switching the operation from the DU to the MT, X OFDM symbols or Y msec before the start OFDM symbol of MT operation may be configured/assumed as the gap time.

When switching operation from MT to DU, X OFDM symbols or Y msec before the start OFDM symbol of DU operation may be configured/assumed as the gap time.

Figure 38:
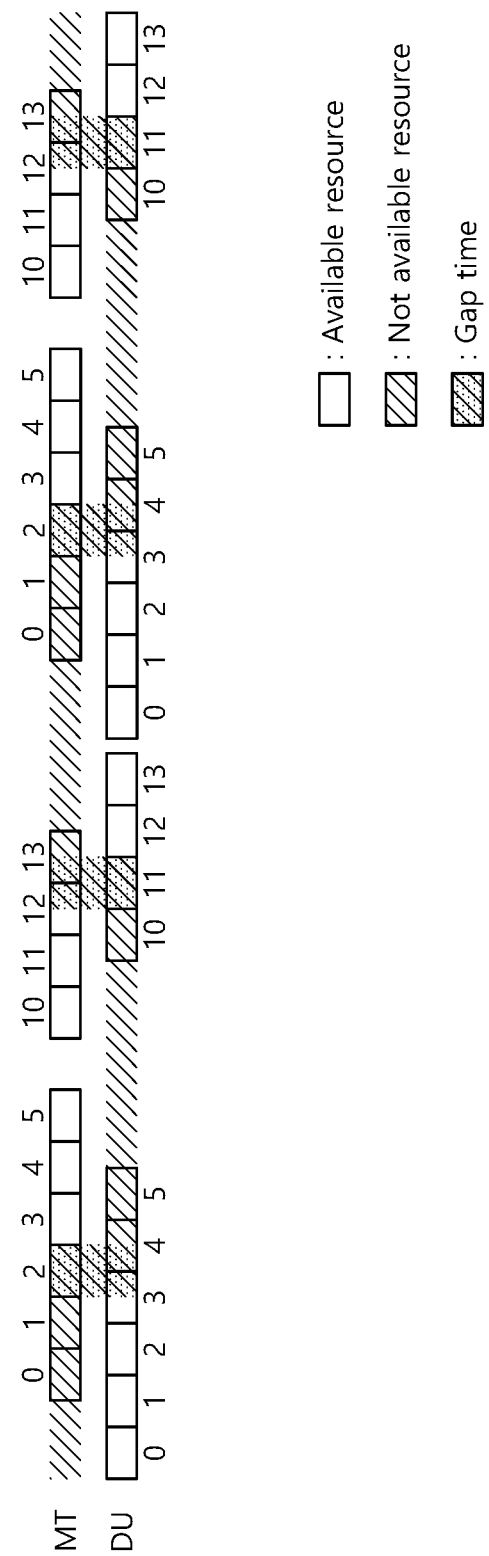

An example of such an operation is shown in FIG. 38. In the figure, the DU operation should be performed up to OFDM symbol #3 of the DU, and the MT operation should be performed from OFDM symbol #3 of the MT. In this case, the operation of the MT to be operated after switching has priority, and OFDM symbol #2 of the MT, which is one symbol before the operation of the MT starts, may be assumed as the gap time. Conversely, the MT operation should be performed up to OFDM symbol #12 of the MT, and the DU operation should be performed from OFDM symbol #12 of the DU. In this case, the DU operation to be operated after switching has priority, and OFDM symbol #11 of the DU, which is 1 symbol before the start of the DU operation, may be assumed as the gap time.

(e) When performing switching between the DU operation and the MT operation, the IAB node may receive information on a priority operation among the MT operation and the DU operation from the CU or parent node through SI, RRC, F1AP, or the like. When the MT operation is configured to take precedence, the gap time is configured as in the method (b) above, when the DU operation is configured to be prioritized, the gap time may be configured as in the method (a) above.

If such a gap time exists in the MT resource, it can be assumed that the IAB node does not perform transmission/reception operations to the MT during the gap time. On the other hand, if the gap time exists in the DU resource, it can be assumed that the IAB node does not perform transmission/reception operations to the DU during the gap time. At this time, if this gap time overlaps a part in the OFDM symbol, it can be assumed that no transmission/reception operation is performed on the entire OFDM symbol.

4. Operation in Time Resource Between UL Resource and DL Resource of MT

Figure 39:
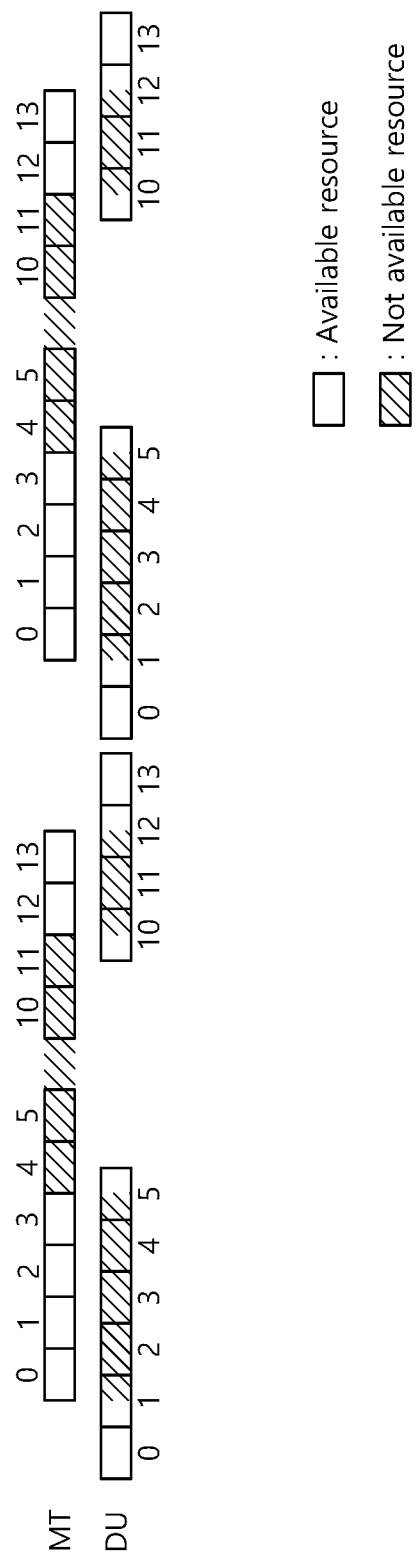
FIGS. 39 and 40 schematically show an example of link availability.
Figure 40:
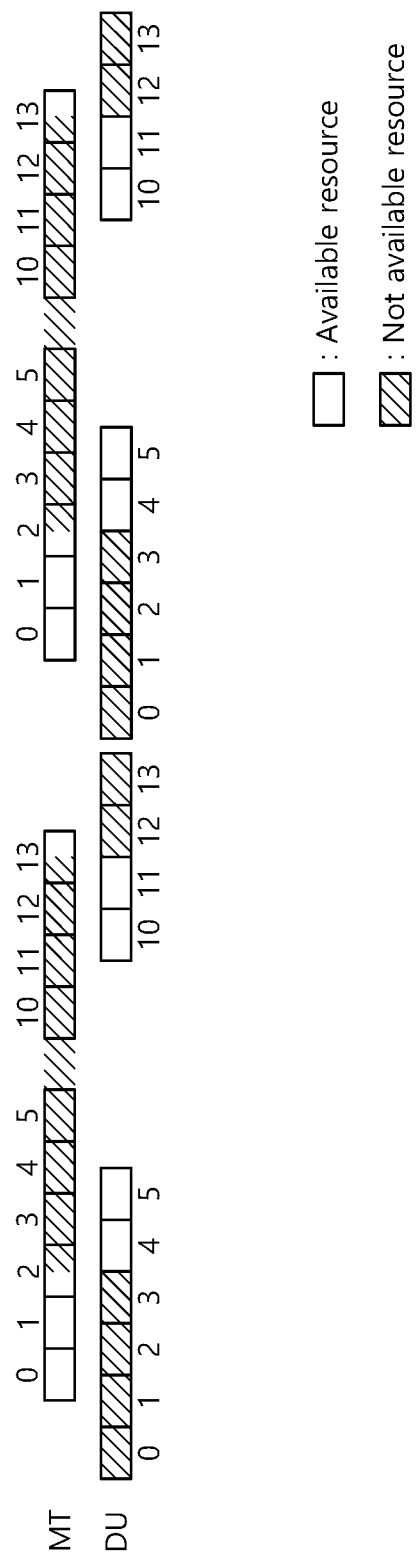

FIGS. 39 and 40 schematically show an example of link availability.

When configuring link availability information based on the timing of MT, for example, as shown in FIG. 39, OFDM symbols #0 to #3, #12 to #13 of MT are configured as available resources for MT operation, OFDM symbols #4 to #11 of the MT may be configured as resources not available for MT operation. At this time, the operation of the DU is unavailable in the time domain where the operation of the MT is available, it may be determined that the operation of the DU is available in a time domain in which the operation of the MT is not available.

At this time, as in FIG. 39, the DU resource region corresponding to OFDM symbols #12 to #13 of the MT and the DU resource region corresponding to OFDM symbols #0 to #3 of the MT in the next slot become resources that are not available for DU operation. In this case, DU OFDM symbols #10, #11, #12 and DU OFDM symbols #1, #2, #3, #4, and #5 of the next slot become resources not available for DU operation. In this case, OFDM symbols #13 and #0 of the DU are gap regions due to UL to DL switching of the MT, and are resources on which MT operation is not performed. Accordingly, the DU operation may be performed in such an OFDM symbol. Therefore, in the present specification, it is proposed that the DU operation can be performed during the time between the UL end time and the DL start time of the MT.

On the other hand, when configuring (configure) link availability information based on the timing of the DU, for example, as shown in FIG. 40, OFDM symbols #0 to #3 and #12 to #13 of the DU are configured as resources not available for DU operation, OFDM symbols #4 to #11 of the DU may be configured as available resources for DU operation. In this case, it may be determined that the operation of the MT is not available in a time domain in which the operation of the DU is available, and it may be determined that the MT operation is available in a time domain in which the DU operation is not available.

At this time, OFDM symbols #12 and #13 of the DU and OFDM symbols #0, #1, #2, and #3 of the next slot in FIG. 40 are resources on which the DU operation is not performed. However, OFDM symbols #13 and #0 of the DU are gap regions due to UL to DL switching of the MT, and are resources on which MT operation is not performed. Therefore, in the present specification, it is proposed that the DU operation can be performed regardless of the availability of the DU during the time between the UL end time and the DL start time of the MT.

5. Method of Determining Resource Availability

When the H/S/NA indication is configured as a DU and applied for the DU resource configuration related to the H/S/NA indication, the resource availability of the MT resource may be determined based on the H/S/NA indication.

FIG. 41 schematically shows an example of MT resource availability determination.

In FIG. 41, DU symbols #0-#2 and #6-#9 may be configured as NAs, and symbols #3-#5 and #10-#13 may be configured as hard resources.

FIG. 41(a) schematically illustrates an example of a case where the MT downlink resource availability and the DU has a downlink resource direction.

When both MT and DU are in the downlink, MT symbols #2, #3, #9, #10 and #11 do not become available resources for MT operation because these resources are indicated as DU hard resources.

For MT symbols #1, #4, #8 and #12, since a part of the symbol resource is occupied for DU operation, these symbols cannot be used even for MT.

When the entire area of the MT symbol is indicated as NA for DU operation, the above symbols, such as MT symbols #0, #5, #6, #7, and #13, may be available for MT operation.

On the other hand, in this example described above, the soft resource is not configured. However, if the MT symbol resource is indicated as a soft+NA resource or a soft resource from a DU perspective, the MT symbol may be interpreted as a symbol whose availability is not determined.

FIG. 41 (b), (c), (d) shows the resource availability determination for other MT and DU resource direction cases.

MT downlink, MT uplink, DU downlink and DU uplink all have different slot timing, the amount of relative slot timing gap may depend on the resource direction of the MT and DU. Therefore, the availability of MT symbols depends on the resource direction of the MT and DU.

For example, the MT uplink and DU downlink cases in FIG. 41 (c), MT symbols #2-#3 and #8-#10 are available for MT operation, the result is different from the MT downlink and DU downlink cases. This is because the MT uplink reception timing precedes the MT downlink transmission timing by the TA.

On the other hand, since it is necessary to know the actual resource availability information of the CU MT, timing gap information between DU and MT should be communicated to CU to obtain MT resource availability. Here, two methods of delivering the timing gap information to the CU may be considered.

Option A. Report Timing Gap Values

The relative timing gap between MT and DU is shown in Table 4. In the table, the values of the relative timing gap (GT,XY) are shown according to the MT and DU resource directions, where X and Y are the MT and DU resource directions, respectively.

In addition, the following contents can be assumed in the table.

TA is a timing gap between MT uplink TX timing and MT downlink RX timing.

TAoffset is a timing gap between the DU uplink RX timing and the DU downlink TX timing.

DU downlink TX timing is ahead of its MT downlink Rx timing by TAd/2+Tdelta.

Then, since the MT timing can be obtained as 'MT timing=DU timing+GT,XY', the CU can acquire actual MT resource availability if it knows the value of GT,XY for each case. To this end, the MT may report GT,DD, GT,DU, GT,UD, and/or GT,UU values to the parent DU and/or CU.

Instead of delivering GT,XY for the four resource direction cases, the CU can calculate the timing gap value using TA, TAd, Tdelta, and TAoffset.

Regarding the TA value, it may be difficult to ensure that the parent DU knows the exact TA value applied at the MT side. Therefore, it may be necessary for the MT to feed back the correct value of the TA to the CU and the parent DU.

If the values of TAd and Tdelta are configured by RRC, these values may be known to the CU. However, when these values are configured by the MAC CE (control element), these values need to be reported to the CU from the parent node. Regarding TAoffset, if the CU and child DU(s) do not use the same TAoffset value, the TAoffset for each child DU(s) should also be reported to the CU.

When reporting the TA value applied by the MT to the CU and/or parent DU, this value may be an absolute TA value that is most recently updated and applied by the MT. It can be reported periodically or aperiodically. In the case of periodic reporting, the MT may be configured with a reporting period and resource location. Alternatively, the reportable resource area is configured periodically, but the actual report can be performed only when the TA value is changed over a certain range. If the TA value is reported aperiodically, when a request message from the parent DU comes, the report may be performed.

Table 9 below schematically illustrates an example of a relative timing gap between an MT and a DU.

TABLE 9

|  | MT downlink | MT uplink |
| --- | --- | --- |
| DU downlink | $G_{T,\,DD} = TA_{d/2} + T_{delta}$ | $G_{T,\,UD} = TA_{d/2} + T_{delta} - TA$ |
| DU uplink | $G_{T,\,DU} = TA_{d/2} + T_{delta} + TA_{offset}$ | $G_{T,\,UU} = TA_{d/2} + T_{delta} - TA + TA_{offset}$ |

Option B. Report the number of gap symbols.

Instead of feeding back the value of the time gap, information about the number of gap symbols may be delivered to the CU. Based on the example of FIG. 41 described above, the number of gap symbols (GS, XY) is shown in Table 10. If necessary, this value may be determined by the IAB node itself in consideration of the timing interval between the MT and the DU and the MT/DU switching time.

In this option, the availability of MT resources can be obtained using this value(s) without accurate timing interval information.

In successive OFDM symbols #S1-#S2, DU is indicated as hard, and $G_{S,\,X1Y1}$ and $G_{S,\,X2Y2}$ may each assume that the number of gap symbols reflects the MT and DU resource directions in symbols #S1 and #S2, respectively. Then, symbols that cannot be used for MT operation can be interpreted as $\#S1+G_{S,\,X1Y1}-\#S2+G_{S,\,X2Y2}+1$.

On the other hand, when consecutive DU symbols #S3-#S4 are indicated by NA, symbols $\#S3+G_{S,\,X3Y3}+1-\#S4+G_{S,\,X4Y4}$ are available for MT operation. For example, as shown in FIG. 41, OFDM symbols #3-#5 are DU hard symbols. If both the MT and the DU are in the downlink during the time resource, MT symbols $\#3+G_{S,\,DD}-\#5+G_{S,\,DD}+1=\#1-\#4$ cannot be used in MT operation. Therefore, in option B, the CU can obtain the actual MT resource availability by obtaining the number of gap symbols for each resource direction case.

When the number of gap symbols is reported, it may be reported periodically or aperiodically. In the case of periodic reporting, the MT may receive a report period and resource location configured. Alternatively, the reportable resource area is periodically configured, but actual reporting can be performed only when there is a change in the gap symbol value. When the number of gap symbols is reported aperiodically, the report may be performed when a request message from a parent DU is received.

TABLE 10

|  | MT downlink | MT uplink |
| --- | --- | --- |
| DU downlink | $G_{S,\,DD} = -2$ | $G_{S,\,UD} = 1$ |
| DU uplink | $G_{S,\,UD} = -2$ | $G_{S,\,UU} = 1$ |

Here, the contents of Table 10 may correspond to examples of examples in Tables 6 to 8 described above. The number of such gap symbols may be independently configured when switching from DU operation to MT operation and from MT operation to DU operation. That is, for example, when switching from DU operation to MT operation, the number of gap symbols required according to the resource direction combination of MT and DU may be determined and reported as described above. In addition, in the case of switching from MT operation to DU operation, the number of gap symbols required according to the combination of resource directions of MT and DU may be determined and reported as described above.

If the above description is amplified, the operation can be performed as follows.

(a) When the number of gap symbols is independently configured when switching from DU operation to MT operation and when switching from MT operation to DU operation When the number of gap symbols ($G_S$) has a positive number, it means that the MT operates as follows.

When the DU is switched from the MT operation to start the DU operation from symbol #n, the MT does not use as many symbols as $|G_S|$ before symbol #n as the MT timing reference.

When the DU switches to the MT operation after performing the DU operation up to symbol #n, the MT does not use as many symbols as $|G_S|$ after symbol #n as the MT timing reference.

When the number of gap symbols ($G_S$) has a negative number, it means that the MT operates as follows.

When the DU is switched from the MT operation to start the DU operation from symbol #n, the MT may additionally use as many $|G_S|$ symbols after symbol #n−1 as the MT timing reference.

When the DU switches to the MT operation after performing the DU operation up to symbol #n, the MT may additionally use as many as $|G_S|$ symbols before symbol #n+1 as the MT timing reference.

In the above description, the operation when the number of gap symbols ($G_S$) has a positive number and a negative number may be interchanged.

In addition, the operations described above may operate independently and/or together. In other words, as described above, the embodiment of the present specification may be provided only when the number of gap symbols is positive, or the embodiment of the present specification may be provided only when the number of gap symbols is negative. In addition, the embodiment of the present specification may be provided for both the embodiment for the case where the number of gap symbols is positive and the embodiment for the case where the number of gap symbols is negative.

(b) The number of gap symbols is provided only for the case of switching from DU to MT, and is commonly applied when switching from DU operation to MT operation and when switching from MT operation to DU operation.

When the number of gap symbols ($G_S$) has a positive number, it means that the MT operates as follows.

When the DU is switched from the MT operation to start the DU operation from symbol #n, the MT may additionally use as many symbols as $|G_S|-1$ after symbol #n−1 as the MT timing reference.

When the DU switches to the MT operation after performing the DU operation up to symbol #n, the MT does not use as many symbols as $|G_S|$ after symbol #n as the MT timing reference.

When the number of gap symbols ($G_S$) has a negative number, it means that the MT operates as follows.

When the DU is switched from the MT operation to start the DU operation from symbol #n, the MT does not use as many symbols as $|G_S|+1$ before symbol #n as the MT timing reference.

When the DU switches to the MT operation after performing the DU operation up to symbol #n, the MT may additionally use as many symbols as $|G_S|$ before symbol #n+1 as the MT timing reference.

In addition, the operations described above may operate independently and/or together. In other words, as described above, the embodiment of the present specification may be provided only when the number of gap symbols is positive, or the embodiment of the present specification may be provided only when the number of gap symbols is negative. In addition, the embodiment of the present specification may be provided for both the embodiment for the case where the number of gap symbols is positive and the embodiment for the case where the number of gap symbols is negative.

(c) The number of gap symbols is provided only for the case of switching from MT to DU, and is commonly applied when switching from DU operation to MT operation and when switching from MT operation to DU operation.

When the number of gap symbols ($G_S$) has a positive number, it means that the MT operates as follows.
  When the DU is switched from the MT operation to start the DU operation from symbol #n, the MT does not use as many symbols as $|G_S|$ before symbol #n as the MT timing reference.
  When the DU switches to the MT operation after performing the DU operation up to symbol #n, the MT may additionally use as many symbols as $|G_S|-1$ before symbol #n+1 as the MT timing reference.

When the number of gap symbols ($G_S$) has a negative number, it means that the MT operates as follows.
  When the DU is switched from the MT operation to start the DU operation from symbol #n, the MT may additionally use as many $|G_S|$ symbols after symbol #n−1 as the MT timing reference.
  When the DU switches to the MT operation after performing the DU operation up to symbol #n, the MT does not use as many symbols as $|G_S|+1$ after symbol #n as the MT timing reference.

In addition, the operations described above may operate independently and/or together. In other words, as described above, the embodiment of the present specification may be provided only when the number of gap symbols is positive, or the embodiment of the present specification may be provided only when the number of gap symbols is negative. In addition, the embodiment of the present specification may be provided for both the embodiment for the case where the number of gap symbols is positive and the embodiment for the case where the number of gap symbols is negative.

(d) Among the case of switching from DU operation to MT operation and the case of switching from MT operation to DU operation, the number of gap symbols is provided only when the number of gap symbols has a positive number, and is commonly applied to the case of switching from DU operation to MT operation and the case of switching from MT operation to DU operation.

When the number of gap symbols ($G_S$) for the case of switching from DU to MT is provided, it means that the MT operates as follows.
  When the DU is switched from the MT operation to start the DU operation from symbol #n, the MT may additionally use as many as $|G_S|-1$ symbols after symbol #n−1 as the MT timing reference.
  When the DU switches to the MT operation after performing the DU operation up to symbol #n, the MT may not use as many as $|G_S|$ symbols after symbol #n as the MT timing reference.

If the number of gap symbols ($G_S$) for the case of switching from MT to DU is provided, it means that the MT operates as follows.
  When the DU is switched in the MT operation to start the DU operation from symbol #n, the MT does not use as many symbols as $|G_S|$ before symbol #n as the MT timing reference.
  When the DU switches to the MT operation after performing the DU operation up to symbol #n, the MT may additionally use as many symbols as $|G_S|-1$ before symbol #n+1 as the MT timing reference.

Meanwhile, in the previous description, the above-described embodiments have been described mainly using the term 'gap'. However, the term 'gap' previously used may be used interchangeably with the term 'guard'. Accordingly, in the embodiments to be described later (and/or in the aforementioned embodiments), the terms 'gap' and 'guard' will be used interchangeably.

<Feedback for Reporting DU/MT Gap>

As in option A or option B above, an operation in which the MT reports the timing gap value (or TA, $TA_d$, $T_{delta}$, and/or $TA_{offset}$ value) or the number of gap symbols to the parent node will be referred to as 'DU/MT gap reporting'. When the MT reports the DU/MT gap to the parent node, the parent node may transmit feedback for the report to the MT. Such feedback may be specifically as follows.

Alt 1. An indication indicating that the DU/CU has reflected the DU/MT gap report information received from the child node may be informed to the child node. That is, the MT may receive an indication that the reported value has been applied from the parent node. Upon receiving such feedback, the MT may assume that its reported DU/MT gap report is applied.

Alt 2. The DU/CU may inform the corresponding child node of an indication indicating whether the DU/MT gap report information received from the child node is reflected. That is, the MT may receive an indication of whether to apply the reported value from the parent node. If this feedback indicates that the value reported by the MT is applied, the MT may assume that the DU/MT gap report reported by the MT is applied.

Alt 3. The DU/CU may inform the MT of the actual timing gap value (or TA, $TA_d$, $T_{delta}$, and/or $TA_{offset}$ values) or the number of gap symbols (after receiving the DU/MT gap report from the child node). That is, the MT may receive, from the parent node, feedback for the number of gap symbols or timing gap values (or TA, $TA_d$, $T_{delta}$, and/or $TA_{offset}$ values) actually applied by the parent node as a result of their report. When the number of gap symbols actually applied by the DU/CU is informed to the MT, the number of gap symbols reflected in all cases described in option B may be informed.

Such feedback may be transmitted through MAC CE or RRC.

Additionally, the MT may assume that the number of gap symbols or the timing gap value (or TA, $TA_d$, $T_{delta}$, and/or $TA_{offset}$ values) reported by the MT or fed back by the parent node at a specific time point after receiving such feedback is applied. This specific point in time may be determined as follows.

Alt a. After the MT receives the feedback from the parent node, it can be applied after N symbols. In this case, the value of N may be defined in the specification (pre-configured and/or predefined) or may be configured by RRC, MAC CE, etc. from a parent node. Characteristically, the value of N may be included in the feedback and transmitted.

Alt b. After the MT receives the feedback from the parent node, it may be applied starting from M slots (minislots). In this case, the value of M may be defined in the specification (pre-configured and/or predefined), or configured by RRC, MAC CE, or the like from a parent node. Characteristically, the value of N may be included in the feedback and transmitted.

In summary, in order for the CU to obtain actual MT resource availability, the MT may report a) a timing gap-related value of option A or b) the number of gap symbols of option B.

The method of notifying the timing gap-related information may be similarly applied to the case in which the H/S/NA indication is transmitted based on the timing of the MT resource configuration, thereby determining the availability of the actual DU resource.

When the H/S/NA indication is transmitted based on the timing of the MT resource configuration, it is possible to determine the resource availability of the DU symbol as follows.

If the entire time domain of the DU symbol is configured as a hard resource: Determined as a DU hard resource If all or part of the time domain of the DU symbol is configured as an NA resource: Determined as a DU NA resource If the entire time domain of the DU symbol is configured as soft or a soft resource and hard resource are combined: Determined as DU soft resource At this time, when the H/S/NA indication is transmitted based on the timing of the MT resource configuration, it is possible to determine the resource availability of the MT symbol as follows.

If the MT symbol area is configured as a DU hard resource: Determined as an unavailable resource for MT operation If the MT symbol area is configured as a DU NA resource: Determined as a resource available for MT operation If the MT symbol area is configured as a DU soft resource: Determined as a resource that is not determined whether MT operation is possible FIG. 42 is a flowchart of a method of receiving information about a guard symbol, according to another embodiment of the present specification.

Figure 42:
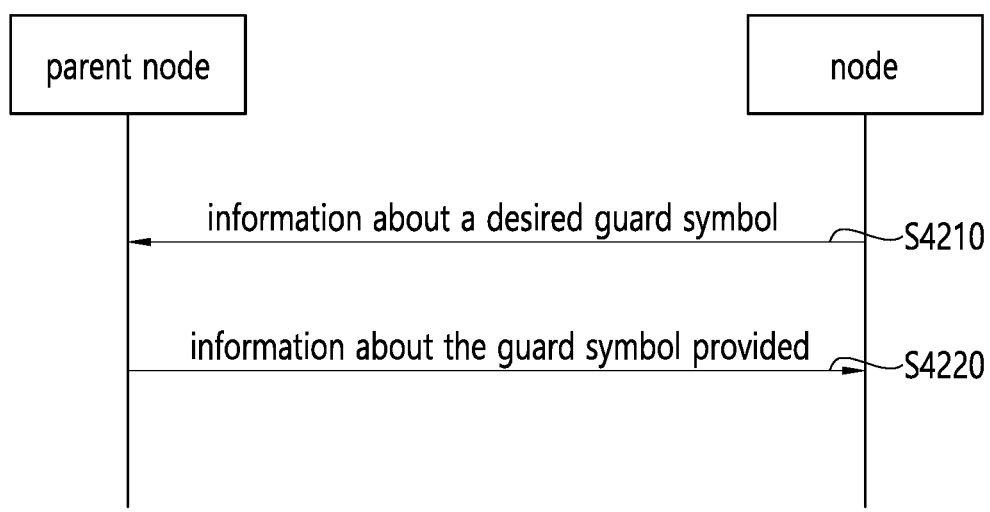
FIG. 42 is a flowchart of a method of receiving information about a guard symbol, according to another embodiment of the present specification.

According to FIG. 42, a node may transmit information about a desired guard symbol to a parent node (S4210).

As described above, 'information on the desired guard symbol', which is information about the guard symbol that the node transmits to the parent node, has the same/similar form as 'information on the provided guard symbol', which is information about the guard symbol that the node described above receives from the parent node. Here, 'information on the provided guard symbol' may correspond to the information on the guard symbol (applied to the node) described above.

That is, as described above, the embodiments of Tables 6 to 8 may be applied to the desired guard symbol information, hereinafter, since a more specific embodiment is the same as that described above (and will be described later), repeated description of overlapping content will be omitted for convenience of description.

The node may receive information about the guard symbol provided from the parent node (S4220). Since a more specific embodiment is the same as that described above (and will be described later), repeated description of overlapping content will be omitted for convenience of description.

In addition, the above-described 'information on the desired guard symbol' and/or 'information on the provided guard symbol' may be transmitted as MAC CE (and/or RRC).

On the other hand, similarly as described above, an embodiment in which a node transmits information about a desired guard symbol to a parent node and an embodiment in which a node receives information about a guard symbol provided from a parent node may be implemented independently or together.

6. Configure the Number of Specific Guard Symbol(s)

The IAB node may be instructed from the parent DU through the MAC CE of the number of guard symbols to be applied during the transition between the MT operation and the DU operation within the IAB node. The number of such guard symbols may be configured differently according to a combination of the Tx/Rx direction of the MT and the Tx/Rx direction of the DU. In addition, it may be applied differently when transitioning from MT to DU and when transitioning from DU to MT.

The number of guard symbol(s) required when the IAB node transitions between the MT operation and the DU operation may vary depending on the Tx/Rx timing of the MT and the DU. Assuming that the IAB node applies the timing alignment case 1, the Tx/Rx timing of the IAB DU is the same among all IAB nodes, the same may be assumed between DU cells within the IAB node. However, in the case of the Tx/Rx timing of the IAB MT, it is affected by a propagation delay with the parent node. If the propagation delay between the MT-CCs in the same IAB node and the parent node is different, the Tx/Rx timing between "MT-CCs" may also be different. Therefore, the number of guard symbols required for each MT-CC in the IAB node may be different. When an IAB node is connected to two parent nodes using dual connectivity (DC), the propagation delay may be different for each carrier group (CG), and the number of required guard symbols may vary. If it is assumed that cells in the same CG are co-located, the difference in propagation delay between cells may be insignificant in the same CG, and thus the same number of guard symbols between MT-CCs may be assumed. However, when considering applying different timing alignment cases between IAB nodes later, or applying different Tx/Rx timings for each DU-cell within the IAB node and/or for each IAB node MT-CC, even within the same CG, the difference in Tx/Rx timing between MT-CCs may become large. The number of guard symbols required for each MT-CC may be different.

Considering the above characteristics, it is proposed that the 'guard symbol MAC CE', which is a MAC CE transmitting guard symbol information, is transmitted as follows.

Figure 43:
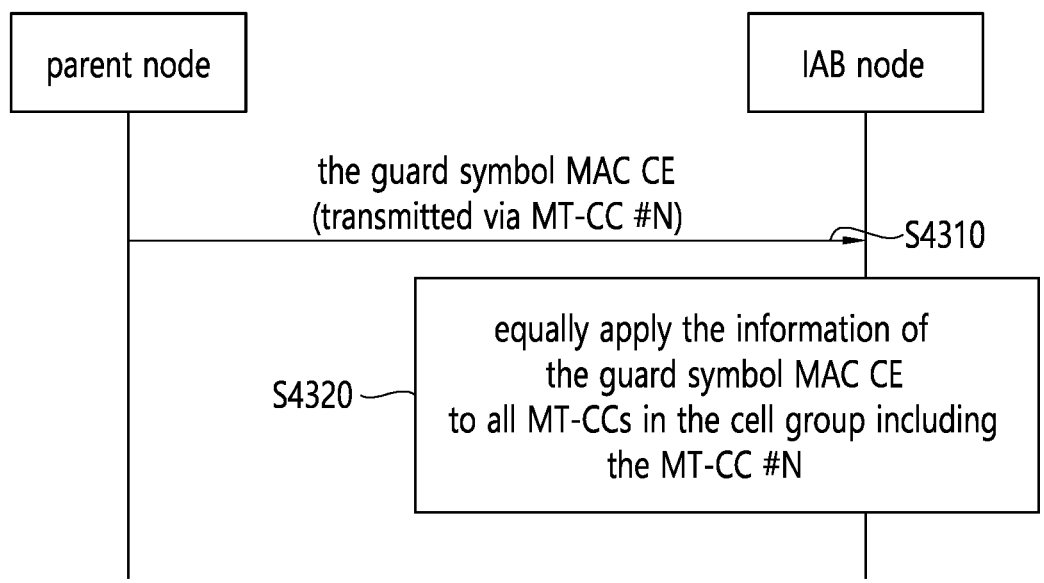
FIG. 43 schematically illustrates an example of a method of transmitting a guard symbol MAC CE.

FIG. 43 schematically illustrates an example of a method of transmitting a guard symbol MAC CE.

According to FIG. 43, the parent node may transmit the guard symbol MAC CE to the IAB node (S4310).

The IAB node may equally apply the information of the guard symbol MAC CE to all MT-CCs in the cell group including the MT-CC #N (S4320).

This is explained in more detail as follows.

Option 1: If the IAB node receives the guard symbol MAC CE through a specific cell, the guard symbol MAC CE information may be equally applied to all cells within the same CG as the corresponding cell. In other words, if the IAB node receives the guard symbol MAC CE through a specific MT-CC, the guard symbol MAC CE information may be equally applied to all MT-CCs within the same CG as the corresponding MT-CC.

When using this method, the same number of guard symbols is always applied to MT-CCs in the same CG. Therefore, when changing the number of guard symbols of all MT-CCs in the same CG, the parent node only needs to transmit the guard symbol MAC CE to one MT-CC.

Figure 44:
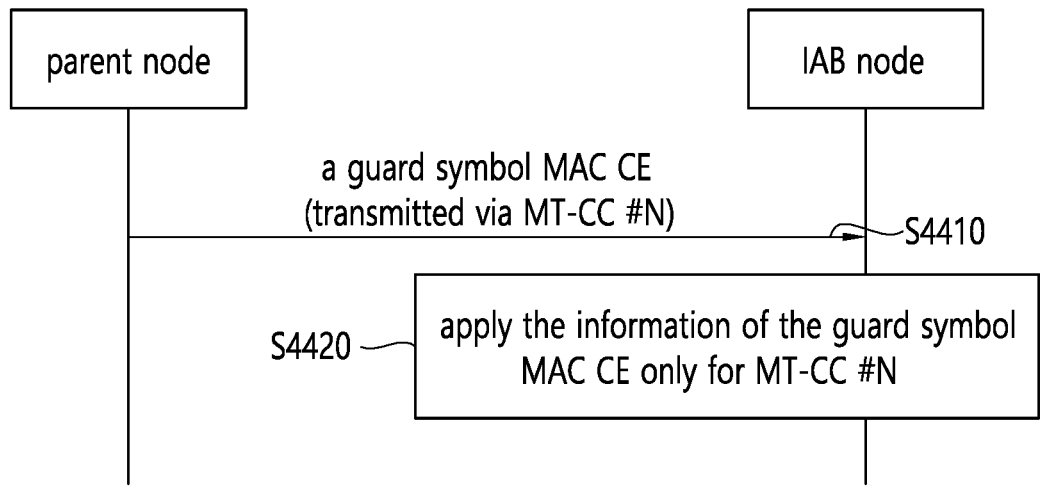
FIG. 44 schematically illustrates another example of a method of transmitting a guard symbol MAC CE.

FIG. 44 schematically illustrates another example of a method of transmitting a guard symbol MAC CE.

According to FIG. 44, the parent node may transmit a guard symbol MAC CE to the IAB node (S4410).

The IAB node may apply the information of the guard symbol MAC CE only for MT-CC #N (S4420).

This will be described in more detail as follows.

Option 2: When the IAB node receives the guard symbol MAC CE through a specific cell, the guard symbol MAC CE information may be applied only to the corresponding cell. In other words, when the IAB node receives the guard symbol MAC CE through a specific MT-CC, the guard symbol MAC CE information may be applied only to the corresponding MT-CC.

When using this method, a different number of guard symbol(s) may be applied for each MT-CC. However, the parent node transmits the guard symbol MAC CE to all MT-CCs requiring the guard symbol(s), when the number of guard symbols is changed, the guard symbol MAC CE is independently transmitted to all MT-CCs that need to be changed.

Figure 45:
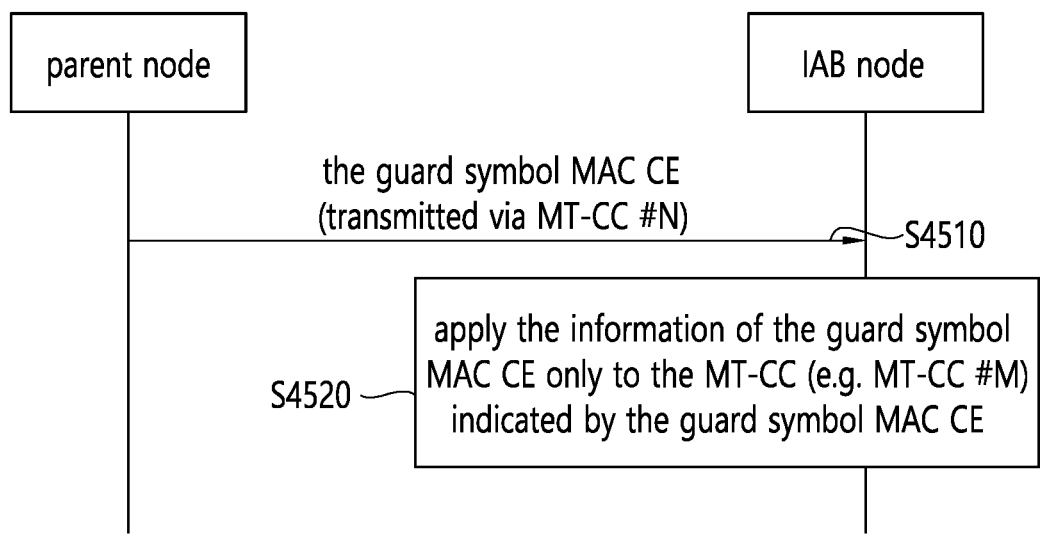
FIG. 45 schematically illustrates another example of a method of transmitting a guard symbol MAC CE.

FIG. 45 schematically illustrates another example of a method of transmitting a guard symbol MAC CE.

According to FIG. 45, the parent node may transmit the guard symbol MAC CE to the IAB node (S4510).

The IAB node may apply the information of the guard symbol MAC CE only to the MT-CC indicated by the guard symbol MAC CE (S4520).

This is explained in more detail as follows.

Option 3: When the IAB node receives the guard symbol MAC CE through a specific cell, the guard symbol MAC CE information may be applied to the cell indicated through the guard symbol MAC CE. In other words, when the IAB node receives the guard symbol MAC CE through a specific MT-CC, the guard symbol MAC CE information may be applied to the MT-CC indicated through the corresponding guard symbol MAC CE. To this end, information on a cell to which the corresponding guard symbol MAC CE information is applied may be included in the guard symbol MAC CE and transmitted.

In the case of using this method, a different number of guard symbol(s) may be applied to each MT-CC, as in option 2 above. However, the parent node must transmit the guard symbol MAC CE to all MT-CCs requiring the guard symbol(s), when the number of guard symbols is changed, the guard symbol MAC CE must be independently transmitted to all MT-CCs that need to be changed.

Figure 46:
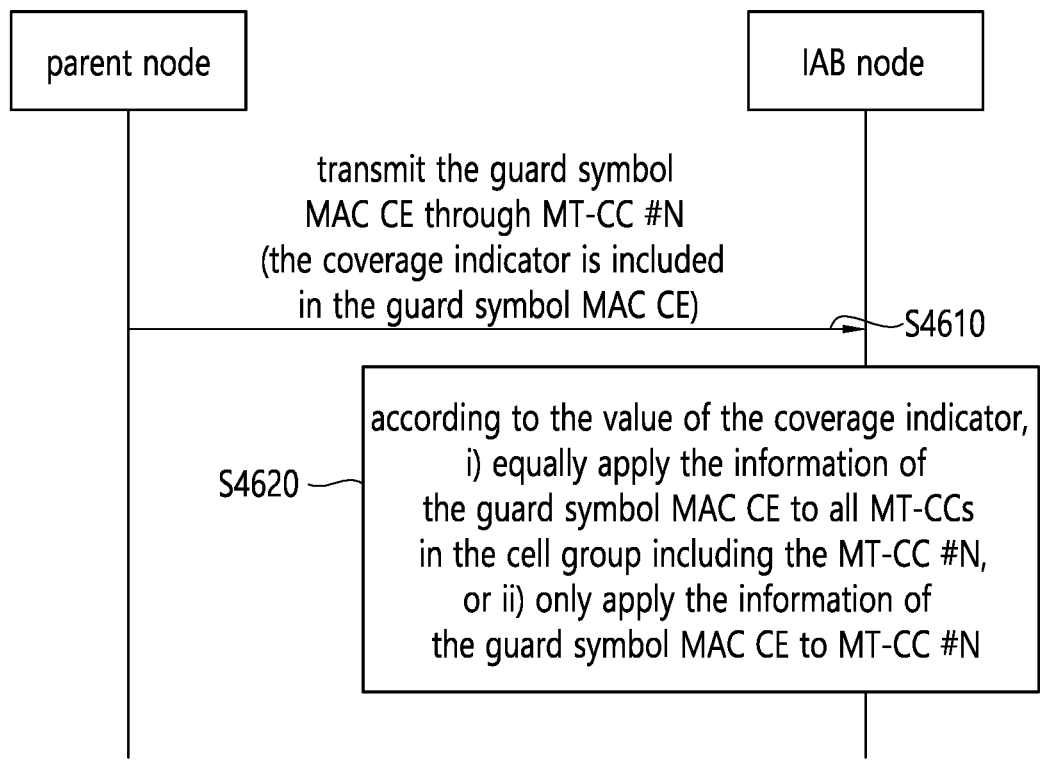
FIG. 46 schematically illustrates another example of a method of transmitting a guard symbol MAC CE.

FIG. 46 schematically illustrates another example of a method of transmitting a guard symbol MAC CE.

According to FIG. 46, the parent node may transmit the guard symbol MAC CE to the IAB node through MT-CC #N (S4610).

The IAB node i) equally applies the information of the guard symbol MAC CE to all MT-CCs in the cell group including the MT-CC #N, or ii) only applies the information of the guard symbol MAC CE to MT-CC #N according to the value of the coverage indicator (S4620).

This is explained in more detail as follows.

Option 4: When the IAB node receives the guard symbol MAC CE through a specific cell, according to instructions within the guard symbol MAC CE, the guard symbol MAC CE information may be equally applied to all cells within the same CG as the corresponding cell (the specific cell) or may be applied only to the corresponding cell (the specific cell). In other words, when the IAB node receives the guard symbol MAC CE through a specific MT-CC, according to instructions within the guard symbol MAC CE, the guard symbol MAC CE information may be equally applied to all MT-CCs within the same CG as the corresponding MT-CC (the specific MT-CC) or may be applied only to the corresponding MT-CC (the specific MT-CC).

For this purpose, an indication of whether the corresponding guard symbol MAC CE information is applied to all cells in the same CG or only the cell in which the guard symbol MAC CE is transmitted may be included in the guard symbol MAC CE. That is, for example, if the value of the 1-bit indicator in the guard symbol MAC CE is 0, this means that the corresponding guard symbol MAC CE information is equally applied to all cells in the same CG as the cell in which the guard symbol MAC CE is transmitted, if the value of the 1-bit indicator is 1, this may mean that the corresponding guard symbol MAC CE information is applied only to a cell in which the guard symbol MAC CE is transmitted.

Or for this, when the guard symbol MAC CE is transmitted to a specific cell (e.g., PCell), it is equally applied to all cells in the same CG, when transmitted to another cell (a cell other than the PCell, for example, the SCell), it may be applied only to the corresponding cell. That is, the range of cells to which the guard symbol MAC CE information is applied may be dependent on a cell to which the guard symbol MAC CE information is transmitted. Characteristically, this method can be applied only to a time point before each cell first receives the guard symbol MAC CE through the corresponding cell.

In case of using this method, the same number of guard symbols may be applied to all cells in the same CG efficiently, or a different number of guard symbols may be applied cell-specifically as needed.

Figure 47:
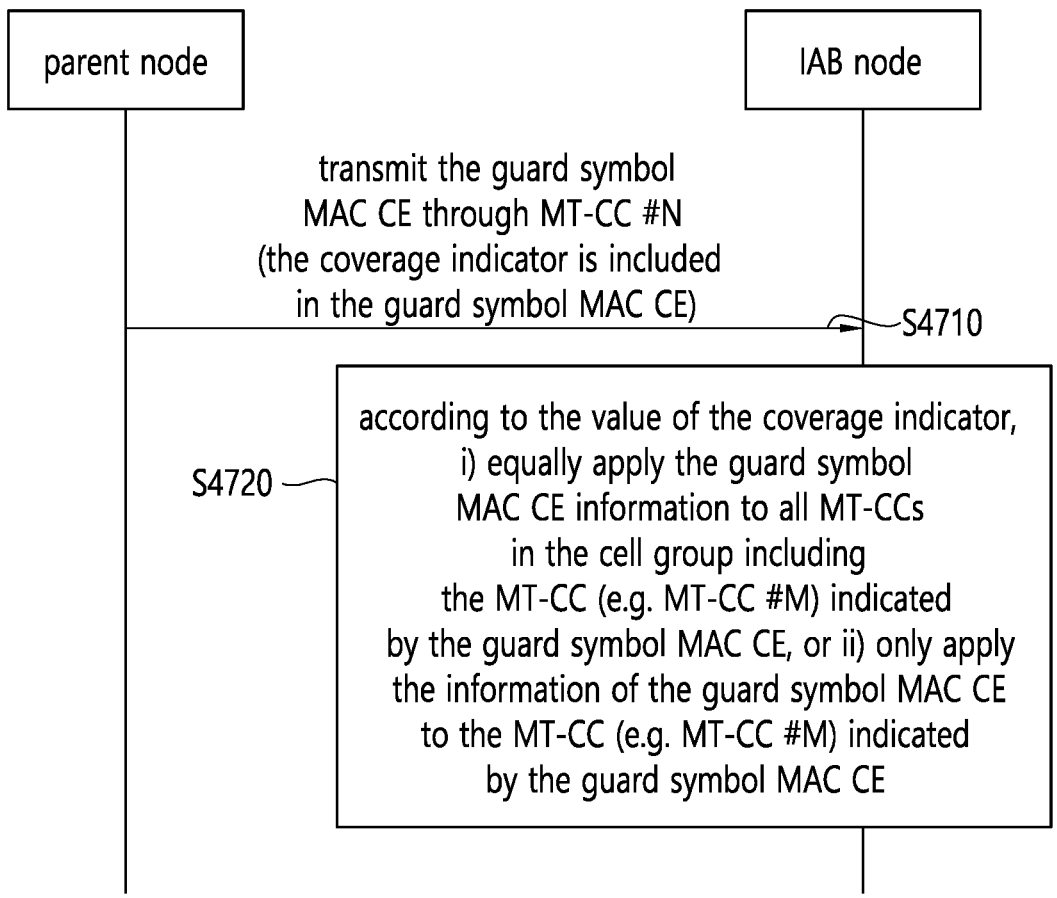
FIG. 47 schematically illustrates another example of a method of transmitting a guard symbol MAC CE.

FIG. 47 schematically illustrates another example of a method of transmitting a guard symbol MAC CE.

According to FIG. 47, the parent node may transmit the guard symbol MAC CE to the IAB node through MT-CC #N (S4710).

The IAB node according to the value of the coverage indicator may i) equally apply the guard symbol MAC CE information to all MT-CCs in the cell group including the MT-CC indicated by the guard symbol MAC CE, or ii) only apply the information of the guard symbol MAC CE to the MT-CC indicated by the guard symbol MAC CE (S4720).

This is explained in more detail as follows.

Option 5: If the IAB node receives the guard symbol MAC CE through a specific cell, according to instructions within the guard symbol MAC CE, the guard symbol MAC CE information may be equally applied to all cells within the same CG as the corresponding cell (e.g., the specific cell or the cell indicated by the guard symbol MAC CE) or may be applied only to the indicated specific cell. In other words, when the IAB node receives the guard symbol MAC CE through a specific MT-CC, according to the instruction in the guard symbol MAC CE, the guard symbol MAC CE information is equally applied to all MT-CCs within the same CG as the corresponding MT-CC or can be applied only to the indicated MT-CC.

For this purpose, an indication of whether the corresponding guard symbol MAC CE information is applied to all cells in the same CG or only to a specific cell may be included in the guard symbol MAC CE. When applied to a specific cell, cell information to which the guard symbol MAC CE information is additionally applied may be transmitted together.

Or, information on the cell ID to which the corresponding guard symbol MAC CE information is applied is informed through the guard symbol MAC CE, if the value indicated by the cell ID is 0 or a specific value, it may mean that it is applied to all cells in the same CG. In this case, the specific value may be, for example, a cell ID that is not designated as a serving cell of the IAB node.

Or, if information about the cell ID to which the guard symbol MAC CE information is applied is transmitted, the information is applied to the cell, if no information about cell ID is sent, it may mean that a cell to which the guard symbol MAC CE is transmitted is applied to all cells in the same CG. That is, the range of cells to which the guard symbol MAC CE information is applied may be dependent on whether information on a cell ID to which the guard symbol MAC CE information is applied is included in the guard symbol MAC CE.

When using these methods, if necessary, the same number of guard symbols may be efficiently applied to all cells in the same CG, or a different number of guard symbols may be applied specifically to cells.

Figure 48:
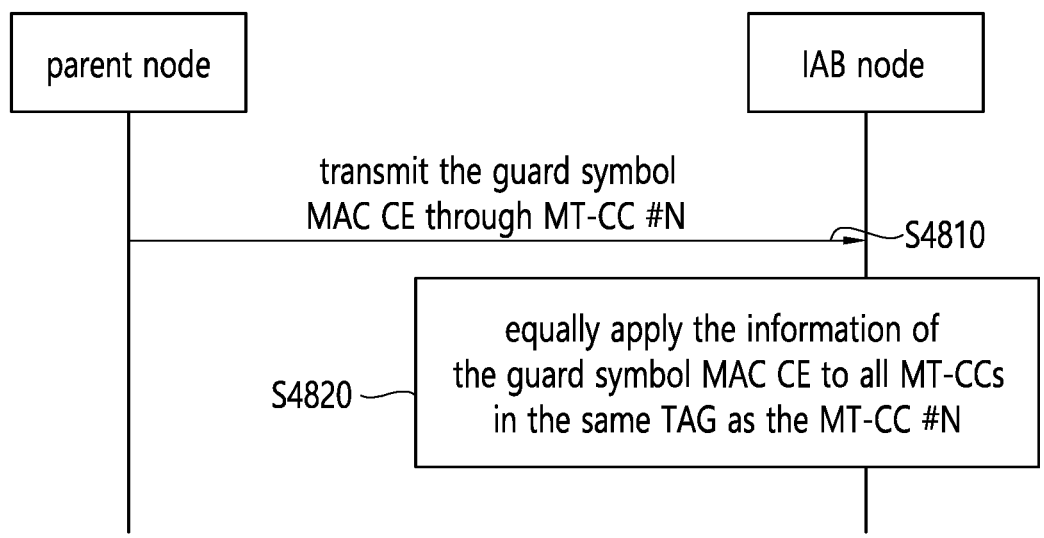
FIG. 48 schematically illustrates another example of a method of transmitting a guard symbol MAC CE.

FIG. 48 schematically illustrates another example of a method of transmitting a guard symbol MAC CE.

According to FIG. 48, the parent node may transmit the guard symbol MAC CE to the IAB node through MT-CC #N (S4810).

The IAB node may equally apply the information of the guard symbol MAC CE to all MT-CCs in the same TAG as the MT-CC #N (S4820).

This is explained in more detail as follows.

Option 6: When the IAB node receives the guard symbol MAC CE through a specific cell, the guard symbol MAC CE information may be equally applied to all cells within the same TA group (TAG) as the corresponding cell. In other words, when the IAB node receives the guard symbol MAC CE through a specific MT-CC, the guard symbol MAC CE information may be equally applied to all MT-CCs within the same TAG as the corresponding MT-CC.

When using these methods, while applying the same number of guard symbols between cells that have the same propagation delay and require the same guard symbols, the different number of guard symbols may be applied between cells having different propagation delays and requiring different guard symbols.

Figure 49:
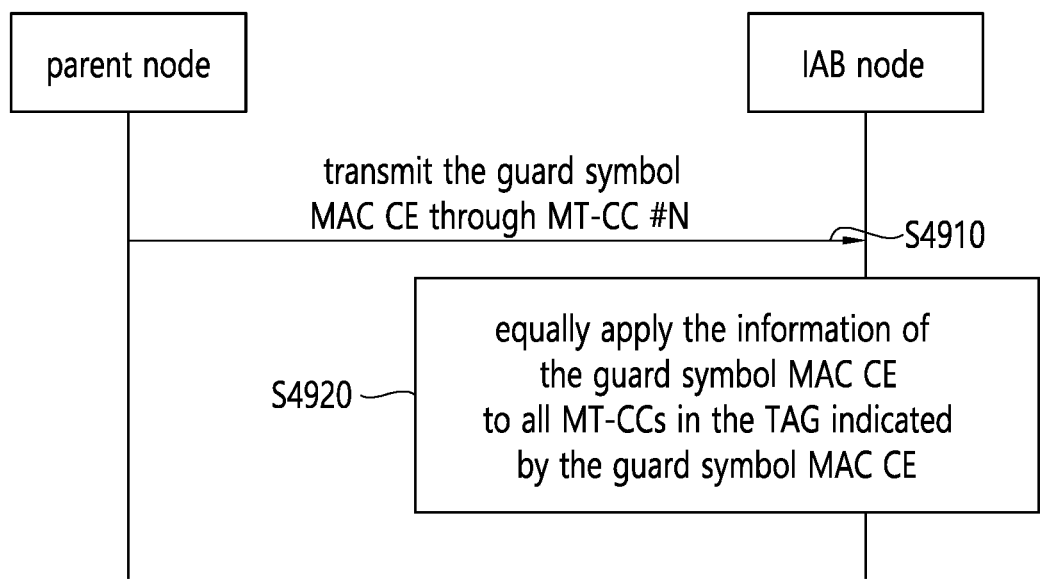
FIG. 49 schematically illustrates another example of a method of transmitting a guard symbol MAC CE.

FIG. 49 schematically illustrates another example of a method of transmitting a guard symbol MAC CE.

According to FIG. 49, the parent node may transmit the guard symbol MAC CE to the IAB node through MT-CC #N (S4910).

The IAB node may equally apply the information of the guard symbol MAC CE to all MT-CCs in the TAG indicated by the guard symbol MAC CE (S4920).

This is explained in more detail as follows.

Option 7: When the IAB node receives the guard symbol MAC CE through a specific cell, the guard symbol MAC CE information may be equally applied to all cells within the TAG indicated through the guard symbol MAC CE. In other words, when the IAB node receives the guard symbol MAC CE through a specific MT-CC, the same can be applied to all MT-CCs within the TAG indicated through the guard symbol MAC CE. To this end, information on a TAG to which the corresponding guard symbol MAC CE information is applied may be included and transmitted in the guard symbol MAC CE.

When using these methods, while applying the same number of guard symbols between cells that have the same propagation delay and require the same guard symbols, the different number of guard symbols may be applied between cells having different propagation delays and requiring different guard symbols.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

On the other hand, if the contents to which the above-described examples are applied from the point of view of the (child) node, it may be as follows.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 50:
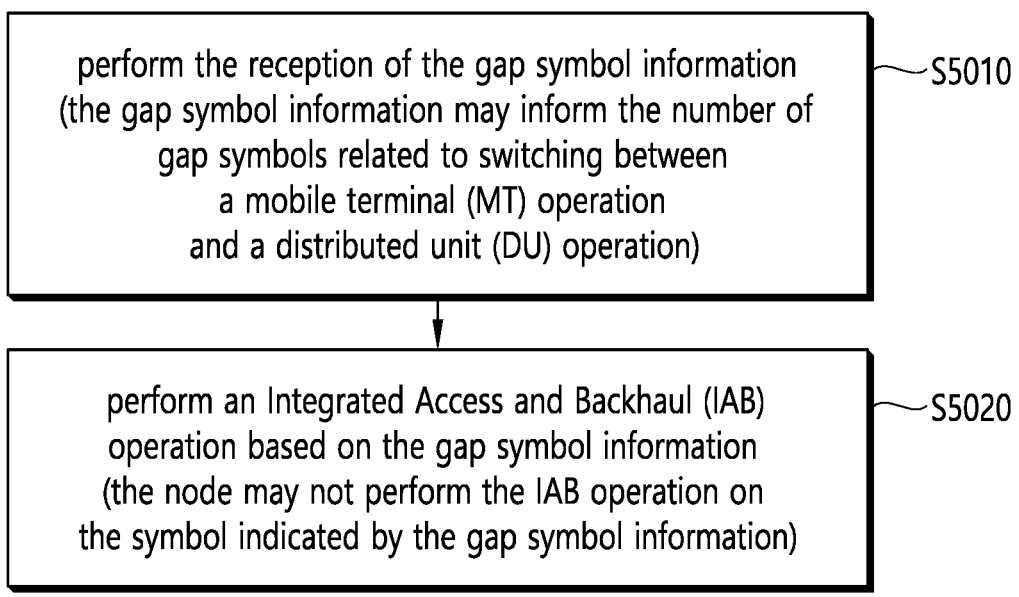
FIG. 50 is a flowchart of a method of performing reception of gap symbol information from a node perspective, according to an embodiment of the present specification.

FIG. 50 is a flowchart of a method of performing reception of gap symbol information from a node perspective, according to an embodiment of the present specification.

According to FIG. 50, the node may perform the reception of the gap symbol information (S5010). Here, the gap symbol information may inform the number of gap symbols related to switching between a mobile terminal (MT) operation and a distributed unit (DU) operation. Since a more specific embodiment is the same as that described above (and will be described later), repeated description of overlapping content will be omitted for convenience of description.

The node may perform an Integrated Access and Backhaul (IAB) operation based on the gap symbol information (S5020). Here, the node may not perform the IAB operation on the symbol indicated by the gap symbol information. Since a more specific embodiment is the same as that described above (and will be described later), repeated description of overlapping content will be omitted for convenience of description.

Figure 51:
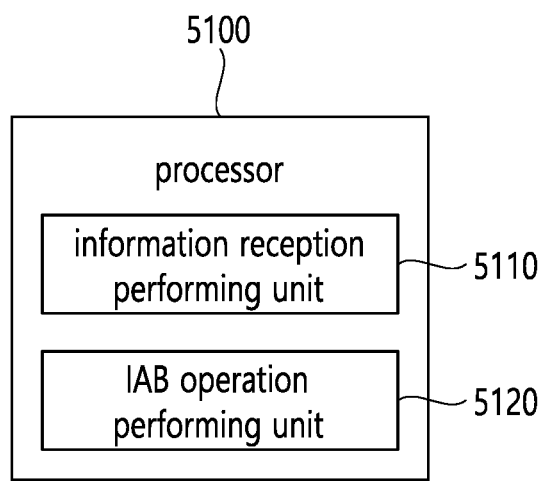
FIG. 51 is a block diagram of an example of an apparatus for performing reception of gap symbol information from a node perspective, according to an embodiment of the present specification.

FIG. 51 is a block diagram of an example of an apparatus for performing reception of gap symbol information from a node perspective, according to an embodiment of the present specification.

Referring to FIG. 51, the processor 5100 may include an information reception performing unit 5110 and an IAB operation performing unit 5120. Here, the processor may be applied to, for example, the processors shown in FIGS. 10 to 15.

The information reception performing unit 5110 may perform the reception of the gap symbol information. Here, the gap symbol information may inform the number of gap symbols related to switching between a mobile terminal (MT) operation and a distributed unit (DU) operation. Since a more specific embodiment is the same as that described above (and will be described later), repeated description of overlapping content will be omitted for convenience of description.

The IAB operation performing unit 5120 may perform an IAB (Integrated Access and Backhaul) operation based on the gap symbol information. Here, the node may not perform the IAB operation on the symbol indicated by the gap symbol information. Since a more specific embodiment is the same as that described above (and will be described later), repeated description of overlapping content will be omitted for convenience of description.

Meanwhile, although not shown separately, the present specification may also provide the following embodiments.

For example, an apparatus may be an apparatus comprising at least one memory; and at least one processor being operatively connected to the at least one memory, wherein the at least one processor is configured to perform a reception of gap symbol information, wherein the gap symbol information informs a number of symbols related to switching between a mobile terminal (MT) operation and a distributed unit (DU) operation and perform an integrated access and backhaul (IAB) operation, wherein the apparatus does not perform the IAB operation on a symbol informed by the gap symbol information.

For example, an CRM may be at least one computer readable medium (CRM) including instructions being executed by at least one processor, wherein the at least one processor is configured to perform a reception of gap symbol information, wherein the gap symbol information informs a number of symbols related to switching between a mobile terminal (MT) operation and a distributed unit (DU) operation, and perform an integrated access and backhaul (IAB) operation, wherein an apparatus does not perform the IAB operation on a symbol informed by the gap symbol information.

FIG. 52 is a flowchart of a method of performing transmission of gap symbol information from the viewpoint of a (parent) node, according to an embodiment of the present specification.

According to FIG. 52, the node may transmit the gap symbol information (S5210). Here, the gap symbol information informs the number of gap symbols related to switching between a mobile terminal (MT) operation and a distributed unit (DU) operation, the symbol indicated by the gap symbol information may be a symbol in which the child node does not perform the JAB operation. Since a more specific embodiment is the same as that described above (and will be described later), repeated description of overlapping content will be omitted for convenience of description.

Figure 53:
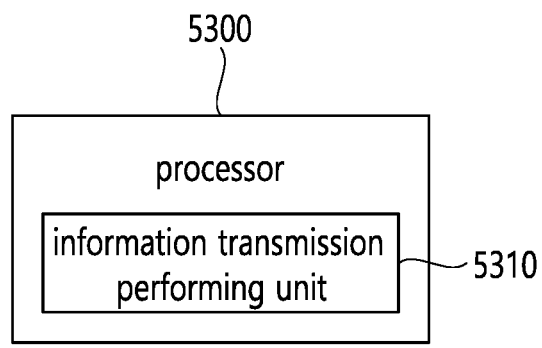
FIG. 53 is a flowchart of a method of performing transmission of gap symbol information from the viewpoint of a (parent) node, according to an embodiment of the present specification.

FIG. 53 is a flowchart of a method of performing transmission of gap symbol information from the viewpoint of a (parent) node, according to an embodiment of the present specification.

Referring to FIG. 53, the processor 5300 may include an information transmission performing unit 5310. Here, the processor may be applied to, for example, the processors shown in FIGS. 10 to 15.

The information transmission performing unit 5310 may be configured to perform the transmission of the gap symbol information. Here, the gap symbol information informs the number of gap symbols related to switching between a mobile terminal (MT) operation and a distributed unit (DU) operation, the symbol indicated by the gap symbol information may be a symbol in which the child node does not perform the JAB operation. Since a more specific embodiment is the same as that described above (and will be described later), repeated description of overlapping content will be omitted for convenience of description.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method for performing a reception of gap symbol information in a wireless communication system, the method performed by a node, which performs an integrated access and backhaul (IAB) operation including a mobile terminal (MT) operation or a distributed unit (DU) operation, and comprising:

performing the reception of the gap symbol information, wherein the gap symbol information informs a number of symbols related to switching between the MT operation and the DU operation, wherein the MT operation is an operation related to a communication between the node and a parent node, and wherein the DU operation is an operation related to a communication between the node and a child node or a communication between the node and a user equipment (UE); and performing the IAB operation based on the gap symbol information, wherein the node does not perform the IAB operation on the symbols informed based on the gap symbol information.

2. The method of claim 1, wherein the node is a node configured to support the MT operation and the DU operation.

3. The method of claim 1, wherein the gap symbol information includes first information and second information, wherein the first information is information for a number of gap symbols for a transition from the MT operation to the DU operation, wherein the second information is information for a number of gap symbols for a transition from the DU operation to the MT operation.

4. The method of claim 3, wherein the MT operation is at least one of a MT transmission (TX) and a MT reception (RX), and wherein the DU operation is at least one of a DU TX and a DU RX.

5. The method of claim 4, wherein the first information informs at least one of:

information for a number of gap symbols for a transition from the MT RX to the DU TX, information for a number of gap symbols for a transition from the MT RX to the DU RX, information for a number of gap symbols for a transition from the MT TX to the DU TX, or information for a number of gap symbols for a transition from the MT TX to the DU RX.

6. The method of claim 4, wherein the second information informs at least one of:

information for a number of gap symbols for a transition from the DU TX to the MT RX, information for a number of gap symbols for a transition from the DU TX to the MT TX, information for a number of gap symbols for a transition from the DU RX to the MT RX, or information for a number of gap symbols for a transition from the DU RX to the MT TX.

7. The method of claim 1, wherein the node receives the gap symbol information from a parent node.

8. The method of claim 1, wherein the node transmits desired gap symbol information to a parent node.

9. The method of claim 8, wherein the desired gap symbol information informs a number of gap symbols for each combination of the MT operation and the DU operation which is desired by the node.

10. A node, configured to perform an integrated access and backhaul (JAB) operation including a mobile terminal (MT) operation or a distributed unit (DU) operation, comprising:

a transceiver;

at least one memory; and at least one processor being operatively connected to the at least one memory and the transceiver, wherein the at least one processor is configured to:

perform a reception of gap symbol information, wherein the gap symbol information informs a number of symbols related to switching between the MT operation and the DU operation, wherein the MT operation is an operation related to a communication between the node and a parent node, and wherein the DU operation is an operation related to a communication between the node and a child node or a communication between the node and a user equipment (UE); and perform the IAB operation based on the gap symbol information, wherein the node does not perform the IAB operation on the symbols informed based on the gap symbol information.

* * * * *